United States Patent
Li et al.

(10) Patent No.: US 9,814,031 B2
(45) Date of Patent: Nov. 7, 2017

(54) METHOD FOR TRANSMITTING DOWNLINK CONTROL INFORMATION, NETWORK SIDE DEVICE, AND USER EQUIPMENT

(71) Applicant: Huawei Technologies Co., Ltd., Shenzhen, Guangdong (CN)

(72) Inventors: Yuanjie Li, Shanghai (CN); Zhenfei Tang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 174 days.

(21) Appl. No.: 14/663,061

(22) Filed: Mar. 19, 2015

(65) Prior Publication Data
US 2015/0195821 A1 Jul. 9, 2015

Related U.S. Application Data

(63) Continuation of application No. PCT/CN2012/081782, filed on Sep. 21, 2012.

(51) Int. Cl.
*H04W 72/04* (2009.01)
*H04L 5/00* (2006.01)

(52) U.S. Cl.
CPC ......... *H04W 72/042* (2013.01); *H04L 5/0053* (2013.01); *H04W 72/04* (2013.01)

(58) Field of Classification Search
CPC .... H04W 72/042; H04W 72/04; H04L 5/0053
See application file for complete search history.

(56) References Cited

U.S. PATENT DOCUMENTS 8,755,345 B2 * 6/2014 Xie ................. H04L 5/0053
370/328
8,842,628 B2 * 9/2014 Gao ................. H04W 72/04
370/329
(Continued)

FOREIGN PATENT DOCUMENTS

CN 102255688 A 11/2011
CN 102355732 A 2/2012
(Continued)

OTHER PUBLICATIONS

"Discussion on ePDCCH candidates design", ZTE, 3GPP TSG RAN WG1 Meeting #69, May 21-25, 2012, 4 pages.
(Continued)

*Primary Examiner* — Phuc Tran
(74) *Attorney, Agent, or Firm* — Quarles & Brady LLP

(57) ABSTRACT

The present invention provides a method for transmitting downlink control information, a network side device, and a user equipment. The method includes: selecting, by a network side device, a aggregation level of a physical control channel set in a transmission subframe, and selecting the number of physical control channel candidates corresponding to the aggregation level according to the aggregation level; and sending, by the network side, downlink control information on a physical control channel candidate corresponding to the selected number. The times that blind detection is performed corresponding to the aggregation level corresponds to the number of physical control channel candidates, and therefore, when the number of physical control channel candidates is determined, the times that blind detection is performed is determined, so that the network side device and the user equipment can communicate with each other without increasing the times that blind detection is performed.

12 Claims, 3 Drawing Sheets

(56) References Cited

U.S. PATENT DOCUMENTS

| | | | |
|---|---|---|---|
| 9,054,843 B2* | 6/2015 | Frederiksen | H04L 5/0053 |
| 9,131,490 B2* | 9/2015 | Feng | H04L 5/0007 |
| 2006/0018258 A1 | 1/2006 | Teague et al. | |
| 2012/0230266 A1 | 9/2012 | Xie et al. | |
| 2015/0003360 A1* | 1/2015 | Liu | H04L 5/001 370/329 |
| 2015/0139149 A1* | 5/2015 | Feng | H04L 5/0007 370/329 |

FOREIGN PATENT DOCUMENTS

| | | |
|---|---|---|
| CN | 102368871 A | 3/2012 |
| CN | 102395206 A | 3/2012 |
| EP | 2 378 703 A1 | 10/2011 |
| EP | 2 779 768 A1 | 9/2014 |
| JP | 2013-529414 A | 7/2013 |
| JP | 2014-508471 A | 4/2014 |
| RU | 2358391 C2 | 6/2009 |
| WO | WO 2010/145570 A1 | 12/2010 |
| WO | WO 2012/109542 A1 | 8/2012 |

OTHER PUBLICATIONS

"Considerations on search spaces", Nokia, 3GPP TSG RAN WG1 Meeting #70, Aug. 13-17, 2012, 7 pages.

"On the working assumption of the threshold for EPDCCH search space", LG Electronics, 3GPP TSG RAN WG1 Meeting #70, 2 pages.

"3rd Generation Partnership Project; Technical Specification Group Radio Access Network; Evolved Universal Terrestrial Radio Access (E-UTRA); Physical layer procedures (Release 11)", 3GPP TS 36.213 V11.0.0, Sep. 2012, 143 pages.

"Search space design for ePDCCH", Renesas Mobile Europe Ltd., 3GPP TSG-RAN WG1 Meeting #70, Aug. 13-17, 2012, 7 pages, R1-123586.

"Search space design for E-PDCCH", CATT, 3GPP TSG RAN WG1 Meeting #70, Aug. 13-17, 2012, 5 pages, R1-123224.

"Performance Evaluation of Search Space for ePDCCH", NTT Docomo, 3GPP TSG RAN WG1 Meeting #70, Aug. 13-17, 2012, 6 pages, R1-123552.

ZTE, "Discussion on DMRS scrambling sequence for enhanced PDCCH," 3GPP TSG RAN WG1 Meeting #70 R1-123313), Qingdao, China, Aug. 13-17, 2012, 4 pages.

HTC, "Discussion on ePDCCH Search Space Design," 3GPP TSG-RAN WG1 #70 (R1-123600), Qingdao, China, Aug. 13-17, 2012, 4 pages.

Decision to Grant a Patent (including English translation) issued in corresponding Japanese Patent Application No. 2015-532265, dated Mar. 28, 2017, 7 pages.

* cited by examiner

METHOD FOR TRANSMITTING DOWNLINK CONTROL INFORMATION, NETWORK SIDE DEVICE, AND USER EQUIPMENT

CROSS REFERENCE TO RELATED APPLICATIONS

This application is a continuation of International Application No. PCT/CN2012/081782, filed on Sep. 21, 2012, which is hereby incorporated by reference in its entirety.

TECHNICAL FIELD

The present invention relates to the field of communications technologies, and in particular, to a method for transmitting downlink control information, a network side device, and a user equipment.

BACKGROUND

In an LTE system, a control area of a physical downlink control channel (Physical Downlink Control Channel, hereinafter briefly referred to as PDCCH) is formed by a control channel element (Control Channel Element, hereinafter briefly referred to as CCE) obtained through logic division, where the mapping of the CCE to a resource element (Resource Element, hereinafter briefly referred to as RE) adopts a complete interleaving manner. The transmission of downlink control information (Downlink Control Information, hereinafter briefly referred to as DCI) is also based on a unit of CCE. One piece of DCI for one user equipment (User Equipment, hereinafter briefly referred to as UE) may be sent in N consecutive CCEs, and possible values of N in the LTE system are 1, 2, 4, and 8, which are called aggregation levels of the CCE. The UE performs blind detection on the PDCCH in the control area, and searches to determine whether a PDCCH that is sent for the UE exists. The blind detection refers to that decoding is attempted on different DCI formats and CCE aggregation levels by using a radio network temporary identity (Radio Network Temporary Identity, hereinafter briefly referred to as RNTI) of the UE, and if the decoding is correct, the DCI for the UE is received. By performing blind detection, a specific time-frequency resource location of each PDCCH is determined, thereby implementing receiving of the PDCCH, reading of high-layer signaling scheduling information such as system information, and receiving of corresponding information. The current protocol specifies the times that blind detection is performed on PDCCHs of different aggregation levels, and this specification ensures that the times that blind detection is performed on the PDCCH by the UE do not exceed the maximum the times that blind detection is performed.

To improve system performance and expand capacity of a physical downlink control channel (Physical Downlink Control, hereinafter briefly referred to as PDCCH), an enhanced physical downlink control channel (enhanced Physical Downlink Control Channel, hereinafter briefly referred to as E-PDCCH) is introduced in the R11 version. The E-PDCCH has two transmission modes, namely, localized transmission (Localized) with a consecutive frequency domain, and distributed transmission (Distributed) with a discrete frequency domain, which are applied to different scenarios. Generally, the localized transmission mode is mostly used in a scenario in which a base station can obtain more precise channel information fed back by the UE, and interference of a neighboring cell is not very intensive with the change of a subframe, and in this case, the base station selects, according to the CSI fed back by the UE, consecutive frequency resources with better quality to transmit the E-PDCCH for the terminal, and performs precoding/beam forming processing to improve the transmission performance. In a scenario in which the channel information cannot be obtained accurately, or the interference of the neighboring cell is intensive with the change of the subframe and is unpredictable, the distributed manner needs to be used for transmitting the E-PDCCH, namely, discrete frequency resources are used for transmission, thereby obtaining a diversity gain.

In the prior art, the UE needs to perform blind detection on signaling borne by the E-PDCCH, so as to receive the E-PDCCH that is sent for the UE. The detection on the E-PDCCH likewise needs to satisfy the requirement of not exceeding the maximum number of times that blind detection is performed. The number of times that blind detection is performed corresponds to the number of physical control channel candidates, and therefore when the number of physical control channel candidates is determined, the number of times that blind detection is performed is determined. However, in some cases, the UE is configured to detect an E-DPCCH of a localized mapping manner and an E-DPCCH of a distributed mapping manner at the same time. In this implementation scenario, if the UE detects the E-DPCCHs of the two manners, it may be caused that the number of times that blind detection is performed exceeds the maximum the times that blind detection is performed, thereby causing a long blind detection time of the UE, and influencing processing of other service data of the UE.

SUMMARY

Embodiments of the present invention provide a method for transmitting downlink control information, a network side device, and a user equipment, so as to implement transmission of downlink control information without increasing the maximum number of times that blind detection is performed.

In a first aspect, an embodiment of the present invention provides a method for transmitting downlink control information, including:
  selecting, by a network side device, a to-be-detected aggregation level of a physical control channel set in a transmission subframe;
  selecting the number of physical control channel candidates corresponding to the aggregation level according to the aggregation level; and
  sending, by the network side device, downlink control information on a physical control channel candidate corresponding to the selected number.

Further, the selecting a to-be-detected aggregation level of a physical control channel set in a transmission subframe includes:
  when the number of REs in a PRB pair of the physical control channel set that are available for a physical control channel is smaller than a threshold X, a minimum to-be-detected aggregation level of the physical control channel set is 2; and when the number of REs included in the PRB pair of the physical control channel set is greater than or equal to the threshold X, selecting the minimum to-be-detected aggregation level of the physical control channel set as 1;
  or when a transmission subframe type is a normal subframe with a normal CP length or a special subframe configured as 3, 4, or 8, and the number of REs in one PRB pair that are available for a physical control channel is smaller than X, selecting a minimum to-be-detected aggregation level of the physical control channel set as 2; and when the subframe is not the normal subframe with the normal CP length, and is not the special subframe configured as 3, 4, or 8, or the number of REs in one PRB pair that are available for a physical control channel is greater than X, selecting a minimum to-be-detected aggregation level of the physical control channel set as 1.

Further, the selecting the number of physical control channel candidates corresponding to the aggregation level according to the aggregation level includes:

the physical control channel set is divided into two sets, where one set corresponds to a localized mapping manner of the physical control channel, and the other set corresponds to a distributed mapping manner of the physical control channel; and respectively selecting the number of EPDCCH candidates corresponding to each aggregation level in the localized mapping manner and the distributed mapping manner.

Further, the respectively selecting the number of EPDCCH candidates corresponding to each aggregation level in the localized mapping manner and the distributed mapping manner includes:

for the aggregation level being 2, selecting, by the network side device, a sum of the number of EPDCCH candidates corresponding to the localized mapping manner and the number of EPDCCH candidates corresponding to the distributed mapping manner as 6;

for the aggregation level being 4, selecting, by the network side device, a sum of the number of EPDCCH candidates corresponding to the localized mapping manner and the number of EPDCCH candidates corresponding to the distributed mapping manner as 6;

for the aggregation level being 8, selecting, by the network side device, a sum of the number of EPDCCH candidates corresponding to the localized mapping manner and the number of EPDCCH candidates corresponding to the distributed mapping manner as 2; and for the aggregation level being 16, selecting, by the network side device, a sum of the number of EPDCCH candidates corresponding to the localized mapping manner and the number of EPDCCH candidates corresponding to the distributed mapping manner as 2.

Further, the respectively selecting the number of EPDCCH candidates corresponding to each aggregation level in the localized mapping manner and the distributed mapping manner includes:

for the localized mapping manner, selecting, by the network side device, both the number of EPDCCH candidates corresponding to the aggregation level 2 and the number of EPDCCH candidates corresponding to the aggregation level 4 as 6, and selecting both the number of EPDCCH candidates corresponding to the aggregation level 8 and the number of EPDCCH candidates corresponding to the aggregation level 16 as 0; and for the distributed mapping manner, selecting, by the network side device, both the number of EPDCCH candidates corresponding to the aggregation level 2 and the number of EPDCCH candidates corresponding to the aggregation level 4 as 0, and selecting both the number of EPDCCH candidates corresponding to the aggregation level 8 and the number of EPDCCH candidates corresponding to the aggregation level 16 as 2; or for the localized mapping manner, selecting, by the network side device, both the number of EPDCCH candidates corresponding to the aggregation level 2 and the number of EPDCCH candidates corresponding to the aggregation level 4 as 3, and selecting both the number of EPDCCH candidates corresponding to the aggregation level 8 and the number of EPDCCH candidates corresponding to the aggregation level 16 as 1; and for the distributed mapping manner, selecting, by the network side device, both the number of EPDCCH candidates corresponding to the aggregation level 2 and the number of EPDCCH candidates corresponding to the aggregation level 4 as 3, and selecting both the number of EPDCCH candidates corresponding to the aggregation level 8 and the number of EPDCCH candidates corresponding to the aggregation level 16 as 1; or for the localized mapping manner, selecting, by the network side device, the number of EPDCCH candidates corresponding to the aggregation level 2 as 6, and the number of EPDCCH candidates corresponding to the aggregation level 4, the number of EPDCCH candidates corresponding to the aggregation level 8, and the number of EPDCCH candidates corresponding to the aggregation level 16 as 0; and for the distributed mapping manner, selecting, by the network side device, the number of EPDCCH candidates corresponding to the aggregation level 2 as 0, selecting the number of EPDCCH candidates corresponding to the aggregation level 4 as 6, and selecting both the number of EPDCCH candidates corresponding to the aggregation level 8 and the number of EPDCCH candidates corresponding to the aggregation level 16 as 2.

Further, the respectively selecting the number of EPDCCH candidates corresponding to each aggregation level in the localized mapping manner and the distributed mapping manner includes:

for the distributed mapping manner, selecting, by the network side device, the number of EPDCCH candidates corresponding to the aggregation level 32 as 0.

Further, the respectively selecting the number of EPDCCH candidates corresponding to each aggregation level in the localized mapping manner and the distributed mapping manner includes:

for the aggregation level being 32 and the aggregation level being 2, selecting, by the network side device, a sum of the number of EPDCCH candidates corresponding to the aggregation level 2 in the localized mapping manner, the number of EPDCCH candidates corresponding to the aggregation level 32 in the distributed mapping manner, and the number of EPDCCH candidates corresponding to the aggregation level 2 in the distributed mapping manner as 6; or for the aggregation level being 32 and the aggregation level being 4, selecting, by the network side device, a sum of the number of EPDCCH candidates corresponding to the aggregation level 4 in the localized mapping manner, the number of EPDCCH candidates corresponding to the aggregation level 32 in the distributed mapping manner, and the number of EPDCCH candidates corresponding to the aggregation level 2 in the distributed mapping manner as 6; or for the aggregation level being 32 and the aggregation level being 8, selecting, by the network side device, a sum of the number of EPDCCH candidates corresponding to the aggregation level 8 in the localized mapping manner, the number of EPDCCH candidates corresponding to the aggregation level 32 in the distributed mapping manner, and the number of EPDCCH candidates corresponding to the aggregation level 8 in the distributed mapping manner as 2; or for the aggregation level being 32 and the aggregation level being 16, selecting, by the network side device, a sum of the number of EPDCCH candidates corresponding to the aggregation level 16 in the localized mapping manner, the number of EPDCCH candidates corresponding to the aggregation level 32 in the distributed mapping manner, and the number of EPDCCH candidates corresponding to the aggregation level 16 in the distributed mapping manner as 2.

Further, the respectively selecting the number of EPDCCH candidates corresponding to each aggregation level in the localized mapping manner and the distributed mapping manner includes:

for the aggregation level being 1, selecting, by the network side device, a sum of the number of EPDCCH candidates corresponding to the localized mapping manner and the number of EPDCCH candidates corresponding to the distributed mapping manner as 6; and for the aggregation level being 2, selecting, by the network side device, a sum of the number of EPDCCH candidates corresponding to the localized mapping manner and the number of EPDCCH candidates corresponding to the distributed mapping manner as 6; and for the aggregation level being 4, selecting, by the network side device, a sum of the number of EPDCCH candidates corresponding to the localized mapping manner and the number of EPDCCH candidates corresponding to the distributed mapping manner as 2; and for the aggregation level being 8, selecting, by the network side device, a sum of the number of EPDCCH candidates corresponding to the localized mapping manner and the number of EPDCCH candidates corresponding to the distributed mapping manner as 2.

Further, the respectively selecting the number of EPDCCH candidates corresponding to each aggregation level in the localized mapping manner and the distributed mapping manner includes:

for the localized mapping manner, selecting, by the network side device, both the number of EPDCCH candidates corresponding to the aggregation level 1 and the number of EPDCCH candidates corresponding to the aggregation level 2 as 6, and selecting both the number of EPDCCH candidates corresponding to the aggregation level 4 and the number of EPDCCH candidates corresponding to the aggregation level 8 as 0; and for the distributed mapping manner, selecting, by the network side device, both the number of EPDCCH candidates corresponding to the aggregation level 1 and the number of EPDCCH candidates corresponding to the aggregation level 2 as 0, and selecting both the number of EPDCCH candidates corresponding to the aggregation level 4 and the number of EPDCCH candidates corresponding to the aggregation level 8 as 2; or for the localized mapping manner, selecting, by the network side device, both the number of EPDCCH candidates corresponding to the aggregation level 1 and the number of EPDCCH candidates corresponding to the aggregation level 2 as 3, and selecting both the number of EPDCCH candidates corresponding to the aggregation level 4 and the number of EPDCCH candidates corresponding to the aggregation level 8 as 1; and for the distributed mapping manner, selecting, by the network side device, both the number of EPDCCH candidates corresponding to the aggregation level 1 and the number of EPDCCH candidates corresponding to the aggregation level 2 as 3, and selecting both the number of EPDCCH candidates corresponding to the aggregation level 4 and the number of EPDCCH candidates corresponding to the aggregation level 8 as 1; or for the localized mapping manner, selecting, by the network side device, the number of EPDCCH candidates corresponding to the aggregation level 1 as 6, and the number of EPDCCH candidates corresponding to the aggregation level 2, the number of EPDCCH candidates corresponding to the aggregation level 4, and the number of EPDCCH candidates corresponding to the aggregation level 8 as 0; and for the distributed mapping manner, selecting, by the network side device, the number of EPDCCH candidates corresponding to the aggregation level 1 as 0, selecting the number of EPDCCH candidates corresponding to the aggregation level 2 as 6, and selecting both the number of EPDCCH candidates corresponding to the aggregation level 4 and the number of EPDCCH candidates corresponding to the aggregation level 8 as 2.

Further, the respectively selecting the number of EPDCCH candidates corresponding to each aggregation level in the localized mapping manner and the distributed mapping manner includes:

for the distributed mapping manner, selecting, by the network side device, the number of EPDCCH candidates corresponding to the aggregation level 16 as 0.

Further, the respectively selecting the number of EPDCCH candidates corresponding to each aggregation level in the localized mapping manner and the distributed mapping manner includes:

for the aggregation level being 16 and the aggregation level being 1, selecting, by the network side device, a sum of the number of EPDCCH candidates corresponding to the aggregation level 16 in the localized mapping manner, the number of EPDCCH candidates corresponding to the aggregation level 1 in the localized mapping manner, the number of EPDCCH candidates corresponding to the aggregation level 16 in the distributed mapping manner, and the number of EPDCCH candidates corresponding to the aggregation level 1 in the distributed mapping manner as 6; or for the aggregation level being 16 and the aggregation level being 2, selecting, by the network side device, a sum of the number of EPDCCH candidates corresponding to the aggregation level 16 in the localized mapping manner, the number of EPDCCH candidates corresponding to the aggregation level 2 in the localized mapping manner, the number of EPDCCH candidates corresponding to the aggregation level 16 in the distributed mapping manner, and the number of EPDCCH candidates corresponding to the aggregation level 2 in the distributed mapping manner as 6; or for the aggregation level being 16 and the aggregation level being 4, selecting, by the network side device, a sum of the number of EPDCCH candidates corresponding to the aggregation level 16 in the localized mapping manner, the number of EPDCCH candidates corresponding to the aggregation level 4 in the localized mapping manner, the number of EPDCCH candidates corresponding to the aggregation level 16 in the distributed mapping manner, and the number of EPDCCH candidates corresponding to the aggregation level 4 in the distributed mapping manner as 2; or for the aggregation level being 16 and the aggregation level being 8, selecting, by the network side device, a sum of the number of EPDCCH candidates corresponding to the aggregation level 16 in the localized mapping manner, the number of EPDCCH candidates corresponding to the aggregation level 8 in the localized mapping manner, the number of EPDCCH candidates corresponding to the aggregation level 16 in the distributed mapping manner, and the number of EPDCCH candidates corresponding to the aggregation level 8 in the distributed mapping manner as 2.

Further, the respectively selecting the number of EPDCCH candidates corresponding to each aggregation level in the localized mapping manner and the distributed mapping manner includes:

for the localized mapping manner, selecting, by the network side device, the number of EPDCCH candidates corresponding to the aggregation level 2 as 6, selecting the number of EPDCCH candidates corresponding to the aggregation level 4 as 2, and selecting the number of EPDCCH candidates corresponding to the aggregation level 8 as 2; and for the distributed mapping manner, choosing, by the network side device, to allocate 6 EPDCCH candidates to at least one aggregation level; or for the localized mapping manner, selecting, by the network side device, the number of EPDCCH candidates corresponding to the aggregation level 2 as 6, selecting the number of EPDCCH candidates corresponding to the aggregation level 4 as 6, and selecting the number of EPDCCH candidates corresponding to the aggregation level 8 as 2; and for the distributed mapping manner, choosing, by the network side device, to allocate 2 EPDCCH candidates to at least one aggregation level; or for the localized mapping manner, selecting, by the network side device, the number of EPDCCH candidates corresponding to the aggregation level 1 as 6, selecting the number of EPDCCH candidates corresponding to the aggregation level 2 as 2, and selecting the number of EPDCCH candidates corresponding to the aggregation level 4 as 2; and for the distributed mapping manner, choosing, by the network side device, to allocate 6 EPDCCH candidates to at least one aggregation level; or for the localized mapping manner, selecting, by the network side device, the number of EPDCCH candidates corresponding to the aggregation level 1 as 6, selecting the number of EPDCCH candidates corresponding to the aggregation level 2 as 6, and selecting the number of EPDCCH candidates corresponding to the aggregation level 4 as 2; and for the distributed mapping manner, choosing, by the network side device, to allocate 2 EPDCCH candidates to at least one aggregation level.

Further, the selecting the number of physical control channel candidates corresponding to the aggregation level according to the aggregation level includes:

selecting the number of physical control channel candidates corresponding to the to-be-detected aggregation level of the physical control channel set.

Further, the selecting the number of physical control channel candidates corresponding to the to-be-detected aggregation level of the physical control channel set includes when the physical control channel set is in a localized mapping manner, for a same aggregation level, the number of physical control channel candidates corresponding to the aggregation level is selected according to the number of PRBs of the physical control channel set; and when the physical control channel set is in a distributed mapping manner, for a same aggregation level, selecting the number of physical control channel candidates corresponding to the aggregation level according to the number of PRBs of the physical control channel set.

Further, the selecting the number of physical control channel candidates corresponding to the to-be-detected aggregation level of the physical control channel set includes when the physical control channel set is in the localized mapping manner, for the same aggregation level, selecting the number of physical control channel candidates corresponding to the aggregation level according to the number of PRBs of the physical control channel set, where the number of physical control channel candidates is in direct proportion to the number of PRBs; and when the physical control channel set is in the distributed mapping manner, for the same aggregation level, selecting the number of physical control channel candidates corresponding to the aggregation level according to the number of PRBs of the physical control channel set, where the number of physical control channel candidates is in direct proportion to the number of PRBs.

Further, when the physical control channel set is in the distributed mapping manner, if the number N of PRBs included in the physical control channel set is 8, the number of physical control channel candidates corresponding to the aggregation level 1 in the physical control channel set is 0; and when the physical control channel set is in the distributed mapping manner, if the number N of PRBs included in the physical control channel set is 16, the numbers of physical control channel candidates corresponding to the aggregation levels 1 and 2 in the physical control channel set are 0.

Further, the sending downlink control information on the control channel candidate of the control channel set includes:

sending, by the network side device on an EPDCCH candidate corresponding to the distributed mapping manner, downlink control information scrambled by using an SI-RNTI or an RA-RNTI, and sending, on an EPDCCH candidate corresponding to the localized mapping manner, downlink control information scrambled by using another RNTI except the SI-RNTI and the RA-RNTI.

Further, the sending downlink control information on the control channel candidate of the control channel set includes:

sending, by the network side device on an EPDCCH candidate corresponding to one of the localized mapping manner and the distributed mapping manner, downlink control information including a cross-carrier scheduling instruction, and sending, on an EPDCCH candidate corresponding to the other manner, downlink control information not including the cross-carrier scheduling instruction.

Further, the sending downlink control information on the control channel candidate of the control channel set includes:

sending, by the network side device, downlink control information with format 0 and/or format 1A through an EPDCCH of the EPDCCH candidates corresponding to the distributed mapping manner, and sending downlink control information with format 2C through an EPDCCH of the EPDCCH candidates corresponding to the localized manner; and selecting, by the network side device, the maximum number of times that blind detection is performed corresponding to the distributed mapping manner as 16, and the maximum number of times that blind detection is performed corresponding to the localized mapping manner as 16.

Further, the sending downlink control information on the control channel candidate of the control channel set includes:

sending, by the network side device, an EPDCCH with an aggregation level greater than or equal to a set value on an EPDCCH candidate corresponding to the distributed mapping manner, and sending an EPDCCH with an aggregation level smaller than the set value on an EPDCCH candidate corresponding to the localized mapping manner.

In a second aspect, an embodiment of the present invention provides a method for transmitting downlink control information, including:

determining, by a user equipment, a to-be-detected aggregation level of a physical control channel set in a transmission subframe;

determining the number of physical control channel candidates corresponding to the aggregation level according to the aggregation level; and receiving, by the user equipment, downlink control information on a physical control channel candidate corresponding to the determined number.

Further, the determining a to-be-detected aggregation level of a physical control channel set in a transmission subframe includes:

when the number of REs in a PRB pair of the physical control channel set that are available for a physical control channel is smaller than a threshold X, a minimum to-be-detected aggregation level of the physical control channel is 2; and when the number of REs included in the PRB pair of the physical control channel set is greater than or equal to the threshold X, determining the minimum to-be-detected aggregation level of the physical control channel set as 1; or when a transmission subframe type is a normal subframe with a normal CP length or a special subframe configured as 3, 4, or 8, and the number of REs in one PRB pair that are available for a physical control channel is smaller than X, determining a minimum to-be-detected aggregation level of the physical control channel set as 2; and when the subframe is not the normal subframe with the normal CP length, and is not the special subframe configured as 3, 4, or 8, or the number of REs in one PRB pair that are available for a physical control channel is greater than X, determining a minimum to-be-detected aggregation level of the physical control channel set as 1, the minimum to-be-detected aggregation level of the physical control channel set as 1.

Further, the determining the number of physical control channel candidates corresponding to the aggregation level according to the aggregation level includes:

the physical control channel set is divided into two sets, where one set corresponds to a localized mapping manner of the physical control channel, and the other set corresponds to a distributed mapping manner of the physical control channel; and respectively determining the number of EPDCCH candidates corresponding to each aggregation level in the localized mapping manner and the distributed mapping manner.

Further, the respectively determining the number of EPDCCH candidates corresponding to each aggregation level in the localized mapping manner and the distributed mapping manner includes:

for the aggregation level being 2, determining, by the user equipment, a sum of the number of EPDCCH candidates corresponding to the localized mapping manner and the number of EPDCCH candidates corresponding to the distributed mapping manner as 6;

for the aggregation level being 4, determining, by the user equipment, a sum of the number of EPDCCH candidates corresponding to the localized mapping manner and the number of EPDCCH candidates corresponding to the distributed mapping manner as 6;

for the aggregation level being 8, determining, by the user equipment, a sum of the number of EPDCCH candidates corresponding to the localized mapping manner and the number of EPDCCH candidates corresponding to the distributed mapping manner as 2; and for the aggregation level being 16, determining, by the user equipment, a sum of the number of EPDCCH candidates corresponding to the localized mapping manner and the number of EPDCCH candidates corresponding to the distributed mapping manner as 2.

Further, the respectively determining the number of EPDCCH candidates corresponding to each aggregation level in the localized mapping manner and the distributed mapping manner includes:

for the localized mapping manner, determining, by the user equipment, both the number of EPDCCH candidates corresponding to the aggregation level 2 and the number of EPDCCH candidates corresponding to the aggregation level 4 as 6, and determining both the number of EPDCCH candidates corresponding to the aggregation level 8 and the number of EPDCCH candidates corresponding to the aggregation level 16 as 0; and for the distributed mapping manner, determining, by the user equipment, both the number of EPDCCH candidates corresponding to the aggregation level 2 and the number of EPDCCH candidates corresponding to the aggregation level 4 as 0, and determining both the number of EPDCCH candidates corresponding to the aggregation level 8 and the number of EPDCCH candidates corresponding to the aggregation level 16 as 2; or for the localized mapping manner, determining, by the user equipment, both the number of EPDCCH candidates corresponding to the aggregation level 2 and the number of EPDCCH candidates corresponding to the aggregation level 4 as 3, and determining both the number of EPDCCH candidates corresponding to the aggregation level 8 and the number of EPDCCH candidates corresponding to the aggregation level 16 as 1; and for the distributed mapping manner, determining, by the user equipment, both the number of EPDCCH candidates corresponding to the aggregation level 2 and the number of EPDCCH candidates corresponding to the aggregation level 4 as 3, and determining both the number of EPDCCH candidates corresponding to the aggregation level 8 and the number of EPDCCH candidates corresponding to the aggregation level 16 as 1; or for the localized mapping manner, determining, by the user equipment, the number of EPDCCH candidates corresponding to the aggregation level 2 as 6, and the number of EPDCCH candidates corresponding to the aggregation level 4, the number of EPDCCH candidates corresponding to the aggregation level 8, and the number of EPDCCH candidates corresponding to the aggregation level 16 as 0; and for the distributed mapping manner, determining, by the user equipment, the number of EPDCCH candidates corresponding to the aggregation level 2 as 0, determining the number of EPDCCH candidates corresponding to the aggregation level 4 as 6, and determining both the number of EPDCCH candidates corresponding to the aggregation level 8 and the number of EPDCCH candidates corresponding to the aggregation level 16 as 2.

Further, the respectively determining the number of EPDCCH candidates corresponding to each aggregation level in the localized mapping manner and the distributed mapping manner includes:

for the distributed mapping manner, determining, by the user equipment, the number of EPDCCH candidates corresponding to the aggregation level 32 as 0.

Further, the respectively determining the number of EPDCCH candidates corresponding to each aggregation level in the localized mapping manner and the distributed mapping manner includes:

for the aggregation level being 32 and the aggregation level being 2, determining, by the user equipment, a sum of the number of EPDCCH candidates corresponding to the aggregation level 2 in the localized mapping manner, the number of EPDCCH candidates corresponding to the aggregation level 32 in the distributed mapping manner, and the number of EPDCCH candidates corresponding to the aggregation level 2 in the distributed mapping manner as 6; or for the aggregation level being 32 and the aggregation level being 4, determining, by the user equipment, a sum of the number of EPDCCH candidates corresponding to the aggregation level 4 in the localized mapping manner, the number of EPDCCH candidates corresponding to the aggregation level 32 in the distributed mapping manner, and the number of EPDCCH candidates corresponding to the aggregation level 2 in the distributed mapping manner as 6; or for the aggregation level being 32 and the aggregation level being 8, determining, by the user equipment, a sum of the number of EPDCCH candidates corresponding to the aggregation level 8 in the localized mapping manner, the number of EPDCCH candidates corresponding to the aggregation level 32 in the distributed mapping manner, and the number of EPDCCH candidates corresponding to the aggregation level 8 in the distributed mapping manner as 2; or for the aggregation level being 32 and the aggregation level being 16, determining, by the user equipment, a sum of the number of EPDCCH candidates corresponding to the aggregation level 16 in the localized mapping manner, the number of EPDCCH candidates corresponding to the aggregation level 32 in the distributed mapping manner, and the number of EPDCCH candidates corresponding to the aggregation level 16 in the distributed mapping manner as 2.

Further, the respectively determining the number of EPDCCH candidates corresponding to each aggregation level in the localized mapping manner and the distributed mapping manner includes:

for the aggregation level being 1, determining, by the user equipment, a sum of the number of EPDCCH candidates corresponding to the localized mapping manner and the number of EPDCCH candidates corresponding to the distributed mapping manner as 6;

for the aggregation level being 2, determining, by the user equipment, a sum of the number of EPDCCH candidates corresponding to the localized mapping manner and the number of EPDCCH candidates corresponding to the distributed mapping manner as 6;

for the aggregation level being 4, determining, by the user equipment, a sum of the number of EPDCCH candidates corresponding to the localized mapping manner and the number of EPDCCH candidates corresponding to the distributed mapping manner as 2; and for the aggregation level being 8, determining, by the user equipment, a sum of the number of EPDCCH candidates corresponding to the localized mapping manner and the number of EPDCCH candidates corresponding to the distributed mapping manner as 2.

Further, the respectively determining the number of EPDCCH candidates corresponding to each aggregation level in the localized mapping manner and the distributed mapping manner includes:

for the localized mapping manner, determining, by the user equipment, both the number of EPDCCH candidates corresponding to the aggregation level 1 and the number of EPDCCH candidates corresponding to the aggregation level 2 as 6, and determining both the number of EPDCCH candidates corresponding to the aggregation level 4 and the number of EPDCCH candidates corresponding to the aggregation level 8 as 0; and for the distributed mapping manner, determining, by the user equipment, both the number of EPDCCH candidates corresponding to the aggregation level 1 and the number of EPDCCH candidates corresponding to the aggregation level 2 as 0, and determining both the number of EPDCCH candidates corresponding to the aggregation level 4 and the number of EPDCCH candidates corresponding to the aggregation level 8 as 2; or for the localized mapping manner, determining, by the user equipment, both the number of EPDCCH candidates corresponding to the aggregation level 1 and the number of EPDCCH candidates corresponding to the aggregation level 2 as 3, and determining both the number of EPDCCH candidates corresponding to the aggregation level 4 and the number of EPDCCH candidates corresponding to the aggregation level 8 as 1; and for the distributed mapping manner, determining, by the user equipment, both the number of EPDCCH candidates corresponding to the aggregation level 1 and the number of EPDCCH candidates corresponding to the aggregation level 2 as 3, and determining both the number of EPDCCH candidates corresponding to the aggregation level 4 and the number of EPDCCH candidates corresponding to the aggregation level 8 as 1; or for the localized mapping manner, determining, by the user equipment, the number of EPDCCH candidates corresponding to the aggregation level 1 as 6, and the number of EPDCCH candidates corresponding to the aggregation level 2, the number of EPDCCH candidates corresponding to the aggregation level 4, and the number of EPDCCH candidates corresponding to the aggregation level 8 as 0; and for the distributed mapping manner, determining, by the user equipment, the number of EPDCCH candidates corresponding to the aggregation level 1 as 0, determining the number of EPDCCH candidates corresponding to the aggregation level 2 as 6, and determining both the number of EPDCCH candidates corresponding to the aggregation level 4 and the number of EPDCCH candidates corresponding to the aggregation level 8 as 2.

Further, the respectively determining the number of EPDCCH candidates corresponding to each aggregation level in the localized mapping manner and the distributed mapping manner includes:

for the distributed mapping manner, determining, by the user equipment, the number of EPDCCH candidates corresponding to the aggregation level 16 as 0.

Further, the respectively determining the number of EPDCCH candidates corresponding to each aggregation level in the localized mapping manner and the distributed mapping manner includes:

for the aggregation level being 16 and the aggregation level being 1, determining, by the user equipment, a sum of the number of EPDCCH candidates corresponding to the aggregation level 16 in the localized mapping manner, the number of EPDCCH candidates corresponding to the aggregation level 1 in the localized mapping manner, the number of EPDCCH candidates corresponding to the aggregation level 16 in the distributed mapping manner, and the number of EPDCCH candidates corresponding to the aggregation level 1 in the distributed mapping manner as 6; or for the aggregation level being 16 and the aggregation level being 2, determining, by the user equipment, a sum of the number of EPDCCH candidates corresponding to the aggregation level 16 in the localized mapping manner, the number of EPDCCH candidates corresponding to the aggregation level 2 in the localized mapping manner, the number of EPDCCH candidates corresponding to the aggregation level 16 in the distributed mapping manner, and the number of EPDCCH candidates corresponding to the aggregation level 2 in the distributed mapping manner as 6; or for the aggregation level being 16 and the aggregation level being 4, determining, by the user equipment, a sum of the number of EPDCCH candidates corresponding to the aggregation level 16 in the localized mapping manner, the number of EPDCCH candidates corresponding to the aggregation level 4 in the localized mapping manner, the number of EPDCCH candidates corresponding to the aggregation level 16 in the distributed mapping manner, and the number of EPDCCH candidates corresponding to the aggregation level 4 in the distributed mapping manner as 2; or for the aggregation level being 16 and the aggregation level being 8, determining, by the user equipment, a sum of the number of EPDCCH candidates corresponding to the aggregation level 16 in the localized mapping manner, the number of EPDCCH candidates corresponding to the aggregation level 8 in the localized mapping manner, the number of EPDCCH candidates corresponding to the aggregation level 16 in the distributed mapping manner, and the number of EPDCCH candidates corresponding to the aggregation level 8 in the distributed mapping manner as 2.

Further, the respectively determining the number of EPDCCH candidates corresponding to each aggregation level in the localized mapping manner and the distributed mapping manner includes:

for the localized mapping manner, determining, by the user equipment, the number of EPDCCH candidates corresponding to the aggregation level 2 as 6, determining the number of EPDCCH candidates corresponding to the aggregation level 4 as 2, and determining the number of EPDCCH candidates corresponding to the aggregation level 8 as 2; and for the distributed mapping manner, determining, by the user equipment, to allocate 6 EPDCCH candidates to at least one aggregation level; or for the localized mapping manner, determining, by the user equipment, the number of EPDCCH candidates corresponding to the aggregation level 2 as 6, determining the number of EPDCCH candidates corresponding to the aggregation level 4 as 6, and determining the number of EPDCCH candidates corresponding to the aggregation level 8 as 2; and for the distributed mapping manner, determining, by the user equipment, to allocate 2 EPDCCH candidates to at least one aggregation level; or for the localized mapping manner, determining, by the user equipment, the number of EPDCCH candidates corresponding to the aggregation level 1 as 6, determining the number of EPDCCH candidates corresponding to the aggregation level 2 as 2, and determining the number of EPDCCH candidates corresponding to the aggregation level 4 as 2; and for the distributed mapping manner, determining, by the user equipment, to allocate 6 EPDCCH candidates to at least one aggregation level; or for the localized mapping manner, determining, by the user equipment, the number of EPDCCH candidates corresponding to the aggregation level 1 as 6, determining the number of EPDCCH candidates corresponding to the aggregation level 2 as 6, and determining the number of EPDCCH candidates corresponding to the aggregation level 4 as 2; and for the distributed mapping manner, determining, by the user equipment, to allocate 2 EPDCCH candidates to at least one aggregation level.

Further, the determining the number of physical control channel candidates corresponding to the aggregation level according to the aggregation level includes:

determining the number of physical control channel candidates corresponding to the to-be-detected aggregation level of the physical control channel set.

Further, the determining the number of physical control channel candidates corresponding to the to-be-detected aggregation level of the physical control channel set includes when the physical control channel set is in a localized mapping manner, for a same aggregation level, the number of physical control channel candidates corresponding to the aggregation level is determined according to the number of PRBs of the physical control channel set; and when the physical control channel set is in a distributed mapping manner, for a same aggregation level, determining the number of physical control channel candidates corresponding to the aggregation level according to the number of PRBs of the physical control channel set.

Further, the determining the number of physical control channel candidates corresponding to the to-be-detected aggregation level of the physical control channel set includes when the physical control channel set is in the localized mapping manner, for the same aggregation level, determining the number of physical control channel candidates corresponding to the aggregation level according to the number of PRBs of the physical control channel set, where the number of physical control channel candidates is in direct proportion to the number of PRBs; and when the physical control channel set is in the distributed mapping manner, for the same aggregation level, determining the number of physical control channel candidates corresponding to the aggregation level according to the number of PRBs of the physical control channel set, where the number of physical control channel candidates is in direct proportion to the number of PRBs.

Further, when the physical control channel set is in the distributed mapping manner, if the number N of PRBs included in the physical control channel set is 8, the number of physical control channel candidates corresponding to the aggregation level 1 in the physical control channel set is 0; and when the physical control channel set is in the distributed mapping manner, if the number N of PRBs included in the physical control channel set is 16, the numbers of physical control channel candidates corresponding to the aggregation levels 1 and 2 in the physical control channel set are 0.

Further, the receiving downlink control information on the control channel candidate of the control channel set includes:

receiving, by the user equipment on an EPDCCH candidate corresponding to the distributed mapping manner, downlink control information scrambled by using an SI-RNTI or an RA-RNTI, and receiving, on an EPDCCH candidate corresponding to the localized mapping manner, downlink control information scrambled by using another RNTI except the SI-RNTI and the RA-RNTI.

Further, the receiving downlink control information on the control channel candidate of the control channel set includes:

receiving, by the user equipment on an EPDCCH candidate corresponding to one of the localized mapping manner and the distributed mapping manner, downlink control information including a cross-carrier scheduling instruction, and receiving, on an EPDCCH candidate corresponding to the other manner, downlink control information not including the cross-carrier scheduling instruction.

Further, the receiving downlink control information on the control channel candidate of the control channel set includes:

receiving, by the user equipment, downlink control information with format 0 and/or format 1A through an EPDCCH of the EPDCCH candidates corresponding to the distributed mapping manner, and receiving downlink control information with format 2C through an EPDCCH of the EPDCCH candidates corresponding to the localized manner; and determining, by the user equipment, the maximum number of times that blind detection is performed corresponding to the distributed mapping manner as 16, and the maximum number of times that blind detection is performed corresponding to the localized mapping manner as 16.

Further, the receiving downlink control information on the control channel candidate of the control channel set includes:

receiving, by the user equipment, an EPDCCH with an aggregation level greater than or equal to a set value on an EPDCCH candidate corresponding to the distributed mapping manner, and receiving an EPDCCH with an aggregation level smaller than the set value on an EPDCCH candidate corresponding to the localized mapping manner.

In a third aspect, an embodiment of the present invention provides a network side device, including:

a selecting module, configured to select a to-be-detected aggregation level of a physical control channel set in a transmission subframe, and select the number of physical control channel candidates corresponding to the aggregation level according to the aggregation level; and a sending module, configured to send downlink control information on a physical control channel candidate corresponding to the selected number.

Further, the selecting module is specifically configured to: when the number of REs in a PRB pair of the physical control channel set that are available for a physical control channel is smaller than a threshold X, a minimum to-be-detected aggregation level of the physical control channel is 2; and when the number of REs included in the PRB pair of the physical control channel set is greater than or equal to the threshold X, select the minimum to-be-detected aggregation level of the physical control channel set as 1; or when a transmission subframe type is a normal subframe with a normal CP length or a special subframe configured as 3, 4, or 8, and the number of REs in one PRB pair that are available for a physical control channel is smaller than X, select a minimum to-be-detected aggregation level of the physical control channel set as 2; and when the subframe is not the normal subframe with the normal CP length, and is not the special subframe configured as 3, 4, or 8, or the number of REs in one PRB pair that are available for a physical control channel is greater than X, select a minimum to-be-detected aggregation level of the physical control channel set as 1, the minimum to-be-detected aggregation level of the physical control channel set as 1.

Further, the selecting module is specifically configured to divide the physical control channel set into two sets, where one set corresponds to a localized mapping manner of the physical control channel, and the other set corresponds to a distributed mapping manner of the physical control channel; and respectively select the number of EPDCCH candidates corresponding to each aggregation level in the localized mapping manner and the distributed mapping manner.

Further, for the aggregation level being 2, the selecting module selects a sum of the number of EPDCCH candidates corresponding to the localized mapping manner and the number of EPDCCH candidates corresponding to the distributed mapping manner as 6;

for the aggregation level being 4, the selecting module selects a sum of the number of EPDCCH candidates corresponding to the localized mapping manner and the number of EPDCCH candidates corresponding to the distributed mapping manner as 6;

for the aggregation level being 8, the selecting module selects a sum of the number of EPDCCH candidates corresponding to the localized mapping manner and the number of EPDCCH candidates corresponding to the distributed mapping manner as 2; and for the aggregation level being 16, the selecting module selects a sum of the number of EPDCCH candidates corresponding to the localized mapping manner and the number of EPDCCH candidates corresponding to the distributed mapping manner as 2.

Further, for the localized mapping manner, the selecting module selects both the number of EPDCCH candidates corresponding to the aggregation level 2 and the number of EPDCCH candidates corresponding to the aggregation level 4 as 6, and selects both the number of EPDCCH candidates corresponding to the aggregation level 8 and the number of EPDCCH candidates corresponding to the aggregation level 16 as 0; and for the distributed mapping manner, the selecting module selects both the number of EPDCCH candidates corresponding to the aggregation level 2 and the number of EPDCCH candidates corresponding to the aggregation level 4 as 0, and selects both the number of EPDCCH candidates corresponding to the aggregation level 8 and the number of EPDCCH candidates corresponding to the aggregation level 16 as 2; or for the localized mapping manner, the selecting module selects both the number of EPDCCH candidates corresponding to the aggregation level 2 and the number of EPDCCH candidates corresponding to the aggregation level 4 as 3, and selects both the number of EPDCCH candidates corresponding to the aggregation level 8 and the number of EPDCCH candidates corresponding to the aggregation level 16 as 1; and for the distributed mapping manner, the selecting module selects both the number of EPDCCH candidates corresponding to the aggregation level 2 and the number of EPDCCH candidates corresponding to the aggregation level 4 as 3, and selects both the number of EPDCCH candidates corresponding to the aggregation level 8 and the number of EPDCCH candidates corresponding to the aggregation level 16 as 1; or for the localized mapping manner, the selecting module selects the number of EPDCCH candidates corresponding to the aggregation level 2 as 6, and the number of EPDCCH candidates corresponding to the aggregation level 4, the number of EPDCCH candidates corresponding to the aggregation level 8, and the number of EPDCCH candidates corresponding to the aggregation level 16 as 0; and for the distributed mapping manner, the selecting module selects the number of EPDCCH candidates corresponding to the aggregation level 2 as 0, selects the number of EPDCCH candidates corresponding to the aggregation level 4 as 6, and selects both the number of EPDCCH candidates corresponding to the aggregation level 8 and the number of EPDCCH candidates corresponding to the aggregation level 16 as 2.

Further, for the distributed mapping manner, the selecting module selects the number of EPDCCH candidates corresponding to the aggregation level 32 as 0.

Further, for the aggregation level being 32 and the aggregation level being 2, the selecting module selects a sum of the number of EPDCCH candidates corresponding to the aggregation level 2 in the localized mapping manner, the number of EPDCCH candidates corresponding to the aggregation level 32 in the distributed mapping manner, and the number of EPDCCH candidates corresponding to the aggregation level 2 in the distributed mapping manner as 6; or for the aggregation level being 32 and the aggregation level being 4, the selecting module selects a sum of the number of EPDCCH candidates corresponding to the aggregation level 4 in the localized mapping manner, the number of EPDCCH candidates corresponding to the aggregation level 32 in the distributed mapping manner, and the number of EPDCCH candidates corresponding to the aggregation level 2 in the distributed mapping manner as 6; or for the aggregation level being 32 and the aggregation level being 8, the selecting module selects a sum of the number of EPDCCH candidates corresponding to the aggregation level 8 in the localized mapping manner, the number of EPDCCH candidates corresponding to the aggregation level 32 in the distributed mapping manner, and the number of EPDCCH candidates corresponding to the aggregation level 8 in the distributed mapping manner as 2; or for the aggregation level being 32 and the aggregation level being 16, the selecting module selects a sum of the number of EPDCCH candidates corresponding to the aggregation level 16 in the localized mapping manner, the number of EPDCCH candidates corresponding to the aggregation level 32 in the distributed mapping manner, and the number of EPDCCH candidates corresponding to the aggregation level 16 in the distributed mapping manner as 2.

Further, for the aggregation level being 1, the selecting module selects a sum of the number of EPDCCH candidates corresponding to the localized mapping manner and the number of EPDCCH candidates corresponding to the distributed mapping manner as 6;

for the aggregation level being 2, the selecting module selects a sum of the number of EPDCCH candidates corresponding to the localized mapping manner and the number of EPDCCH candidates corresponding to the distributed mapping manner as 6;

for the aggregation level being 4, the selecting module selects a sum of the number of EPDCCH candidates corresponding to the localized mapping manner and the number of EPDCCH candidates corresponding to the distributed mapping manner as 2; and for the aggregation level being 8, the selecting module selects a sum of the number of EPDCCH candidates corresponding to the localized mapping manner and the number of EPDCCH candidates corresponding to the distributed mapping manner as 2.

Further, for the localized mapping manner, the selecting module selects both the number of EPDCCH candidates corresponding to the aggregation level 1 and the number of EPDCCH candidates corresponding to the aggregation level 2 as 6, and selects both the number of EPDCCH candidates corresponding to the aggregation level 4 and the number of EPDCCH candidates corresponding to the aggregation level 8 as 0; and for the distributed mapping manner, the selecting module selects both the number of EPDCCH candidates corresponding to the aggregation level 1 and the number of EPDCCH candidates corresponding to the aggregation level 2 as 0, and selects both the number of EPDCCH candidates corresponding to the aggregation level 4 and the number of EPDCCH candidates corresponding to the aggregation level 8 as 2; or for the localized mapping manner, the selecting module selects both the number of EPDCCH candidates corresponding to the aggregation level 1 and the number of EPDCCH candidates corresponding to the aggregation level 2 as 3, and selects both the number of EPDCCH candidates corresponding to the aggregation level 4 and the number of EPDCCH candidates corresponding to the aggregation level 8 as 1; and for the distributed mapping manner, the selecting module selects both the number of EPDCCH candidates corresponding to the aggregation level 1 and the number of EPDCCH candidates corresponding to the aggregation level 2 as 3, and selects both the number of EPDCCH candidates corresponding to the aggregation level 4 and the number of EPDCCH candidates corresponding to the aggregation level 8 as 1; or for the localized mapping manner, the selecting module selects the number of EPDCCH candidates corresponding to the aggregation level 1 as 6, and the number of EPDCCH candidates corresponding to the aggregation level 2, the number of EPDCCH candidates corresponding to the aggregation level 4, and the number of EPDCCH candidates corresponding to the aggregation level 8 as 0; and for the distributed mapping manner, the selecting module selects the number of EPDCCH candidates corresponding to the aggregation level 1 as 0, selects the number of EPDCCH candidates corresponding to the aggregation level 2 as 6, and selects both the number of EPDCCH candidates corresponding to the aggregation level 4 and the number of EPDCCH candidates corresponding to the aggregation level 8 as 2.

Further, for the distributed mapping manner, the selecting module selects the number of EPDCCH candidates corresponding to the aggregation level 16 as 0.

Further, for the aggregation level being 16 and the aggregation level being 1, the selecting module selects a sum of the number of EPDCCH candidates corresponding to the aggregation level 16 in the localized mapping manner, the number of EPDCCH candidates corresponding to the aggregation level 1 in the localized mapping manner, the number of EPDCCH candidates corresponding to the aggregation level 16 in the distributed mapping manner, and the number of EPDCCH candidates corresponding to the aggregation level 1 in the distributed mapping manner as 6; or for the aggregation level being 16 and the aggregation level being 2, the selecting module selects a sum of the number of EPDCCH candidates corresponding to the aggregation level 16 in the localized mapping manner, the number of EPDCCH candidates corresponding to the aggregation level 2 in the localized mapping manner, the number of EPDCCH candidates corresponding to the aggregation level 16 in the distributed mapping manner, and the number of EPDCCH candidates corresponding to the aggregation level 2 in the distributed mapping manner as 6; or for the aggregation level being 16 and the aggregation level being 4, the selecting module selects a sum of the number of EPDCCH candidates corresponding to the aggregation level 16 in the localized mapping manner, the number of EPDCCH candidates corresponding to the aggregation level 4 in the localized mapping manner, the number of EPDCCH candidates corresponding to the aggregation level 16 in the distributed mapping manner, and the number of EPDCCH candidates corresponding to the aggregation level 4 in the distributed mapping manner as 2; or for the aggregation level being 16 and the aggregation level being 8, the selecting module selects a sum of the number of EPDCCH candidates corresponding to the aggregation level 16 in the localized mapping manner, the number of EPDCCH candidates corresponding to the aggregation level 8 in the localized mapping manner, the number of EPDCCH candidates corresponding to the aggregation level 16 in the distributed mapping manner, and the number of EPDCCH candidates corresponding to the aggregation level 8 in the distributed mapping manner as 2.

Further, for the localized mapping manner, the selecting module selects the number of EPDCCH candidates corresponding to the aggregation level 2 as 6, selects the number of EPDCCH candidates corresponding to the aggregation level 4 as 2, and selects the number of EPDCCH candidates corresponding to the aggregation level 8 as 2; and for the distributed mapping manner, the selecting module chooses to allocate 6 EPDCCH candidates to at least one aggregation level; or for the localized mapping manner, the selecting module selects the number of EPDCCH candidates corresponding to the aggregation level 2 as 6, selects the number of EPDCCH candidates corresponding to the aggregation level 4 as 6, and selects the number of EPDCCH candidates corresponding to the aggregation level 8 as 2; and for the distributed mapping manner, the selecting module chooses to allocate 2 EPDCCH candidates to at least one aggregation level; or for the localized mapping manner, the selecting module selects the number of EPDCCH candidates corresponding to the aggregation level 1 as 6, selects the number of EPDCCH candidates corresponding to the aggregation level 2 as 2, and selects the number of EPDCCH candidates corresponding to the aggregation level 4 as 2; and for the distributed mapping manner, the selecting module chooses to allocate 6 EPDCCH candidates to at least one aggregation level; or for the localized mapping manner, the selecting module selects the number of EPDCCH candidates corresponding to the aggregation level 1 as 6, selects the number of EPDCCH candidates corresponding to the aggregation level 2 as 6, and selects the number of EPDCCH candidates corresponding to the aggregation level 4 as 2; and for the distributed mapping manner, the selecting module chooses to allocate 2 EPDCCH candidates to at least one aggregation level.

Further, the selecting module is configured to select the number of physical control channel candidates corresponding to the to-be-detected aggregation level of the physical control channel set.

Further, when the physical control channel set is in a localized mapping manner, for a same aggregation level, the selecting module selects the number of physical control channel candidates corresponding to the aggregation level according to the number of PRBs of the physical control channel set; and when the physical control channel set is in a distributed mapping manner, for a same aggregation level, the selecting module selects the number of physical control channel candidates corresponding to the aggregation level according to the number of PRBs of the physical control channel set.

Further, when the physical control channel set is in the localized mapping manner, for the same aggregation level, the selecting module selects the number of physical control channel candidates corresponding to the aggregation level according to the number of PRBs of the physical control channel set, where the number of physical control channel candidates is in direct proportion to the number of PRBs; and when the physical control channel set is in the distributed mapping manner, for the same aggregation level, the selecting module selects the number of physical control channel candidates corresponding to the aggregation level according to the number of PRBs of the physical control channel set, where the number of physical control channel candidates is in direct proportion to the number of PRBs.

Further, the sending module is configured to send, on an EPDCCH candidate corresponding to the distributed mapping manner, downlink control information scrambled by using an SI-RNTI or an RA-RNTI, and send, on an EPDCCH candidate corresponding to the localized mapping manner, downlink control information scrambled by using another RNTI except the SI-RNTI and the RA-RNTI.

Further, the sending module is configured to send, on an EPDCCH candidate corresponding to one of the localized mapping manner and the distributed mapping manner, downlink control information including a cross-carrier scheduling instruction, and send, on an EPDCCH candidate corresponding to the other manner, downlink control information not including the cross-carrier scheduling instruction.

Further, the sending module is configured to send downlink control information with format 0 and/or format 1A through an EPDCCH of the EPDCCH candidates corresponding to the distributed mapping manner, and send downlink control information with format 2C through an EPDCCH of the EPDCCH candidates corresponding to the localized manner; and the selecting module is further configured to select the maximum number of times that blind detection is performed corresponding to the distributed mapping manner as 16, and the maximum number of times that blind detection is performed corresponding to the localized mapping manner as 16.

Further, the sending module is configured to send an EPDCCH with an aggregation level greater than or equal to a set value on an EPDCCH candidate corresponding to the distributed mapping manner, and send an EPDCCH with an aggregation level smaller than the set value on an EPDCCH candidate corresponding to the localized mapping manner.

In a fourth aspect, an embodiment of the present invention provides a user equipment, including:

a determining module, configured to determine a to-be-detected aggregation level of a physical control channel set in a transmission subframe, and determine the number of physical control channel candidates corresponding to the aggregation level according to the aggregation level; and a receiving module, configured to receive downlink control information on a physical control channel candidate corresponding to the determined number.

Further, the determining module is configured to: when the number of REs in a PRB pair of the physical control channel set that are available for a physical control channel is smaller than a threshold X, a minimum to-be-detected aggregation level of the physical control channel is 2; and when the number of REs included in the PRB pair of the physical control channel set is greater than or equal to the threshold X, determine the minimum to-be-detected aggregation level of the physical control channel set as 1; or when a transmission subframe type is a normal subframe with a normal CP length or a special subframe configured as 3, 4, or 8, and the number of REs in one PRB pair that are available for a physical control channel is smaller than X, determine a minimum to-be-detected aggregation level of the physical control channel set as 2; and when the subframe is not the normal subframe with the normal CP length, and is not the special subframe configured as 3, 4, or 8, or the number of REs in one PRB pair that are available for a physical control channel is greater than X, determine a minimum to-be-detected aggregation level of the physical control channel set as 1, the minimum to-be-detected aggregation level of the physical control channel set as 1.

Further, the determining module is configured to divide the physical control channel set into two sets, where one set corresponds to a localized mapping manner of the physical control channel, and the other set corresponds to a distributed mapping manner of the physical control channel; and respectively determine the number of EPDCCH candidates corresponding to each aggregation level in the localized mapping manner and the distributed mapping manner.

Further, for the aggregation level being 2, the determining module determines a sum of the number of EPDCCH candidates corresponding to the localized mapping manner and the number of EPDCCH candidates corresponding to the distributed mapping manner as 6;

for the aggregation level being 4, the determining module determines a sum of the number of EPDCCH candidates corresponding to the localized mapping manner and the number of EPDCCH candidates corresponding to the distributed mapping manner as 6;

for the aggregation level being 8, the determining module determines a sum of the number of EPDCCH candidates corresponding to the localized mapping manner and the number of EPDCCH candidates corresponding to the distributed mapping manner as 2; and for the aggregation level being 16, the determining module determines a sum of the number of EPDCCH candidates corresponding to the localized mapping manner and the number of EPDCCH candidates corresponding to the distributed mapping manner as 2.

Further, for the localized mapping manner, the determining module determines both the number of EPDCCH candidates corresponding to the aggregation level 2 and the number of EPDCCH candidates corresponding to the aggregation level 4 as 6, and determines both the number of EPDCCH candidates corresponding to the aggregation level 8 and the number of EPDCCH candidates corresponding to the aggregation level 16 as 0; and for the distributed mapping manner, the determining module determines both the number of EPDCCH candidates corresponding to the aggregation level 2 and the number of EPDCCH candidates corresponding to the aggregation level 4 as 0, and determines both the number of EPDCCH candidates corresponding to the aggregation level 8 and the number of EPDCCH candidates corresponding to the aggregation level 16 as 2; or for the localized mapping manner, the determining module determines both the number of EPDCCH candidates corresponding to the aggregation level 2 and the number of EPDCCH candidates corresponding to the aggregation level 4 as 3, and determines both the number of EPDCCH candidates corresponding to the aggregation level 8 and the number of EPDCCH candidates corresponding to the aggregation level 16 as 1; and for the distributed mapping manner, the determining module determines both the number of EPDCCH candidates corresponding to the aggregation level 2 and the number of EPDCCH candidates corresponding to the aggregation level 4 as 3, and determines both the number of EPDCCH candidates corresponding to the aggregation level 8 and the number of EPDCCH candidates corresponding to the aggregation level 16 as 1; or for the localized mapping manner, the determining module determines the number of EPDCCH candidates corresponding to the aggregation level 2 as 6, and the number of EPDCCH candidates corresponding to the aggregation level 4, the number of EPDCCH candidates corresponding to the aggregation level 8, and the number of EPDCCH candidates corresponding to the aggregation level 16 as 0; and for the distributed mapping manner, the determining module determines the number of EPDCCH candidates corresponding to the aggregation level 2 as 0, determines the number of EPDCCH candidates corresponding to the aggregation level 4 as 6, and determines both the number of EPDCCH candidates corresponding to the aggregation level 8 and the number of EPDCCH candidates corresponding to the aggregation level 16 as 2.

Further, for the distributed mapping manner, the determining module determines the number of EPDCCH candidates corresponding to the aggregation level 32 as 0.

Further, for the aggregation level being 32 and the aggregation level being 2, the determining module determines a sum of the number of EPDCCH candidates corresponding to the aggregation level 2 in the localized mapping manner, the number of EPDCCH candidates corresponding to the aggregation level 32 in the distributed mapping manner, and the number of EPDCCH candidates corresponding to the aggregation level 2 in the distributed mapping manner as 6; or for the aggregation level being 32 and the aggregation level being 4, the determining module determines a sum of the number of EPDCCH candidates corresponding to the aggregation level 4 in the localized mapping manner, the number of EPDCCH candidates corresponding to the aggregation level 32 in the distributed mapping manner, and the number of EPDCCH candidates corresponding to the aggregation level 2 in the distributed mapping manner as 6; or for the aggregation level being 32 and the aggregation level being 8, the determining module determines a sum of the number of EPDCCH candidates corresponding to the aggregation level 8 in the localized mapping manner, the number of EPDCCH candidates corresponding to the aggregation level 32 in the distributed mapping manner, and the number of EPDCCH candidates corresponding to the aggregation level 8 in the distributed mapping manner as 2; or for the aggregation level being 32 and the aggregation level being 16, the determining module determines a sum of the number of EPDCCH candidates corresponding to the aggregation level 16 in the localized mapping manner, the number of EPDCCH candidates corresponding to the aggregation level 32 in the distributed mapping manner, and the number of EPDCCH candidates corresponding to the aggregation level 16 in the distributed mapping manner as 2.

Further, for the aggregation level being 1, the determining module determines a sum of the number of EPDCCH candidates corresponding to the localized mapping manner and the number of EPDCCH candidates corresponding to the distributed mapping manner as 6;

for the aggregation level being 2, the determining module determines a sum of the number of EPDCCH candidates corresponding to the localized mapping manner and the number of EPDCCH candidates corresponding to the distributed mapping manner as 6;

for the aggregation level being 4, the determining module determines a sum of the number of EPDCCH candidates corresponding to the localized mapping manner and the number of EPDCCH candidates corresponding to the distributed mapping manner as 2; and for the aggregation level being 8, the determining module determines a sum of the number of EPDCCH candidates corresponding to the localized mapping manner and the number of EPDCCH candidates corresponding to the distributed mapping manner as 2.

Further, for the localized mapping manner, the determining module determines both the number of EPDCCH candidates corresponding to the aggregation level 1 and the number of EPDCCH candidates corresponding to the aggregation level 2 as 6, and determines both the number of EPDCCH candidates corresponding to the aggregation level 4 and the number of EPDCCH candidates corresponding to the aggregation level 8 as 0; and for the distributed mapping manner, the determining module determines both the number of EPDCCH candidates corresponding to the aggregation level 1 and the number of EPDCCH candidates corresponding to the aggregation level 2 as 0, and determines both the number of EPDCCH candidates corresponding to the aggregation level 4 and the number of EPDCCH candidates corresponding to the aggregation level 8 as 2; or for the localized mapping manner, the determining module determines both the number of EPDCCH candidates corresponding to the aggregation level 1 and the number of EPDCCH candidates corresponding to the aggregation level 2 as 3, and determines both the number of EPDCCH candidates corresponding to the aggregation level 4 and the number of EPDCCH candidates corresponding to the aggregation level 8 as 1; and for the distributed mapping manner, the determining module determines both the number of EPDCCH candidates corresponding to the aggregation level 1 and the number of EPDCCH candidates corresponding to the aggregation level 2 as 3, and determines both the number of EPDCCH candidates corresponding to the aggregation level 4 and the number of EPDCCH candidates corresponding to the aggregation level 8 as 1; or for the localized mapping manner, the determining module determines the number of EPDCCH candidates corresponding to the aggregation level 1 as 6, and the number of EPDCCH candidates corresponding to the aggregation level 2, the number of EPDCCH candidates corresponding to the aggregation level 4, and the number of EPDCCH candidates corresponding to the aggregation level 8 as 0; and for the distributed mapping manner, the determining module determines the number of EPDCCH candidates corresponding to the aggregation level 1 as 0, determines the number of EPDCCH candidates corresponding to the aggregation level 2 as 6, and determines both the number of EPDCCH candidates corresponding to the aggregation level 4 and the number of EPDCCH candidates corresponding to the aggregation level 8 as 2.

Further, for the distributed mapping manner, the determining module determines the number of EPDCCH candidates corresponding to the aggregation level 16 as 0.

Further, for the aggregation level being 16 and the aggregation level being 1, the determining module determines a sum of the number of EPDCCH candidates corresponding to the aggregation level 16 in the localized mapping manner, the number of EPDCCH candidates corresponding to the aggregation level 1 in the localized mapping manner, the number of EPDCCH candidates corresponding to the aggregation level 16 in the distributed mapping manner, and the number of EPDCCH candidates corresponding to the aggregation level 1 in the distributed mapping manner as 6; or for the aggregation level being 16 and the aggregation level being 2, the determining module determines a sum of the number of EPDCCH candidates corresponding to the aggregation level 16 in the localized mapping manner, the number of EPDCCH candidates corresponding to the aggregation level 2 in the localized mapping manner, the number of EPDCCH candidates corresponding to the aggregation level 16 in the distributed mapping manner, and the number of EPDCCH candidates corresponding to the aggregation level 2 in the distributed mapping manner as 6; or for the aggregation level being 16 and the aggregation level being 4, the determining module determines a sum of the number of EPDCCH candidates corresponding to the aggregation level 16 in the localized mapping manner, the number of EPDCCH candidates corresponding to the aggregation level 4 in the localized mapping manner, the number of EPDCCH candidates corresponding to the aggregation level 16 in the distributed mapping manner, and the number of EPDCCH candidates corresponding to the aggregation level 4 in the distributed mapping manner as 2; or for the aggregation level being 16 and the aggregation level being 8, the determining module determines a sum of the number of EPDCCH candidates corresponding to the aggregation level 16 in the localized mapping manner, the number of EPDCCH candidates corresponding to the aggregation level 8 in the localized mapping manner, the number of EPDCCH candidates corresponding to the aggregation level 16 in the distributed mapping manner, and the number of EPDCCH candidates corresponding to the aggregation level 8 in the distributed mapping manner as 2.

Further, for the localized mapping manner, the determining module determines the number of EPDCCH candidates corresponding to the aggregation level 2 as 6, determines the number of EPDCCH candidates corresponding to the aggregation level 4 as 2, and determines the number of EPDCCH candidates corresponding to the aggregation level 8 as 2; and for the distributed mapping manner, the determining module determines to allocate 6 EPDCCH candidates to at least one aggregation level; or for the localized mapping manner, the determining module determines the number of EPDCCH candidates corresponding to the aggregation level 2 as 6, determines the number of EPDCCH candidates corresponding to the aggregation level 4 as 6, and determines the number of EPDCCH candidates corresponding to the aggregation level 8 as 2; and for the distributed mapping manner, the determining module determines to allocate 2 EPDCCH candidates to at least one aggregation level; or for the localized mapping manner, the determining module determines the number of EPDCCH candidates corresponding to the aggregation level 1 as 6, determines the number of EPDCCH candidates corresponding to the aggregation level 2 as 2, and determines the number of EPDCCH candidates corresponding to the aggregation level 4 as 2; and for the distributed mapping manner, the determining module determines to allocate 6 EPDCCH candidates to at least one aggregation level; or for the localized mapping manner, the determining module determines the number of EPDCCH candidates corresponding to the aggregation level 1 as 6, determines the number of EPDCCH candidates corresponding to the aggregation level 2 as 6, and determines the number of EPDCCH candidates corresponding to the aggregation level 4 as 2; and for the distributed mapping manner, the determining module determines to allocate 2 EPDCCH candidates to at least one aggregation level.

Further, the determining module is configured to determine the number of physical control channel candidates corresponding to the to-be-detected aggregation level of the physical control channel set.

Further, when the physical control channel set is in the localized mapping manner, for a same aggregation level, the determining module determines the number of physical control channel candidates corresponding to the aggregation level according to the number of PRBs of the physical control channel set; and when the physical control channel set is in the distributed mapping manner, for a same aggregation level, the determining module determines the number of physical control channel candidates corresponding to the aggregation level according to the number of PRBs of the physical control channel set.

Further, when the physical control channel set is in the localized mapping manner, for the same aggregation level, the determining module determines the number of physical control channel candidates corresponding to the aggregation level according to the number of PRBs of the physical control channel set, where the number of physical control channel candidates is in direct proportion to the number of PRBs; and when the physical control channel set is in the distributed mapping manner, for the same aggregation level, the determining module determines the number of physical control channel candidates corresponding to the aggregation level according to the number of PRBs of the physical control channel set, where the number of physical control channel candidates is in direct proportion to the number of PRBs.

Further, the receiving module is configured to receive, on an EPDCCH candidate corresponding to the distributed mapping manner, downlink control information scrambled by using an SI-RNTI or an RA-RNTI, and receive, on an EPDCCH candidate corresponding to the localized mapping manner, downlink control information scrambled by using another RNTI except the SI-RNTI and the RA-RNTI.

Further, the receiving module is configured to receive, on an EPDCCH candidate corresponding to one of the localized mapping manner and the distributed mapping manner, downlink control information including a cross-carrier scheduling instruction, and receive, on an EPDCCH candidate corresponding to the other manner, downlink control information not including the cross-carrier scheduling instruction.

Further, the receiving module is configured to receive downlink control information with format 0 and/or format 1A through an EPDCCH of the EPDCCH candidates corresponding to the distributed mapping manner, and receive downlink control information with format 2C through an EPDCCH of the EPDCCH candidates corresponding to the localized manner; and the determining module is configured to determine the maximum number of times that blind detection is performed corresponding to the distributed mapping manner as 16, and the maximum number of times that blind detection is performed corresponding to the localized mapping manner as 16.

Further, the receiving module is configured to receive an EPDCCH with an aggregation level greater than or equal to a set value on an EPDCCH candidate corresponding to the distributed mapping manner, and receive an EPDCCH with an aggregation level smaller than the set value on an EPDCCH candidate corresponding to the localized mapping manner.

In a fifth aspect, an embodiment of the present invention provides a network side device, including:
- a selecting processor, configured to select a to-be-detected aggregation level of a physical control channel set in a transmission subframe, and select the number of physical control channel candidates corresponding to the aggregation level according to the aggregation level; and
- a transmitter, configured to send downlink control information on a physical control channel candidate corresponding to the selected number.

Further, the selecting processor is specifically configured to: when the number of REs in a PRB pair of the physical control channel set that are available for a physical control channel is smaller than a threshold X, select a minimum to-be-detected aggregation level of the physical control channel set as 2; and when the number of REs included in the PRB pair of the physical control channel set is greater than or equal to the threshold X, select the minimum to-be-detected aggregation level of the physical control channel set as 1; or
  when a transmission subframe type is a normal subframe with a normal CP length or a special subframe configured as 3, 4, or 8, and the number of REs in one PRB pair that are available for a physical control channel is smaller than X, select a minimum to-be-detected aggregation level of the physical control channel set as 2; and when the subframe is not the normal subframe with the normal CP length, and is not the special subframe configured as 3, 4, or 8, or the number of REs in one PRB pair that are available for a physical control channel is greater than X, select a minimum to-be-detected aggregation level of the physical control channel set as 1, the minimum to-be-detected aggregation level of the physical control channel set as 1.

Further, the selecting processor is specifically configured to divide the physical control channel set into two sets, where one set corresponds to a localized mapping manner of the physical control channel, and the other set corresponds to a distributed mapping manner of the physical control channel; and
  respectively select the number of EPDCCH candidates corresponding to each aggregation level in the localized mapping manner and the distributed mapping manner.

Further, for the aggregation level being 2, the selecting processor selects a sum of the number of EPDCCH candidates corresponding to the localized mapping manner and the number of EPDCCH candidates corresponding to the distributed mapping manner as 6;
  for the aggregation level being 4, the selecting processor selects a sum of the number of EPDCCH candidates corresponding to the localized mapping manner and the number of EPDCCH candidates corresponding to the distributed mapping manner as 6;
  for the aggregation level being 8, the selecting processor selects a sum of the number of EPDCCH candidates corresponding to the localized mapping manner and the number of EPDCCH candidates corresponding to the distributed mapping manner as 2; and
  for the aggregation level being 16, the selecting processor selects a sum of the number of EPDCCH candidates corresponding to the localized mapping manner and the number of EPDCCH candidates corresponding to the distributed mapping manner as 2.

Further, for the localized mapping manner, the selecting processor selects both the number of EPDCCH candidates corresponding to the aggregation level 2 and the number of EPDCCH candidates corresponding to the aggregation level 4 as 6, and selects both the number of EPDCCH candidates corresponding to the aggregation level 8 and the number of EPDCCH candidates corresponding to the aggregation level 16 as 0; and for the distributed mapping manner, the selecting processor selects both the number of EPDCCH candidates corresponding to the aggregation level 2 and the number of EPDCCH candidates corresponding to the aggregation level 4 as 0, and selects both the number of EPDCCH candidates corresponding to the aggregation level 8 and the number of EPDCCH candidates corresponding to the aggregation level 16 as 2; or
  for the localized mapping manner, the selecting processor selects both the number of EPDCCH candidates corresponding to the aggregation level 2 and the number of EPDCCH candidates corresponding to the aggregation level 4 as 3, and selects both the number of EPDCCH candidates corresponding to the aggregation level 8 and the number of EPDCCH candidates corresponding to the aggregation level 16 as 1; and for the distributed mapping manner, the selecting processor selects both the number of EPDCCH candidates corresponding to the aggregation level 2 and the number of EPDCCH candidates corresponding to the aggregation level 4 as 3, and selects the number of EPDCCH candidates corresponding to the aggregation level 8 and the number of EPDCCH candidates corresponding to the aggregation level 16 as 1; or
  for the localized mapping manner, the selecting processor selects the number of EPDCCH candidates corresponding to the aggregation level 2 as 6, and the number of EPDCCH candidates corresponding to the aggregation level 4, the number of EPDCCH candidates corresponding to the aggregation level 8, and the number of EPDCCH candidates corresponding to the aggregation level 16 as 0; and for the distributed mapping manner, the selecting processor selects the number of EPDCCH candidates corresponding to the aggregation level 2 as 0, selects the number of EPDCCH candidates corresponding to the aggregation level 4 as 6, and selects both the number of EPDCCH candidates corresponding to the aggregation level 8 and the number of EPDCCH candidates corresponding to the aggregation level 16 as 2.

Further, for the distributed mapping manner, the selecting processor selects the number of EPDCCH candidates corresponding to the aggregation level 32 as 0.

Further, for the aggregation level being 32 and the aggregation level being 2, the selecting processor selects a sum of the number of EPDCCH candidates corresponding to the aggregation level 2 in the localized mapping manner, the number of EPDCCH candidates corresponding to the aggregation level 32 in the distributed mapping manner, and the number of EPDCCH candidates corresponding to the aggregation level 2 in the distributed mapping manner as 6; or
  for the aggregation level being 32 and the aggregation level being 4, the selecting processor selects a sum of the number of EPDCCH candidates corresponding to the aggregation level 4 in the localized mapping manner, the number of EPDCCH candidates corresponding to the aggregation level 32 in the distributed mapping manner, and the number of EPDCCH candidates corresponding to the aggregation level 2 in the distributed mapping manner as 6; or for the aggregation level being 32 and the aggregation level being 8, the selecting processor selects a sum of the number of EPDCCH candidates corresponding to the aggregation level 8 in the localized mapping manner, the number of EPDCCH candidates corresponding to the aggregation level 32 in the distributed mapping manner, and the number of EPDCCH candidates corresponding to the aggregation level 8 in the distributed mapping manner as 2; or for the aggregation level being 32 and the aggregation level being 16, the selecting processor selects a sum of the number of EPDCCH candidates corresponding to the aggregation level 16 in the localized mapping manner, the number of EPDCCH candidates corresponding to the aggregation level 32 in the distributed mapping manner, and the number of EPDCCH candidates corresponding to the aggregation level 16 in the distributed mapping manner as 2.

Further, for the aggregation level being 1, the selecting processor selects a sum of the number of EPDCCH candidates corresponding to the localized mapping manner and the number of EPDCCH candidates corresponding to the distributed mapping manner as 6;

for the aggregation level being 2, the selecting processor selects a sum of the number of EPDCCH candidates corresponding to the localized mapping manner and the number of EPDCCH candidates corresponding to the distributed mapping manner as 6;

for the aggregation level being 4, the selecting processor selects a sum of the number of EPDCCH candidates corresponding to the localized mapping manner and the number of EPDCCH candidates corresponding to the distributed mapping manner as 2; and for the aggregation level being 8, the selecting processor selects a sum of the number of EPDCCH candidates corresponding to the localized mapping manner and the number of EPDCCH candidates corresponding to the distributed mapping manner as 2.

Further, for the localized mapping manner, the selecting processor selects both the number of EPDCCH candidates corresponding to the aggregation level 1 and the number of EPDCCH candidates corresponding to the aggregation level 2 as 6, and selects both the number of EPDCCH candidates corresponding to the aggregation level 4 and the number of EPDCCH candidates corresponding to the aggregation level 8 as 0; and for the distributed mapping manner, the selecting processor selects both the number of EPDCCH candidates corresponding to the aggregation level 1 and the number of EPDCCH candidates corresponding to the aggregation level 2 as 0, and selects both the number of EPDCCH candidates corresponding to the aggregation level 4 and the number of EPDCCH candidates corresponding to the aggregation level 8 as 2; or for the localized mapping manner, the selecting processor selects both the number of EPDCCH candidates corresponding to the aggregation level 1 and the number of EPDCCH candidates corresponding to the aggregation level 2 as 3, and selects both the number of EPDCCH candidates corresponding to the aggregation level 4 and the number of EPDCCH candidates corresponding to the aggregation level 8 as 1; and for the distributed mapping manner, the selecting processor selects both the number of EPDCCH candidates corresponding to the aggregation level 1 and the number of EPDCCH candidates corresponding to the aggregation level 2 as 3, and selects both the number of EPDCCH candidates corresponding to the aggregation level 4 and the number of EPDCCH candidates corresponding to the aggregation level 8 as 1; or for the localized mapping manner, the selecting processor selects the number of EPDCCH candidates corresponding to the aggregation level 1 as 6, and the number of EPDCCH candidates corresponding to the aggregation level 2, the number of EPDCCH candidates corresponding to the aggregation level 4, and the number of EPDCCH candidates corresponding to the aggregation level 8 as 0; and for the distributed mapping manner, the selecting processor selects the number of EPDCCH candidates corresponding to the aggregation level 1 as 0, selects the number of EPDCCH candidates corresponding to the aggregation level 2 as 6, and selects both the number of EPDCCH candidates corresponding to the aggregation level 4 and the number of EPDCCH candidates corresponding to the aggregation level 8 as 2.

Further, for the distributed mapping manner, the selecting processor selects the number of EPDCCH candidates corresponding to the aggregation level 16 as 0.

Further, for the aggregation level being 16 and the aggregation level being 1, the selecting processor selects a sum of the number of EPDCCH candidates corresponding to the aggregation level 16 in the localized mapping manner, the number of EPDCCH candidates corresponding to the aggregation level 1 in the localized mapping manner, the number of EPDCCH candidates corresponding to the aggregation level 16 in the distributed mapping manner, and the number of EPDCCH candidates corresponding to the aggregation level 1 in the distributed mapping manner as 6; or for the aggregation level being 16 and the aggregation level being 2, the selecting processor selects a sum of the number of EPDCCH candidates corresponding to the aggregation level 16 in the localized mapping manner, the number of EPDCCH candidates corresponding to the aggregation level 2 in the localized mapping manner, the number of EPDCCH candidates corresponding to the aggregation level 16 in the distributed mapping manner, and the number of EPDCCH candidates corresponding to the aggregation level 2 in the distributed mapping manner as 6; or for the aggregation level being 16 and the aggregation level being 4, the selecting processor selects a sum of the number of EPDCCH candidates corresponding to the aggregation level 16 in the localized mapping manner, the number of EPDCCH candidates corresponding to the aggregation level 4 in the localized mapping manner, the number of EPDCCH candidates corresponding to the aggregation level 16 in the distributed mapping manner, and the number of EPDCCH candidates corresponding to the aggregation level 4 in the distributed mapping manner as 2; or for the aggregation level being 16 and the aggregation level being 8, the selecting processor selects a sum of the number of EPDCCH candidates corresponding to the aggregation level 16 in the localized mapping manner, the number of EPDCCH candidates corresponding to the aggregation level 8 in the localized mapping manner, the number of EPDCCH candidates corresponding to the aggregation level 16 in the distributed mapping manner, and the number of EPDCCH candidates corresponding to the aggregation level 8 in the distributed mapping manner as 2.

Further, for a localized mapping manner, the selecting processor selects the number of EPDCCH candidates corresponding to the aggregation level 2 as 6, selects the number of EPDCCH candidates corresponding to the aggregation level 4 as 2, and selects the number of EPDCCH candidates corresponding to the aggregation level 8 as 2; and for a distributed mapping manner, the selecting processor chooses to allocate 6 EPDCCH candidates to at least one aggregation level; or for a localized mapping manner, the selecting processor selects the number of EPDCCH candidates corresponding to the aggregation level 2 as 6, selects the number of EPDCCH candidates corresponding to the aggregation level 4 as 6, and selects the number of EPDCCH candidates corresponding to the aggregation level 8 as 2; and for a distributed mapping manner, the selecting processor chooses to allocate 2 EPDCCH candidates to at least one aggregation level; or for a localized mapping manner, the selecting processor selects the number of EPDCCH candidates corresponding to the aggregation level 1 as 6, selects the number of EPDCCH candidates corresponding to the aggregation level 2 as 2, and selects the number of EPDCCH candidates corresponding to the aggregation level 4 as 2; and for a distributed mapping manner, the selecting processor chooses to allocate 6 EPDCCH candidates to at least one aggregation level; or for a localized mapping manner, the selecting processor selects the number of EPDCCH candidates corresponding to the aggregation level 1 as 6, selects the number of EPDCCH candidates corresponding to the aggregation level 2 as 6, and selects the number of EPDCCH candidates corresponding to the aggregation level 4 as 2; and for a distributed mapping manner, the selecting processor chooses to allocate 2 EPDCCH candidates to at least one aggregation level.

Further, the selecting processor is configured to select the number of physical control channel candidates corresponding to the to-be-detected aggregation level of the physical control channel set.

Further, when the physical control channel set is in a localized mapping manner, for a same aggregation level, the selecting processor selects the number of physical control channel candidates corresponding to the aggregation level according to the number of PRBs of the physical control channel set; and when the physical control channel set is in a distributed mapping manner, for a same aggregation level, the selecting processor selects the number of physical control channel candidates corresponding to the aggregation level according to the number of PRBs of the physical control channel set.

Further, when the physical control channel set is in the localized mapping manner, for the same aggregation level, the selecting processor selects the number of physical control channel candidates corresponding to the aggregation level according to the number of PRBs of the physical control channel set, where the number of physical control channel candidates is in direct proportion to the number of PRBs; and when the physical control channel set is in the distributed mapping manner, for the same aggregation level, the selecting processor selects the number of physical control channel candidates corresponding to the aggregation level according to the number of PRBs of the physical control channel set, where the number of physical control channel candidates is in direct proportion to the number of PRBs.

Further, the transmitter is configured to send, on an EPDCCH candidate corresponding to the distributed mapping manner, downlink control information scrambled by using an SI-RNTI or an RA-RNTI, and send, on an EPDCCH candidate corresponding to the localized mapping manner, downlink control information scrambled by using another RNTI except the SI-RNTI and the RA-RNTI.

Further, the transmitter is configured to send, on an EPDCCH candidate corresponding to one of the localized mapping manner and the distributed mapping manner, downlink control information including a cross-carrier scheduling instruction, and send, on an EPDCCH candidate corresponding to the other manner, downlink control information not including the cross-carrier scheduling instruction.

Further, the transmitter is configured to send downlink control information with format 0 and/or format 1A through an EPDCCH of the EPDCCH candidates corresponding to the distributed mapping manner, and send downlink control information with format 2C through an EPDCCH of the EPDCCH candidates corresponding to the localized manner; and the selecting processor is further configured to select the maximum number of times that blind detection is performed corresponding to the distributed mapping manner as 16, and the maximum number of times that blind detection is performed corresponding to the localized mapping manner as 16.

Further, the transmitter is configured to send an EPDCCH with an aggregation level greater than or equal to a set value on an EPDCCH candidate corresponding to the distributed mapping manner, and send an EPDCCH with an aggregation level smaller than the set value on an EPDCCH candidate corresponding to the localized mapping manner.

In a sixth aspect, an embodiment of the present invention provides a user equipment, including:

a determining processor, configured to determine a to-be-detected aggregation level of a physical control channel set in a transmission subframe, and determine the number of physical control channel candidates corresponding to the aggregation level according to the aggregation level; and a receiver, configured to receive downlink control information on a physical control channel candidate corresponding to the determined number.

Further, the determining processor is specifically configured to: when the number of REs in a PRB pair of the physical control channel set that are available for a physical control channel is smaller than a threshold X, determine a minimum to-be-detected aggregation level of the physical control channel set as 2; and when the number of REs included in the PRB pair of the physical control channel set is greater than or equal to the threshold X, determine the minimum to-be-detected aggregation level of the physical control channel set as 1; or when a transmission subframe type is a normal subframe with a normal CP length or a special subframe configured as 3, 4, or 8, and the number of REs in one PRB pair that are available for a physical control channel is smaller than X, determine a minimum to-be-detected aggregation level of the physical control channel set as 2; and when the subframe is not the normal subframe with the normal CP length, and is not the special subframe configured as 3, 4, or 8, or the number of REs in one PRB pair that are available for a physical control channel is greater than X, determine a minimum to-be-detected aggregation level of the physical control channel set as 1, the minimum to-be-detected aggregation level of the physical control channel set as 1.

Further, the determining processor is configured to divide the physical control channel set into two sets, where one set corresponds to a localized mapping manner of the physical control channel, and the other set corresponds to a distributed mapping manner of the physical control channel; and
respectively determine the number of EPDCCH candidates corresponding to each aggregation level in the localized mapping manner and the distributed mapping manner.

Further, for the aggregation level being 2, the determining processor determines a sum of the number of EPDCCH candidates corresponding to the localized mapping manner and the number of EPDCCH candidates corresponding to the distributed mapping manner as 6;
for the aggregation level being 4, the determining processor determines a sum of the number of EPDCCH candidates corresponding to the localized mapping manner and the number of EPDCCH candidates corresponding to the distributed mapping manner as 6;
for the aggregation level being 8, the determining processor determines a sum of the number of EPDCCH candidates corresponding to the localized mapping manner and the number of EPDCCH candidates corresponding to the distributed mapping manner as 2; and
for the aggregation level being 16, the determining processor determines a sum of the number of EPDCCH candidates corresponding to the localized mapping manner and the number of EPDCCH candidates corresponding to the distributed mapping manner as 2.

Further, for the localized mapping manner, the determining processor determines both the number of EPDCCH candidates corresponding to the aggregation level 2 and the number of EPDCCH candidates corresponding to the aggregation level 4 as 6, and determines both the number of EPDCCH candidates corresponding to the aggregation level 8 and the number of EPDCCH candidates corresponding to the aggregation level 16 as 0; and for the distributed mapping manner, the determining processor determines both the number of EPDCCH candidates corresponding to the aggregation level 2 and the number of EPDCCH candidates corresponding to the aggregation level 4 as 0, and determines both the number of EPDCCH candidates corresponding to the aggregation level 8 and the number of EPDCCH candidates corresponding to the aggregation level 16 as 2; or
for the localized mapping manner, the determining processor determines both the number of EPDCCH candidates corresponding to the aggregation level 2 and the number of EPDCCH candidates corresponding to the aggregation level 4 as 3, and determines both the number of EPDCCH candidates corresponding to the aggregation level 8 and the number of EPDCCH candidates corresponding to the aggregation level 16 as 1; and for the distributed mapping manner, the determining processor determines both the number of EPDCCH candidates corresponding to the aggregation level 2 and the number of EPDCCH candidates corresponding to the aggregation level 4 as 3, and determines both the number of EPDCCH candidates corresponding to the aggregation level 8 and the number of EPDCCH candidates corresponding to the aggregation level 16 as 1; or
for the localized mapping manner, the determining processor determines the number of EPDCCH candidates corresponding to the aggregation level 2 as 6, and the number of EPDCCH candidates corresponding to the aggregation level 4, the number of EPDCCH candidates corresponding to the aggregation level 8, and the number of EPDCCH candidates corresponding to the aggregation level 16 as 0; and for the distributed mapping manner, the determining processor determines the number of EPDCCH candidates corresponding to the aggregation level 2 as 0, determines the number of EPDCCH candidates corresponding to the aggregation level 4 as 6, and determines both the number of EPDCCH candidates corresponding to the aggregation level 8 and the number of EPDCCH candidates corresponding to the aggregation level 16 as 2.

Further, for the distributed mapping manner, the determining processor determines the number of EPDCCH candidates corresponding to the aggregation level 32 as 0.

Further, for the aggregation level being 32 and the aggregation level being 2, the determining processor determines a sum of the number of EPDCCH candidates corresponding to the aggregation level 2 in the localized mapping manner, the number of EPDCCH candidates corresponding to the aggregation level 32 in the distributed mapping manner, and the number of EPDCCH candidates corresponding to the aggregation level 2 in the distributed mapping manner as 6; or
for the aggregation level being 32 and the aggregation level being 4, the determining processor determines a sum of the number of EPDCCH candidates corresponding to the aggregation level 4 in the localized mapping manner, the number of EPDCCH candidates corresponding to the aggregation level 32 in the distributed mapping manner, and the number of EPDCCH candidates corresponding to the aggregation level 2 in the distributed mapping manner as 6; or
for the aggregation level being 32 and the aggregation level being 8, the determining processor determines a sum of the number of EPDCCH candidates corresponding to the aggregation level 8 in the localized mapping manner, the number of EPDCCH candidates corresponding to the aggregation level 32 in the distributed mapping manner, and the number of EPDCCH candidates corresponding to the aggregation level 8 in the distributed mapping manner as 2; or
for the aggregation level being 32 and the aggregation level being 16, the determining processor determines a sum of the number of EPDCCH candidates corresponding to the aggregation level 16 in the localized mapping manner, the number of EPDCCH candidates corresponding to the aggregation level 32 in the distributed mapping manner, and the number of EPDCCH candidates corresponding to the aggregation level 16 in the distributed mapping manner as 2.

Further, for the aggregation level being 1, the determining processor determines a sum of the number of EPDCCH candidates corresponding to the localized mapping manner and the number of EPDCCH candidates corresponding to the distributed mapping manner as 6;
for the aggregation level being 2, the determining processor determines a sum of the number of EPDCCH candidates corresponding to the localized mapping manner and the number of EPDCCH candidates corresponding to the distributed mapping manner as 6;
for the aggregation level being 4, the determining processor determines a sum of the number of EPDCCH candidates corresponding to the localized mapping manner and the number of EPDCCH candidates corresponding to the distributed mapping manner as 2; and for the aggregation level being 8, the determining processor determines a sum of the number of EPDCCH candidates corresponding to the localized mapping manner and the number of EPDCCH candidates corresponding to the distributed mapping manner as 2.

Further, for the localized mapping manner, the determining processor determines both the number of EPDCCH candidates corresponding to the aggregation level 1 and the number of EPDCCH candidates corresponding to the aggregation level 2 as 6, and determines both the number of EPDCCH candidates corresponding to the aggregation level 4 and the number of EPDCCH candidates corresponding to the aggregation level 8 as 0; and for the distributed mapping manner, the determining processor determines both the number of EPDCCH candidates corresponding to the aggregation level 1 and the number of EPDCCH candidates corresponding to the aggregation level 2 as 0, and determines both the number of EPDCCH candidates corresponding to the aggregation level 4 and the number of EPDCCH candidates corresponding to the aggregation level 8 as 2; or for the localized mapping manner, the determining processor determines both the number of EPDCCH candidates corresponding to the aggregation level 1 and the number of EPDCCH candidates corresponding to the aggregation level 2 as 3, and determines both the number of EPDCCH candidates corresponding to the aggregation level 4 and the number of EPDCCH candidates corresponding to the aggregation level 8 as 1; and for the distributed mapping manner, the determining processor determines both the number of EPDCCH candidates corresponding to the aggregation level 1 and the number of EPDCCH candidates corresponding to the aggregation level 2 as 3, and determines both the number of EPDCCH candidates corresponding to the aggregation level 4 and the number of EPDCCH candidates corresponding to the aggregation level 8 as 1; or for the localized mapping manner, the determining processor determines the number of EPDCCH candidates corresponding to the aggregation level 1 as 6, and the number of EPDCCH candidates corresponding to the aggregation level 2, the number of EPDCCH candidates corresponding to the aggregation level 4, and the number of EPDCCH candidates corresponding to the aggregation level 8 as 0; and for the distributed mapping manner, the determining processor determines the number of EPDCCH candidates corresponding to the aggregation level 1 as 0, determines the number of EPDCCH candidates corresponding to the aggregation level 2 as 6, and determines both the number of EPDCCH candidates corresponding to the aggregation level 4 and the number of EPDCCH candidates corresponding to the aggregation level 8 as 2.

Further, for the distributed mapping manner, the determining processor determines the number of EPDCCH candidates corresponding to the aggregation level 16 as 0.

Further, for the aggregation level being 16 and the aggregation level being 1, the determining processor determines a sum of the number of EPDCCH candidates corresponding to the aggregation level 16 in the localized mapping manner, the number of EPDCCH candidates corresponding to the aggregation level 1 in the localized mapping manner, the number of EPDCCH candidates corresponding to the aggregation level 16 in the distributed mapping manner, and the number of EPDCCH candidates corresponding to the aggregation level 1 in the distributed mapping manner as 6; or for the aggregation level being 16 and the aggregation level being 2, the determining processor determines a sum of the number of EPDCCH candidates corresponding to the aggregation level 16 in the localized mapping manner, the number of EPDCCH candidates corresponding to the aggregation level 2 in the localized mapping manner, the number of EPDCCH candidates corresponding to the aggregation level 16 in the distributed mapping manner, and the number of EPDCCH candidates corresponding to the aggregation level 2 in the distributed mapping manner as 6; or for the aggregation level being 16 and the aggregation level being 4, the determining processor determines a sum of the number of EPDCCH candidates corresponding to the aggregation level 16 in the localized mapping manner, the number of EPDCCH candidates corresponding to the aggregation level 4 in the localized mapping manner, the number of EPDCCH candidates corresponding to the aggregation level 16 in the distributed mapping manner, and the number of EPDCCH candidates corresponding to the aggregation level 4 in the distributed mapping manner as 2; or for the aggregation level being 16 and the aggregation level being 8, the determining processor determines a sum of the number of EPDCCH candidates corresponding to the aggregation level 16 in the localized mapping manner, the number of EPDCCH candidates corresponding to the aggregation level 8 in the localized mapping manner, the number of EPDCCH candidates corresponding to the aggregation level 16 in the distributed mapping manner, and the number of EPDCCH candidates corresponding to the aggregation level 8 in the distributed mapping manner as 2.

Further, for the localized mapping manner, the determining processor determines the number of EPDCCH candidates corresponding to the aggregation level 2 as 6, determines the number of EPDCCH candidates corresponding to the aggregation level 4 as 2, and determines the number of EPDCCH candidates corresponding to the aggregation level 8 as 2; and for the distributed mapping manner, the determining processor determines to allocate 6 EPDCCH candidates to at least one aggregation level; or for the localized mapping manner, the determining processor determines the number of EPDCCH candidates corresponding to the aggregation level 2 as 6, determines the number of EPDCCH candidates corresponding to the aggregation level 4 as 6, and determines the number of EPDCCH candidates corresponding to the aggregation level 8 as 2; and for the distributed mapping manner, the determining processor determines to allocate 2 EPDCCH candidates to at least one aggregation level; or for the localized mapping manner, the determining processor determines the number of EPDCCH candidates corresponding to the aggregation level 1 as 6, determines the number of EPDCCH candidates corresponding to the aggregation level 2 as 2, and determines the number of EPDCCH candidates corresponding to the aggregation level 4 as 2; and for the distributed mapping manner, the determining processor determines to allocate 6 EPDCCH candidates to at least one aggregation level; or for the localized mapping manner, the determining processor determines the number of EPDCCH candidates corresponding to the aggregation level 1 as 6, determines the number of EPDCCH candidates corresponding to the aggregation level 2 as 6, and determines the number of EPDCCH candidates corresponding to the aggregation level 4 as 2; and for the distributed mapping manner, the determining processor determines to allocate 2 EPDCCH candidates to at least one aggregation level.

Further, the determining processor is configured to determine the number of physical control channel candidates corresponding to the to-be-detected aggregation level of the physical control channel set.

Further, when the physical control channel set is in the localized mapping manner, for a same aggregation level, the determining processor determines the number of physical control channel candidates corresponding to the aggregation level according to the number of PRBs of the physical control channel set; and when the physical control channel set is in the distributed mapping manner, for a same aggregation level, the determining processor determines the number of physical control channel candidates corresponding to the aggregation level according to the number of PRBs of the physical control channel set.

Further, when the physical control channel set is in the localized mapping manner, for the same aggregation level, the determining processor determines the number of physical control channel candidates corresponding to the aggregation level according to the number of PRBs of the physical control channel set, where the number of physical control channel candidates is in direct proportion to the number of PRBs; and when the physical control channel set is in the distributed mapping manner, for the same aggregation level, the determining processor determines the number of physical control channel candidates corresponding to the aggregation level according to the number of PRBs of the physical control channel set, where the number of physical control channel candidates is in direct proportion to the number of PRBs.

Further, the receiver is configured to receive, on an EPDCCH candidate corresponding to the distributed mapping manner, downlink control information scrambled by using an SI-RNTI or an RA-RNTI, and receive, on an EPDCCH candidate corresponding to the localized mapping manner, downlink control information scrambled by using another RNTI except the SI-RNTI and the RA-RNTI.

Further, the receiver is configured to receive, on an EPDCCH candidate corresponding to one of the localized mapping manner and the distributed mapping manner, downlink control information including a cross-carrier scheduling instruction, and receive, on an EPDCCH candidate corresponding to the other manner, downlink control information not including the cross-carrier scheduling instruction.

Further, the receiver is configured to receive downlink control information with format 0 and/or format 1A through an EPDCCH of the EPDCCH candidates corresponding to the distributed mapping manner, and receive downlink control information with format 2C through an EPDCCH of the EPDCCH candidates corresponding to the localized manner; and the determining processor is configured to determine the maximum number of times that blind detection is performed corresponding to the distributed mapping manner as 16, and the maximum number of times that blind detection is performed corresponding to the localized mapping manner as 16.

Further, the receiver is configured to receive an EPDCCH with an aggregation level greater than or equal to a set value on an EPDCCH candidate corresponding to the distributed mapping manner, and receive an EPDCCH with an aggregation level smaller than the set value on an EPDCCH candidate corresponding to the localized mapping manner.

In the method for transmitting downlink control information, the network side device, and the user equipment provided in the embodiments of the present invention, the network side device selects the to-be-detected aggregation level of the physical control channel set in the transmission subframe, and selects the number of physical control channel candidates corresponding to the aggregation level according to the aggregation level, and the network side sends the downlink control information on the physical control channel candidate corresponding to the selected number; the user equipment determines the to-be-detected aggregation level of the physical control channel set in the transmission subframe, determines the number of physical control channel candidates corresponding to the aggregation level according to the aggregation level, and performs blind detection on the physical control channel set so as to receive the downlink control information, thereby determining the number of physical control channel candidates according to the aggregation level, that is, determining the maximum number of times that blind detection is performed. Therefore the network side device and the user equipment can communicate with each other without increasing the maximum number of times that blind detection is performed.

BRIEF DESCRIPTION OF THE DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention more comprehensible, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
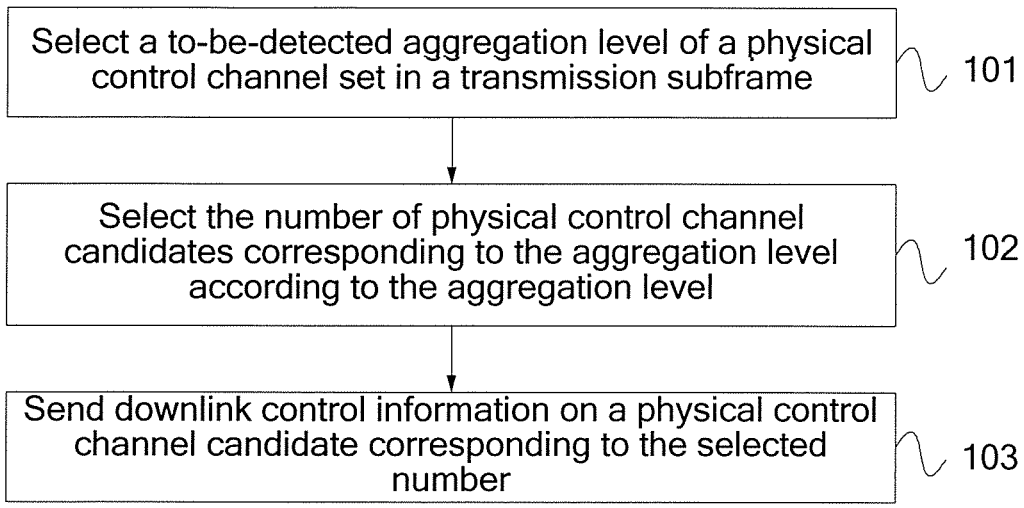
FIG. 1 is a flow chart of an embodiment of a method for transmitting downlink control information by a network side according to the present invention.

FIG. 1 is a flow chart of an embodiment of a method for transmitting downlink control information by a network side according to the present invention. As shown in FIG. 1, the method for transmitting downlink control information by a network side according to the present invention includes the following steps:

Step 101: Select a to-be-detected aggregation level of a physical control channel set in a transmission subframe.

To improve system performance and expand PDCCH capacity, an EPDCCH is introduced in an R11 version. Currently, it has been determined through standard discussion that the EPDCCH needs to support two modes: Localized mode and Distributed mode, which are applied to two different scenarios: consecutive frequency domain and discrete frequency domain. In addition, in the 3GPP RAN1 #70 meeting, it is specified that a search space of the EPDCCH takes a physical control channel set (hereinafter briefly referred to as EPDCCH set) as a unit, one EPDCCH set is formed by N physical resource blocks (Physical Resource Block, hereinafter briefly referred to as PRB), the EPDCCH set is in a localized mapping manner, or in a distributed mapping manner, one UE may be configured with K (K≥1) EPDCCH sets, and the UE searches for an EPDCCH in the configured EPDCCH set.

Generally, DCI is transmitted by using different aggregation levels according to an encoding rate, and the network side device selects the to-be-detected aggregation level of the EPDCCH set in the transmission subframe according to different pieces of DCI.

Step 102: Select the number of physical control channel candidates corresponding to the aggregation level according to the aggregation level.

The number of physical control channel candidates corresponding to the aggregation level is selected according to the aggregation level, that is, the maximum number of times that blind detection is performed is determined, thereby enabling the maximum number of times that blind detection is performed not to exceed the number specified in the protocol. Specifically, the maximum number of times that blind detection is performed corresponding to the aggregation level corresponds to the number of physical control channel candidates. For example, for the aggregation level being 2, the number of physical control channel candidates corresponding thereto is 6, the maximum number of times that blind detection is performed is 6×2=12, and 2 indicates that one EPDCCH candidate needs to perform blind detection on two types of DCI formats.

Step 103: Send downlink control information on a physical control channel candidate corresponding to the selected number.

The network side device may divide the physical control channel set into two sets, and determine the number of EPDCCH candidates corresponding to each aggregation level in each set, and may also determine the number of EPDCCH candidates corresponding to each aggregation level in each control channel set without dividing the set.

Correspondingly, the user equipment determines the number of physical control channel candidates for different aggregation levels, and performs blind detection on the physical control channel set, so as to receive the downlink control information.

In the method for transmitting a physical control channel provided in the embodiment of the present invention, the network side device selects the to-be-detected aggregation level of the physical control channel set in the transmission subframe, and selects the number of physical control channel candidates corresponding to the aggregation level according to the aggregation level, and the network side sends the downlink control information on the physical control channel candidate corresponding to the selected number; the user equipment determines the to-be-detected aggregation level of the physical control channel set in the transmission subframe, determines the number of physical control channel candidates corresponding to the aggregation level according to the aggregation level, and performs blind detection on the physical control channel set so as to receive the downlink control information, thereby determining the number of physical control channel candidates according to the aggregation level, that is, determining the maximum number of times that blind detection is performed. Therefore the network side device and the user equipment can communicate with each other without increasing the maximum number of times that blind detection is performed.

When the number of REs in a PRB pair of the physical control channel set that are available for a physical control channel is smaller than a threshold X, the network side device may select a minimum to-be-detected aggregation level of the physical control channel set as 2; and when the number of REs included in the PRB pair of the physical control channel set is greater than or equal to the threshold X, the network side device may select the minimum to-be-detected aggregation level of the physical control channel set as 1.

Correspondingly, when the number of REs in a PRB pair of the physical control channel set that are available for a physical control channel is smaller than the threshold X, the user equipment may determine a minimum to-be-detected aggregation level of the physical control channel set as 2; and when the number of REs included in the PRB pair of the physical control channel set is greater than or equal to the threshold X, the user equipment may determine the minimum to-be-detected aggregation level of the physical control channel set as 1.

In this embodiment, for the physical control channel set, only the threshold is considered; when the number of REs available for transmitting the physical control channel that are in the PRB pair of the physical control channel set in the resources configured for the user equipment by the network side device is smaller than the threshold X, the minimum to-be-detected aggregation level is set as 2, or otherwise, the minimum aggregation level is set as 1. The threshold X may be a preset value, for example, from the perspective of the transmission code rate of the EPDCCH, it is specified that X=104.

When a transmission subframe type is a normal subframe with a normal CP length or a special subframe configured as 3, 4, or 8, and the number of REs in one PRB pair that are available for a physical control channel is smaller than X, the network side device may select a minimum to-be-detected aggregation level of the physical control channel set as 2; or otherwise, when the subframe is not the normal subframe with the normal CP length, and is another subframe type except the special subframe configured as 3, 4, or 8, or the number of REs in one PRB pair that are available for a physical control channel is greater than X, the network side device may select the minimum to-be-detected aggregation level of the physical control channel set as 1.

Correspondingly, when a transmission subframe type is a normal subframe with a normal CP length or a special subframe configured as 3, 4, or 8, and the number of REs in one PRB pair that are available for a physical control channel is smaller than X, the user equipment may determine a minimum to-be-detected aggregation level of the physical control channel set as 2; or otherwise, when the subframe is not the normal subframe with the normal CP length, and is another subframe type except the special subframe configured as 3, 4, or 8, or the number of REs in one PRB pair that are available for a physical control channel is greater than X, the user equipment may determine the minimum to-be-detected aggregation level of the physical control channel set as 1.

In this embodiment, according to the subframe type and in combination with the threshold, when the subframe is a normal subframe with a normal CP length or a special subframe configured as 3, 4, or 8, and the number of REs in one PRB pair that are available for a physical control channel is smaller than X, the network side device selects the minimum to-be-detected aggregation level of the physical control channel set as 2, or otherwise, sets the minimum aggregation level as 1. It is specified in the protocol that X=104.

Generally, during the selecting of the number of physical control channel candidates corresponding to the aggregation level according to the aggregation level, the network side device may divide the physical control channel set into two sets, and determine the number of EPDCCH candidates corresponding to each aggregation level of each set, and may also determine the number of EPDCCH candidates corresponding to each aggregation level of each control channel set without dividing the set. The two manners are described in details in the following.

Manner 1

The network side device divides the physical control channel set into two sets, where one set corresponds to a localized mapping manner of the physical control channel and the other set corresponds to a distributed mapping manner of the physical control channel; and respectively selects the number of EPDCCH candidates corresponding to each aggregation level in the localized mapping manner and the distributed mapping manner.

Correspondingly, the user equipment may divide the physical control channel set into two sets, where one set corresponds to a localized mapping manner of the physical control channel and the other set corresponds to a distributed mapping manner of the physical control channel; and respectively determine the number of EPDCCH candidates corresponding to each aggregation level in the localized mapping manner and the distributed mapping manner.

The number of EPDCCH candidates may be specified in the protocol, that is, preset, and may also be notified to the user equipment by sending signaling by the network side device.

Specifically, when the transmission subframe is a normal subframe or a special subframe configured as 3, 4, or 8, and the number of REs in the PRB pair and available for transmitting the EPDCCH is smaller than the threshold, or when only the threshold is considered, and the number of REs in the PRB pair of the physical control channel set and available for a physical control channel is smaller than the threshold X, for the aggregation level being 2, the network side selects a sum of the number of EPDCCH candidates corresponding to the localized mapping manner and the number of EPDCCH candidates corresponding to the distributed mapping manner as 6; for the aggregation level being 4, the network side selects a sum of the number of EPDCCH candidates corresponding to the localized mapping manner and the number of EPDCCH candidates corresponding to the distributed mapping manner as 6; for the aggregation level being 8, the network side selects a sum of the number of EPDCCH candidates corresponding to the localized mapping manner and the number of EPDCCH candidates corresponding to the distributed mapping manner as 2; and for the aggregation level being 16, the network side selects a sum of the number of EPDCCH candidates corresponding to the localized mapping manner and the number of EPDCCH candidates corresponding to the distributed mapping manner as 2.

Correspondingly, for the aggregation level being 2, the user equipment determines a sum of the number of EPDCCH candidates corresponding to the localized mapping manner and the number of EPDCCH candidates corresponding to the distributed mapping manner as 6; for the aggregation level being 4, the user equipment determines a sum of the number of EPDCCH candidates corresponding to the localized mapping manner and the number of EPDCCH candidates corresponding to the distributed mapping manner as 6; for the aggregation level being 8, the user equipment determines a sum of the number of EPDCCH candidates corresponding to the localized mapping manner and the number of EPDCCH candidates corresponding to the distributed mapping manner as 2; and for the aggregation level being 16, the user equipment determines a sum of the number of EPDCCH candidates corresponding to the localized mapping manner and the number of EPDCCH candidates corresponding to the distributed mapping manner as 2.

In this embodiment, aggregation levels supported by the localized mapping manner are 2, 4, 8, and (16), and aggregation levels supported by the distributed mapping manner are 2, 4, 8, 16, and (32), where (16) indicates that the aggregation level 16 in the localized mapping manner is optional, (32) indicates that the aggregation level 32 in the distributed mapping manner is optional, and the aggregation level (16) in the localized manner and the aggregation level (32) in the distributed manner need to be used in some EPDCCH transmission scenarios. When the number of REs in the PRB pair and used for transmitting an EPDCCH is smaller than the threshold, both the localized mapping manner and the distributed mapping manner support the aggregation levels {2, 4, 8, 16}, the setting of the PDCCH candidate channel continues to be used, and the numbers of EPDCCH candidates corresponding to the aggregation levels {2, 4, 8, 16} are {6, 6, 2, 2}. For the aggregation level being 2, the number of EPDCCH candidates corresponding thereto is 6, the network side device or the user equipment may allocate the 6 EPDCCH candidates to the set of the localized mapping and the set of the distributed mapping, for example, allocate all the 6 EPDCCH candidates to the set of the localized mapping manner, and allocate no EPDCCH candidate to the set of the distributed mapping manner. Specific configuration may be specified in the protocol, that is, preset, and may also be notified to the user equipment by sending signaling by the network side device. If the user equipment is notified by the network side device, the user equipment receives, before performing blind detection, the number of EPDCCH candidates corresponding to each aggregation level in the EPDCCH notified by the network side.

Table 1 is the first solution in which EPDCCH candidates are configured as the set of the localized mapping manner and the set of the distributed mapping manner. As shown in Table 1, for the localized mapping manner, the network side device selects both the number of EPDCCH candidates corresponding to the aggregation level 2 and the number of EPDCCH candidates corresponding to the aggregation level 4 as 6, selects both the number of EPDCCH candidates corresponding to the aggregation level 8 and the number of EPDCCH candidates corresponding to the aggregation level 16 as 0; and for the distributed mapping manner, the network side device selects both the number of EPDCCH candidates corresponding to the aggregation level 2 and the number of EPDCCH candidates corresponding to the aggregation level 4 as 0, and selects both the number of EPDCCH candidates corresponding to the aggregation level 8 and the number of EPDCCH candidates corresponding to the aggregation level 16 as 2; correspondingly, for the localized mapping manner, the user equipment determines both the number of EPDCCH candidates corresponding to the aggregation level 2 and the number of EPDCCH candidates corresponding to the aggregation level 4 as 6, determines both the number of EPDCCH candidates corresponding to the aggregation level 8 and the number of EPDCCH candidates corresponding to the aggregation level 16 as 0; and for the distributed mapping manner, the user equipment determines both the number of EPDCCH candidates corresponding to the aggregation level 2 and the number of EPDCCH candidates corresponding to the aggregation level 4 as 0, and determines both the number of EPDCCH candidates corresponding to the aggregation level 8 and the number of EPDCCH candidates corresponding to the aggregation level 16 as 2.

TABLE 1

| Aggregation level | The number of EPDCCH candidates in a set of a localized mapping manner | The number of EPDCCH candidates in a set of a distributed mapping manner |
|---|---|---|
| 2 | 6 | 0 |
| 4 | 6 | 0 |
| 8 | 0 | 2 |
| 16 | 0 | 2 |

Table 2 is the second solution in which EPDCCH candidates are configured for the set of the localized mapping manner and the set of the distributed mapping manner. As shown in Table 2, for the localized mapping manner, the network side device selects both the number of EPDCCH candidates corresponding to the aggregation level 2 and the number of EPDCCH candidates corresponding to the aggregation level 4 as 3, and selects both the number of EPDCCH candidates corresponding to the aggregation level 8 and the number of EPDCCH candidates corresponding to the aggregation level 16 as 1; and for the distributed mapping manner, the network side device selects both the number of EPDCCH candidates corresponding to the aggregation level 2 and the number of EPDCCH candidates corresponding to the aggregation level 4 as 3, and selects both the number of EPDCCH candidates corresponding to the aggregation level 8 and the number of EPDCCH candidates corresponding to the aggregation level 16 as 1.

Correspondingly, for the localized mapping manner, the user equipment determines both the number of EPDCCH candidates corresponding to the aggregation level 2 and the number of EPDCCH candidates corresponding to the aggregation level 4 as 3, and determines both the number of EPDCCH candidates corresponding to the aggregation level 8 and the number of EPDCCH candidates corresponding to the aggregation level 16 as 1; and for the distributed mapping manner, the user equipment determines both the number of EPDCCH candidates corresponding to the aggregation level 2 and the number of EPDCCH candidates corresponding to the aggregation level 4 as 3, and determines both the number of EPDCCH candidates corresponding to the aggregation level 8 and the number of EPDCCH candidates corresponding to the aggregation level 16 as 1.

TABLE 2

| Aggregation level | The number of EPDCCH candidates in a set of a localized mapping manner | The number of EPDCCH candidates in a set of a distributed mapping manner |
|---|---|---|
| 2 | 3 | 3 |
| 4 | 3 | 3 |
| 8 | 1 | 1 |
| 16 | 1 | 1 |

Table 3 is the third solution in which EPDCCH candidates are configured for the set of the localized mapping manner and the set of the distributed mapping manner. As shown in Table 3, for the localized mapping manner, the network side device selects the number of EPDCCH candidates corresponding to the aggregation level 2 as 6, and the number of EPDCCH candidates corresponding to the aggregation level 4, the number of EPDCCH candidates corresponding to the aggregation level 8, and the number of EPDCCH candidates corresponding to the aggregation level 16 as 0; and for the distributed mapping manner, the network side device selects the number of EPDCCH candidates corresponding to the aggregation level 2 as 0, selects the number of EPDCCH candidates corresponding to the aggregation level 4 as 6, and selects both the number of EPDCCH candidates corresponding to the aggregation level 8 and the number of EPDCCH candidates corresponding to the aggregation level 16 as 2.

Correspondingly, for the localized mapping manner, the user equipment determines the number of EPDCCH candidates corresponding to the aggregation level 2 as 6, and the number of EPDCCH candidates corresponding to the aggregation level 4, the number of EPDCCH candidates corresponding to the aggregation level 8, and the number of EPDCCH candidates corresponding to the aggregation level 16 as 0; and for the distributed mapping manner, the user equipment determines the number of EPDCCH candidates corresponding to the aggregation level 2 as 0, determines the number of EPDCCH candidates corresponding to the aggregation level 4 as 6, and determines both the number of EPDCCH candidates corresponding to the aggregation level 8 and the number of EPDCCH candidates corresponding to the aggregation level 16 as 2.

TABLE 3

| Aggregation level | The number of EPDCCH candidates in a set of a localized mapping manner | The number of EPDCCH candidates in a set of a distributed mapping manner |
|---|---|---|
| 2 | 6 | 0 |
| 4 | 0 | 6 |
| 8 | 0 | 2 |
| 16 | 0 | 2 |

Table 1, Table 2, and Table 3 give merely a part of configuration manners, but the present invention is not limited thereto. Any method capable of enabling a sum of the number of EPDCCHs in the set of the localized mapping manner and corresponding to each aggregation level and the number of EPDCCH candidates in the set of the distributed mapping manner and corresponding to each aggregation level to satisfy the corresponding number of EPDCCHs can be used for implementing the present invention. For example, for the aggregation level being 2, the foregoing merely shows an example of a configuration manner where 6 or 3 EPDCCH candidates are allocated to the set of the localized mapping manner, and 0 or 3 EPDCCHs are allocated to the set of the distributed mapping manner. In another embodiment, the following configuration manner may be adopted: 2 or 5 EPDCCH candidates may be allocated to the set of the localized mapping manner and 4 or 1 EPDCCHs may be allocated to the set of the distributed mapping manner.

In the foregoing embodiment, both the set of the localized distribution and the set of the distributed mapping support the aggregation levels {2, 4, 8, 16}, and for the localized manner, the aggregation level 16 is optional. In another embodiment, for the localized manner, the aggregation level 16 may not be considered, and in this case, 2 EPDCCH candidates corresponding to the aggregation level 16 are both configured to the set of distributed mapping.

When a case where the set of the distributed mapping supports the aggregation level 32 is not considered, the network side device selects the number of EPDCCH candidates corresponding to the aggregation level 32 as 0, and the user equipment determines the number of EPDCCH candidates corresponding to the aggregation level 32 as 0.

When the case where the set of the distributed mapping supports the aggregation level 32 is considered, because the present invention continues to use the setting of the PDCCH candidate channel, and a sum of the numbers {6, 6, 2, 2} of EPDCCH candidates corresponding to the aggregation levels {2, 4, 8, 16} is unchanged, a part of EPDCCH candidates corresponding to the aggregation level 2 may be allocated to a set of a distributed mapping manner corresponding to the aggregation level 32; or, a part of EPDCCH candidates corresponding to the aggregation level 4 may be allocated to a set of a distributed mapping manner corresponding to the aggregation level 32; or, a part of EPDCCH candidates corresponding to the aggregation level 8 may be allocated to a set of a distributed mapping manner corresponding to the aggregation level 32; or, a part of EPDCCH candidates corresponding to the aggregation level 16 may be allocated to a set of a distributed mapping manner corresponding to the aggregation level 32.

Table 4 is the fourth solution in which EPDCCH candidates are configured for the set of the localized mapping manner and the set of the distributed mapping manner. As shown in Table 4, for the aggregation level being 32 and the aggregation level being 2, the network side device selects a sum of the number of EPDCCH candidates corresponding to the aggregation level 2 in the localized mapping manner, the number of EPDCCH candidates corresponding to the aggregation level 32 in the distributed mapping manner, and the number of EPDCCH candidates corresponding to the aggregation level 2 in the distributed mapping manner as 6; correspondingly, for the aggregation level being 32 and the aggregation level being 2, the user equipment determines a sum of the number of EPDCCH candidates corresponding to the aggregation level 2 in the localized mapping manner, the number of EPDCCH candidates corresponding to the aggregation level 32 in the distributed mapping manner, and the number of EPDCCH candidates corresponding to the aggregation level 2 in the distributed mapping manner as 6.

TABLE 4

| Aggregation level | The number of EPDCCH candidates in a set of a localized mapping manner | The number of EPDCCH candidates in a set of a distributed mapping manner |
| --- | --- | --- |
| 2 | 2 | 2 |
| 4 | 0 | 6 |
| 8 | 0 | 2 |
| 16 | 0 | 2 |
| 32 | / | 2 |

In Table 4, the network side device 10 allocates two of the EPDCCH candidates corresponding to the aggregation level 2 to the aggregation level 32 in the distributed mapping manner, but the present invention is not limited thereto. In another embodiment, the network side device may also allocate one or N of the EPDCCH candidates corresponding to the aggregation level 2 to the aggregation level 32 in the distributed mapping manner.

Table 5 is the fifth solution in which EPDCCH candidates are configured for the set of the localized mapping manner and the set of the distributed mapping manner. As shown in Table 5, for the aggregation level being 32 and the aggregation level being 4, the network side device selects a sum of the number of EPDCCH candidates corresponding to the aggregation level 4 in the localized mapping manner, the number of EPDCCH candidates corresponding to the aggregation level 32 in the distributed mapping manner, and the number of EPDCCH candidates corresponding to the aggregation level 2 in the distributed mapping manner as 6; correspondingly, for the aggregation level being 32 and the aggregation level being 4, the user equipment determines a sum of the number of EPDCCH candidates corresponding to the aggregation level 4 in the localized mapping manner, the number of EPDCCH candidates corresponding to the aggregation level 32 in the distributed mapping manner, and the number of EPDCCH candidates corresponding to the aggregation level 2 in the distributed mapping manner as 6.

TABLE 5

| Aggregation level | The number of EPDCCH candidates in a set of a localized mapping manner | The number of EPDCCH candidates in a set of a distributed mapping manner |
| --- | --- | --- |
| 2 | 2 | 4 |
| 4 | 2 | 3 |
| 8 | 0 | 2 |
| 16 | 0 | 2 |
| 32 | 0 | 1 |

In Table 5, the network side device 10 allocates one of the EPDCCH candidates corresponding to the aggregation level 4 to the aggregation level 32 in the distributed mapping manner, but the present invention is not limited thereto. In another embodiment, the network side device may also allocate one or N of the EPDCCH candidates corresponding to the aggregation level 4 to the aggregation level 32 in the distributed mapping manner.

Table 6 is the sixth solution in which EPDCCH candidates are configured for the set of the localized mapping manner and the set of the distributed mapping manner. As shown in Table 6, for the aggregation level being 32 and the aggregation level being 8, the network side device selects a sum of the number of EPDCCH candidates corresponding to the aggregation level 8 in the localized mapping manner, the number of EPDCCH candidates corresponding to the aggregation level 32 in the distributed mapping manner, and the number of EPDCCH candidates corresponding to the aggregation level 8 in the distributed mapping manner as 2;

correspondingly, for the aggregation level being 32 and the aggregation level being 8, the user equipment determines a sum of the number of EPDCCH candidates corresponding to the aggregation level 8 in the localized mapping manner, the number of EPDCCH candidates corresponding to the aggregation level 32 in the distributed mapping manner, and the number of EPDCCH candidates corresponding to the aggregation level 8 in the distributed mapping manner as 2.

TABLE 6

| Aggregation level | The number of EPDCCH candidates in a set of a localized mapping manner | The number of EPDCCH candidates in a set of a distributed mapping manner |
| --- | --- | --- |
| 2 | 2 | 4 |
| 4 | 3 | 3 |
| 8 | 1 | 0 |
| 16 | 0 | 2 |
| 32 | 0 | 1 |

In Table 6, the network side device 10 allocates one of the EPDCCH candidates corresponding to the aggregation level 8 to the aggregation level 32 in the distributed mapping manner, but the present invention is not limited thereto. In another embodiment, the network side device may also allocate one or two of the EPDCCH candidates corresponding to the aggregation level 8 to the aggregation level 32 in the distributed mapping manner.

Table 7 is the seventh solution in which EPDCCH candidates are configured for the set of the localized mapping manner and the set of the distributed mapping manner. As shown in Table 7, for the aggregation level being 32 and the aggregation level being 16, the network side device selects a sum of the number of EPDCCH candidates corresponding to the aggregation level 16 in the localized mapping manner, the number of EPDCCH candidates corresponding to the aggregation level 32 in the distributed mapping manner, and the number of EPDCCH candidates corresponding to the aggregation level 16 in the distributed mapping manner as 2; correspondingly, for the aggregation level being 32 and the aggregation level being 16, the user equipment determines a sum of the number of EPDCCH candidates corresponding to the aggregation level 16 in the localized mapping manner, the number of EPDCCH candidates corresponding to the aggregation level 32 in the distributed mapping manner, and the number of EPDCCH candidates corresponding to the aggregation level 16 in the distributed mapping manner as 2.

TABLE 7

| Aggregation level | The number of EPDCCH candidates in a set of a localized mapping manner | The number of EPDCCH candidates in a set of a distributed mapping manner |
| --- | --- | --- |
| 2 | 2 | 4 |
| 4 | 3 | 3 |
| 8 | 1 | 1 |
| 16 | 0 | 1 |
| 32 | 0 | 1 |

In Table 7, the network side device 10 allocates one of the EPDCCH candidates corresponding to the aggregation level 16 to the aggregation level 32 in the distributed mapping manner, but the present invention is not limited thereto. In another embodiment, the network side device may also allocate one or two of the EPDCCH candidates corresponding to the aggregation level 16 to the aggregation level 32 in the distributed mapping manner.

When only the threshold is considered, and the number of REs in the PRB pair of the physical control channel set and available for a physical control channel is greater than or equal to the threshold X, or when the transmission subframe is another subframe except the normal subframe or except the special subframe configured as 3, 4, or 8, and the number of REs in the PRB pair of the physical control channel set and available for a physical control channel is greater than or equal to the threshold X, for the aggregation level being 1, the network side device selects a sum of the number of EPDCCH candidates corresponding to the localized mapping manner and the number of EPDCCH candidates corresponding to the distributed mapping manner as 6; for the aggregation level being 2, the network side device selects a sum of the number of EPDCCH candidates corresponding to the localized mapping manner and the number of EPDCCH candidates corresponding to the distributed mapping manner as 6; for the aggregation level being 4, the network side device selects a sum of the number of EPDCCH candidates corresponding to the localized mapping manner and the number of EPDCCH candidates corresponding to the distributed mapping manner as 2; and for the aggregation level being 8, the network side selects a sum of the number of EPDCCH candidates corresponding to the localized mapping manner and the number of EPDCCH candidates corresponding to the distributed mapping manner as 2.

Correspondingly, for the aggregation level being 1, the user equipment determines a sum of the number of EPDCCH candidates corresponding to the localized mapping manner and the number of EPDCCH candidates corresponding to the distributed mapping manner as 6; for the aggregation level being 2, the user equipment determines a sum of the number of EPDCCH candidates corresponding to the localized mapping manner and the number of EPDCCH candidates corresponding to the distributed mapping manner as 6; for the aggregation level being 4, the user equipment determines a sum of the number of EPDCCH candidates corresponding to the localized mapping manner and the number of EPDCCH candidates corresponding to the distributed mapping manner as 2; and for the aggregation level being 8, the user equipment determines a sum of the number of EPDCCH candidates corresponding to the localized mapping manner and the number of EPDCCH candidates corresponding to the distributed mapping manner as 2.

In this embodiment, aggregation levels supported by the localized mapping manner are 1, 2, 4, and (8), and aggregation levels supported by the distributed mapping manner are 1, 2, 4, 8, and (16), where (8) indicates that the aggregation level 8 in the localized mapping manner is optional, (16) indicates that the aggregation level 16 in the distributed mapping manner is optional, and the aggregation level (8) in the localized manner and the aggregation level (16) in the distributed manner need to be used in some EPDCCH transmission scenarios. When the number of REs in the PRB pair and used for transmitting an EPDCCH is greater than or equal to the threshold, both the localized mapping manner and the distributed mapping manner support the aggregation levels {1, 2, 4, 8}, the setting of the PDCCH candidate channel continues to be used, and the numbers of EPDCCH candidates corresponding to the aggregation levels {1, 2, 4, 8} are {6, 6, 2, 2}. For the aggregation level being 1, the number of EPDCCH candidates corresponding thereto is 6, the network side device or the user equipment may allocate the 6 EPDCCH candidates to the set of the localized mapping and the set of the distributed mapping, for example, allocate all the 6 EPDCCH candidates to the set of the localized mapping manner, and allocate no EPDCCH candidate to the set of the distributed mapping manner. Specific configuration may be specified in the protocol, that is, preset, and may also be notified to the user equipment by sending signaling by the network side device. If the user equipment is notified by the network side device, the user equipment receives, before performing blind detection, the number of EPDCCH candidates corresponding to each aggregation level in the EPDCCH notified by the network side.

Table 8 is the eighth solution in which EPDCCH candidates are configured for the set of the localized mapping manner and the set of the distributed mapping manner. As shown in Table 8, for the localized mapping manner, the network side device selects both the number of EPDCCH candidates corresponding to the aggregation level 1 and the number of EPDCCH candidates corresponding to the aggregation level 2 as 6, and selects both the number of EPDCCH candidates corresponding to the aggregation level 4 and the number of EPDCCH candidates corresponding to the aggregation level 8 as 0; and for the distributed mapping manner, the network side device selects both the number of EPDCCH candidates corresponding to the aggregation level 1 and the number of EPDCCH candidates corresponding to the aggregation level 2 as 0, and selects both the number of EPDCCH candidates corresponding to the aggregation level 4 and the number of EPDCCH candidates corresponding to the aggregation level 8 as 2; correspondingly, for the localized mapping manner, the user equipment determines both the number of EPDCCH candidates corresponding to the aggregation level 1 and the number of EPDCCH candidates corresponding to the aggregation level 2 as 6, and determines both the number of EPDCCH candidates corresponding to the aggregation level 4 and the number of EPDCCH candidates corresponding to the aggregation level 8 as 0; and for the distributed mapping manner, the user equipment determines both the number of EPDCCH candidates corresponding to the aggregation level 1 and the number of EPDCCH candidates corresponding to the aggregation level 2 as 0, and determines both the number of EPDCCH candidates corresponding to the aggregation level 4 and the number of EPDCCH candidates corresponding to the aggregation level 8 as 2.

TABLE 8

| Aggregation level | The number of EPDCCH candidates in a set of a localized mapping manner | The number of EPDCCH candidates in a set of a distributed mapping manner |
|---|---|---|
| 1 | 6 | 0 |
| 2 | 6 | 0 |
| 4 | 0 | 2 |
| 8 | 0 | 2 |

Table 9 is the ninth solution in which EPDCCH candidates are configured for the set of the localized mapping manner and the set of the distributed mapping manner. As shown in Table 9, for the localized mapping manner, the network side device selects both the number of EPDCCH candidates corresponding to the aggregation level 1 and the number of EPDCCH candidates corresponding to the aggregation level 2 as 3, and selects both the number of EPDCCH candidates corresponding to the aggregation level 4 and the number of EPDCCH candidates corresponding to the aggregation level 8 as 1; and for the distributed mapping manner, the network side device selects both the number of EPDCCH candidates corresponding to the aggregation level 1 and the number of EPDCCH candidates corresponding to the aggregation level 2 as 3, and selects both the number of EPDCCH candidates corresponding to the aggregation level 4 and the number of EPDCCH candidates corresponding to the aggregation level 8 as 1.

Correspondingly, for the localized mapping manner, the user equipment determines both the number of EPDCCH candidates corresponding to the aggregation level 1 and the number of EPDCCH candidates corresponding to the aggregation level 2 as 3, and determines both the number of EPDCCH candidates corresponding to the aggregation level 4 and the number of EPDCCH candidates corresponding to the aggregation level 8 as 1; and for the distributed mapping manner, the user equipment determines both the number of EPDCCH candidates corresponding to the aggregation level 1 and the number of EPDCCH candidates corresponding to the aggregation level 2 as 3, and determines both the number of EPDCCH candidates corresponding to the aggregation level 4 and the number of EPDCCH candidates corresponding to the aggregation level 8 as 1.

TABLE 9

| Aggregation level | The number of EPDCCH candidates in a set of a localized mapping manner | The number of EPDCCH candidates in a set of a distributed mapping manner |
|---|---|---|
| 1 | 3 | 3 |
| 2 | 3 | 3 |
| 4 | 1 | 1 |
| 8 | 1 | 1 |

Table 10 is the tenth solution in which EPDCCH candidates are configured for the set of the localized mapping manner and the set of the distributed mapping manner. As shown in Table 10, for the localized mapping manner, the network side device selects the number of EPDCCH candidates corresponding to the aggregation level 1 as 6, and the number of EPDCCH candidates corresponding to the aggregation level 2, the number of EPDCCH candidates corresponding to the aggregation level 4, and the number of EPDCCH candidates corresponding to the aggregation level 8 as 0; and for the distributed mapping manner, the network side device selects the number of EPDCCH candidates corresponding to the aggregation level 1 as 0, selects the number of EPDCCH candidates corresponding to the aggregation level 2 as 6, and selects both the number of EPDCCH candidates corresponding to the aggregation level 4 and the number of EPDCCH candidates corresponding to the aggregation level 8 as 2.

Correspondingly, for the localized mapping manner, the user equipment determines the number of EPDCCH candidates corresponding to the aggregation level 1 as 6, and the number of EPDCCH candidates corresponding to the aggregation level 2, the number of EPDCCH candidates corresponding to the aggregation level 4, and the number of EPDCCH candidates corresponding to the aggregation level 8 as 0; and for the distributed mapping manner, the user equipment determines the number of EPDCCH candidates corresponding to the aggregation level 1 as 0, determines the number of EPDCCH candidates corresponding to the aggregation level 2 as 6, and determines both the number of EPDCCH candidates corresponding to the aggregation level 4 and the number of EPDCCH candidates corresponding to the aggregation level 8 as 2.

TABLE 10

| Aggregation level | The number of EPDCCH candidates in a set of a localized mapping manner | The number of EPDCCH candidates in a set of a distributed mapping manner |
| --- | --- | --- |
| 1 | 6 | 0 |
| 2 | 0 | 6 |
| 4 | 0 | 2 |
| 8 | 0 | 2 |

Table 8, Table 9, and Table 10 give merely a part of configuration manners, but the present invention is not limited thereto. Any method capable of enabling a sum of the number of EPDCCHs in the set of the localized mapping manner and corresponding to each aggregation level and the number of EPDCCH candidates in the set of the distributed mapping manner and corresponding to each aggregation level to satisfy the corresponding number of EPDCCHs can be used for implementing the present invention. For example, for the aggregation level being 1, the foregoing merely shows an example of a configuration manner where 6 or 3 EPDCCH candidates are allocated to the set of the localized mapping manner, and 0 or 3 EPDCCHs are allocated to the set of the distributed mapping manner. In another embodiment, the following configuration manner may be adopted: 2 or 5 EPDCCH candidates may be allocated to the set of the localized mapping manner and 4 or 1 EPDCCHs may be allocated to the set of the distributed mapping manner.

In the foregoing embodiment, both the set of the localized distribution and the set of the distributed mapping support the aggregation levels {2, 4, 8, 16}, and for the localized manner, the aggregation level 16 is optional. In another embodiment, for the localized manner, the aggregation level 16 may not be considered, and in this case, 2 EPDCCH candidates corresponding to the aggregation level 16 are both configured to the set of distributed mapping.

When a case where the set of the distributed mapping supports the aggregation level 16 is not considered, the network side device selects the number of EPDCCH candidates corresponding to the aggregation level 16 as 0, and the user equipment determines the number of EPDCCH candidates corresponding to the aggregation level 16 as 0.

When the case where the set of the distributed mapping supports the aggregation level 16 is considered, because the present invention continues to use the setting of the PDCCH candidate channel, and a sum of the numbers {6, 6, 2, 2} of EPDCCH candidates corresponding to the aggregation levels {1, 2, 4, 8} is unchanged, a part of EPDCCH candidates corresponding to the aggregation level 2 may be allocated to a set of a distributed mapping manner corresponding to the aggregation level 16; or, a part of EPDCCH candidates corresponding to the aggregation level 4 may be allocated to a set of a distributed mapping manner corresponding to the aggregation level 16; or, a part of EPDCCH candidates corresponding to the aggregation level 8 may be allocated to a set of a distributed mapping manner corresponding to the aggregation level 16; or, a part of EPDCCH candidates corresponding to the aggregation level 16 may be allocated to a set of a distributed mapping manner corresponding to the aggregation level 16.

Table 11 is the eleventh solution in which EPDCCH candidates are configured for the set of the localized mapping manner and the set of the distributed mapping manner. As shown in Table 11, for the aggregation level being 16 and the aggregation level being 1, the network side device selects a sum of the number of EPDCCH candidates corresponding to the aggregation level 16 in the localized mapping manner, the number of EPDCCH candidates corresponding to the aggregation level 1 in the localized mapping manner, the number of EPDCCH candidates corresponding to the aggregation level 16 in the distributed mapping manner, and the number of EPDCCH candidates corresponding to the aggregation level 1 in the distributed mapping manner as 6; correspondingly, for the aggregation level being 16 and the aggregation level being 1, the user equipment determines a sum of the number of EPDCCH candidates corresponding to the aggregation level 16 in the localized mapping manner, the number of EPDCCH candidates corresponding to the aggregation level 1 in the localized mapping manner, the number of EPDCCH candidates corresponding to the aggregation level 16 in the distributed mapping manner, and the number of EPDCCH candidates corresponding to the aggregation level 1 in the distributed mapping manner as 6.

TABLE 11

| Aggregation level | The number of EPDCCH candidates in a set of a localized mapping manner | The number of EPDCCH candidates in a set of a distributed mapping manner |
| --- | --- | --- |
| 1 | 2 | 2 |
| 2 | 0 | 6 |
| 4 | 0 | 2 |
| 8 | 0 | 2 |
| 16 | 0 | 2 |

In Table 11, the network side device 10 allocates two of the EPDCCH candidates corresponding to the aggregation level 1 to the aggregation level 16 in the distributed mapping manner, but the present invention is not limited thereto. In another embodiment, the network side device may also allocate one or N of the EPDCCH candidates corresponding to the aggregation level 1 to the aggregation level 16 in the distributed mapping manner.

Table 12 is the twelfth solution in which EPDCCH candidates are configured for the set of the localized mapping manner and the set of the distributed mapping manner. As shown in Table 12, for the aggregation level being 16 and the aggregation level being 2, the network side device selects a sum of the number of EPDCCH candidates corresponding to the aggregation level 16 in the localized mapping manner, the number of EPDCCH candidates corresponding to the aggregation level 2 in the localized mapping manner, the number of EPDCCH candidates corresponding to the aggregation level 16 in the distributed mapping manner, and the number of EPDCCH candidates corresponding to the aggregation level 2 in the distributed mapping manner as 6; correspondingly, for the aggregation level being 16 and the aggregation level being 2, the user equipment determines a sum of the number of EPDCCH candidates corresponding to the aggregation level 16 in the localized mapping manner, the number of EPDCCH candidates corresponding to the aggregation level 2 in the localized mapping manner, the number of EPDCCH candidates corresponding to the aggregation level 16 in the distributed mapping manner, and the number of EPDCCH candidates corresponding to the aggregation level 2 in the distributed mapping manner as 6.

TABLE 12

| Aggregation level | The number of EPDCCH candidates in a set of a localized mapping manner | The number of EPDCCH candidates in a set of a distributed mapping manner |
|---|---|---|
| 1 | 2 | 4 |
| 2 | 2 | 3 |
| 4 | 0 | 2 |
| 8 | 0 | 2 |
| 16 | 0 | 1 |

In Table 12, the network side device 10 allocates two of the EPDCCH candidates corresponding to the aggregation level 2 to the aggregation level 16 in the distributed mapping manner, but the present invention is not limited thereto. In another embodiment, the network side device may also allocate one or N of the EPDCCH candidates corresponding to the aggregation level 2 to the aggregation level 16 in the distributed mapping manner.

Table 13 is the thirteenth solution in which EPDCCH candidates are configured for the set of the localized mapping manner and the set of the distributed mapping manner. As shown in Table 13, for the aggregation level being 16 and the aggregation level being 4, the network side device selects a sum of the number of EPDCCH candidates corresponding to the aggregation level 16 in the localized mapping manner, the number of EPDCCH candidates corresponding to the aggregation level 4 in the localized mapping manner, the number of EPDCCH candidates corresponding to the aggregation level 16 in the distributed mapping manner, and the number of EPDCCH candidates corresponding to the aggregation level 4 in the distributed mapping manner as 2; correspondingly, for the aggregation level being 16 and the aggregation level being 4, the user equipment determines a sum of the number of EPDCCH candidates corresponding to the aggregation level 16 in the localized mapping manner, the number of EPDCCH candidates corresponding to the aggregation level 4 in the localized mapping manner, the number of EPDCCH candidates corresponding to the aggregation level 16 in the distributed mapping manner, and the number of EPDCCH candidates corresponding to the aggregation level 4 in the distributed mapping manner as 2.

TABLE 13

| Aggregation level | The number of EPDCCH candidates in a set of a localized mapping manner | The number of EPDCCH candidates in a set of a distributed mapping manner |
|---|---|---|
| 1 | 2 | 4 |
| 2 | 3 | 3 |
| 4 | 1 | 0 |
| 8 | 0 | 2 |
| 16 | 0 | 1 |

In Table 13, the network side device 10 allocates two of the EPDCCH candidates corresponding to the aggregation level 4 to the aggregation level 16 in the distributed mapping manner, but the present invention is not limited thereto. In another embodiment, the network side device may also allocate one or two of the EPDCCH candidates corresponding to the aggregation level 4 to the aggregation level 16 in the distributed mapping manner.

Table 14 is the fourteenth solution in which EPDCCH candidates are configured for the set of the localized mapping manner and the set of the distributed mapping manner. As shown in Table 14, for the aggregation level being 16 and the aggregation level being 8, the network side device selects a sum of the number of EPDCCH candidates corresponding to the aggregation level 16 in the localized mapping manner, the number of EPDCCH candidates corresponding to the aggregation level 8 in the localized mapping manner, the number of EPDCCH candidates corresponding to the aggregation level 16 in the distributed mapping manner, and the number of EPDCCH candidates corresponding to the aggregation level 8 in the distributed mapping manner as 2; correspondingly, for the aggregation level being 16 and the aggregation level being 8, the user equipment determines a sum of the number of EPDCCH candidates corresponding to the aggregation level 16 in the localized mapping manner, the number of EPDCCH candidates corresponding to the aggregation level 8 in the localized mapping manner, the number of EPDCCH candidates corresponding to the aggregation level 16 in the distributed mapping manner, and the number of EPDCCH candidates corresponding to the aggregation level 8 in the distributed mapping manner as 2.

TABLE 14

| Aggregation level | The number of EPDCCH candidates in a set of a localized mapping manner | The number of EPDCCH candidates in a set of a distributed mapping manner |
|---|---|---|
| 1 | 2 | 4 |
| 2 | 3 | 3 |
| 4 | 1 | 1 |
| 8 | 0 | 1 |
| 16 | 0 | 1 |

In Table 14, the network side device 10 allocates one of the EPDCCH candidates corresponding to the aggregation level 8 to the aggregation level 16 in the distributed mapping manner, but the present invention is not limited thereto. In another embodiment, the network side device may also allocate one or two of the EPDCCH candidates corresponding to the aggregation level 8 to the aggregation level 16 in the distributed mapping manner.

In the foregoing manner 1, after the physical control channel set is divided into two sets, the number of EPDCCH candidates may be allocated according to different forms of the EPDCCHs, that is, the maximum number of times that blind detection is performed is configured. For example, when the transmission subframe is the normal subframe or the special subframe configured as 3, 4, or 8, and the number of REs in a PRB pair and available for transmitting the EPDCCH is smaller than the threshold, aggregation levels supported by the localized mapping manner are 2, 4, 8, and (16), and aggregation levels supported by the distributed mapping manner are 2, 4, 8, 16, and (32), where (16) indicates that the aggregation level 16 in the localized mapping manner is optional, (32) indicates that the aggregation level 32 in the distributed mapping manner is optional, and the aggregation level (16) in the localized manner and the aggregation level (32) in the distributed manner need to be used in some EPDCCH transmission scenarios. Because the setting of the PDCCH candidate channel continues to be used, the sum of the numbers {6, 6, 2, 2} of EPDCCH candidates is unchanged. Therefore, for the set of the localized mapping manner, the allocated number of EPDCCH candidates is 10, and the remaining EPDCCH candidates are allocated to the distributed mapping manner. Specific configuration may be specified in the protocol, that is, preset, and may also be notified to the user equipment by sending signaling by the network side device. If the user equipment is notified by the network side device, the user equipment receives, before performing blind detection, the number of EPDCCH candidates corresponding to each aggregation level in the EPDCCH notified by the network side.

Table 15 is the first solution in which EPDCCH candidates are configured for the set of the localized mapping manner. As shown in Table 15, for the localized mapping manner, the network side device selects the number of EPDCCH candidates corresponding to the aggregation level 2 as 6, selects the number of EPDCCH candidates corresponding to the aggregation level 4 as 2, and selects the number of EPDCCH candidates corresponding to the aggregation level 8 as 2; and for the distributed mapping manner, the network side device chooses to allocate 6 EPDCCH candidates to at least one aggregation level; correspondingly, for the localized mapping manner, the user equipment determines the number of EPDCCH candidates corresponding to the aggregation level 2 as 6, determines the number of EPDCCH candidates corresponding to the aggregation level 4 as 6, and determines the number of EPDCCH candidates corresponding to the aggregation level 8 as 2; and for the distributed mapping manner, the user equipment determines to allocate 2 EPDCCH candidates to at least one aggregation level.

TABLE 15

| Type of a set | Aggregation level | The number of EPDCCH candidates in a set of a localized mapping manner |
| --- | --- | --- |
| Localized mapping manner | 2 | 6 |
| | 4 | 2 |
| | 8 | 2 |

In Table 15, the number of EPDCCH candidates allocated to the localized mapping manner is 6+2+2=10; if uplink multiple-input multiple-output (Multiple Input Multiple Output, hereinafter briefly referred to as MIMO) is not supported, the total the times that blind detection is performed is 10×2=20, where 2 indicates that blind detection needs to be performed on two types of DCI formats in one EPDCCH candidate; if the uplink MIMO is supported, blind detection also needs to be performed on another DCI format (such as, DCI format 4) for uplink scheduling, the maximum number of times that blind detection is performed is (6+2+2)×1=10, and in this case, the total the times that blind detection is performed is 20+10=30. The remaining 6 EPDCCH candidates are allocated to the set of the distributed mapping manner, that is, if the uplink MIMO is not supported, the maximum number of times that blind detection is performed allocated to the set of the distributed mapping manner is 6×2=12, and if the uplink MIMO is supported, the maximum number of times that blind detection is performed on another DCI format for uplink scheduling is 6×1, and the total the times that blind detection is performed is 12+6=18. Specifically, one aggregation level or several the aggregation levels the distributed mapping manner to which the remaining 6 EPDCCH candidates are allocated are selected according to the transmitted DCI, and generally, the remaining 6 EPDCCH candidates are allocated to a higher aggregation level of the distributed mapping manner, such as the aggregation level 8 or the aggregation level 16 or the aggregation level 32.

Table 16 is the second solution in which EPDCCH candidates are configured for the set of the localized mapping manner. As shown in Table 16, for the localized mapping manner, the network side device selects the number of EPDCCH candidates corresponding to the aggregation level 2 as 6, selects the number of EPDCCH candidates corresponding to the aggregation level 4 as 6, and selects the number of EPDCCH candidates corresponding to the aggregation level 8 as 2; and for the distributed mapping manner, the network side device chooses to allocate 2 EPDCCH candidates to at least one aggregation level; correspondingly, for the localized mapping manner, the user equipment determines the number of EPDCCH candidates corresponding to the aggregation level 2 as 6, determines the number of EPDCCH candidates corresponding to the aggregation level 4 as 6, and determines the number of EPDCCH candidates corresponding to the aggregation level 8 as 2; and for the distributed mapping manner, the user equipment 20 determines to allocate 2 EPDCCH candidates to at least one aggregation level.

TABLE 16

| Type of a set | Aggregation level | The number of EPDCCH candidates in a set of a localized mapping manner |
| --- | --- | --- |
| Localized mapping manner | 2 | 6 |
| | 4 | 6 |
| | 8 | 2 |

In Table 16, the number of EPDCCH candidates allocated to the localized mapping manner is 6+6+2=14; if uplink multiple-input multiple-output (Multiple Input Multiple Output, hereinafter briefly referred to as MIMO) is not supported, the total the times that blind detection is performed is 14×2=28, where 2 indicates that blind detection needs to be performed on two types of DCI formats in one EPDCCH candidate; if the uplink MIMO is supported, blind detection also needs to be performed on another DCI format (such as, DCI format 4) for uplink scheduling, the maximum number of times that blind detection is performed is (6+6+2)×1=14, and in this case, the total the times that blind detection is performed is 28+14=42. The remaining 2 EPDCCH candidates are allocated to the set of the distributed mapping manner, that is, if the uplink MIMO is not supported, the maximum number of times that blind detection is performed allocated to the set of the distributed mapping manner is 2×2=4, and if the uplink MIMO is supported, the maximum number of times that blind detection is performed on another DCI format for uplink scheduling is 2×1, and the total the times that blind detection is performed is 4+2=6. Specifically, one aggregation level or several aggregation levels of the distributed mapping manner to which the remaining 2 EPDCCH candidates are allocated are selected according to the transmitted DCI, and generally, the remaining 2 EPDCCH candidates are allocated to a higher aggregation level of the distributed mapping manner, such as the aggregation level 8 or the aggregation level 16 or the aggregation level 32.

When the transmission subframe is another subframe except the normal subframe or the special subframe configured as 3, 4, or 8, and the number of REs in one PRB pair and available for transmitting the EPDCCH is greater than or equal to the threshold, aggregation levels supported by the localized mapping manner are 1, 2, 4, and (8), and aggregation levels supported by the distributed mapping manner are 1, 2, 4, 8, and (16), where (8) indicates that the aggregation level 8 in the localized mapping manner is optional, (16) indicates that the aggregation level 16 in the distributed mapping manner is optional, and the aggregation level (8) in the localized manner and the aggregation level

(16) in the distributed manner need to be used in some EPDCCH transmission scenarios. Because the setting of the PDCCH candidate channel continues to be used, the sum of the numbers {6, 6, 2, 2} of EPDCCH candidates is unchanged. Therefore, for the set of the localized mapping manner, the allocated number of EPDCCH candidates is 10, and the remaining EPDCCH candidates are allocated to the distributed mapping manner. Specific configuration may be specified in the protocol, that is, preset, and may also be notified to the user equipment by sending signaling by the network side device. If the user equipment is notified by the network side device, the user equipment receives, before performing blind detection, the number of EPDCCH candidates corresponding to each aggregation level in the EPDCCH notified by the network side.

Table 17 is the third solution in which EPDCCH candidates are configured for the set of the localized mapping manner. As shown in Table 17, for the localized mapping manner, the network side device selects the number of EPDCCH candidates corresponding to the aggregation level 1 as 6, selects the number of EPDCCH candidates corresponding to the aggregation level 2 as 2, and selects the number of EPDCCH candidates corresponding to the aggregation level 4 as 2; and for the distributed mapping manner, the network side device chooses to allocate 6 EPDCCH candidates to at least one aggregation level; correspondingly, for the localized mapping manner, the user equipment determines the number of EPDCCH candidates corresponding to the aggregation level 1 as 6, determines the number of EPDCCH candidates corresponding to the aggregation level 2 as 2, and determines the number of EPDCCH candidates corresponding to the aggregation level 4 as 2; and for the distributed mapping manner, the user equipment determines to allocate 6 EPDCCH candidates to at least one aggregation level.

TABLE 17

| Type of a set | Aggregation level | The number of EPDCCH candidates in a set of a localized mapping manner |
|---|---|---|
| Localized mapping manner | 1 | 6 |
| | 2 | 2 |
| | 4 | 2 |

In Table 17, the number of EPDCCH candidates allocated to the localized mapping manner is 6+2+2=10; if uplink multiple-input multiple-output (Multiple Input Multiple Output, hereinafter briefly referred to as MIMO) is not supported, the total the times that blind detection is performed is 10×2=20, where 2 indicates that blind detection needs to be performed on two types of DCI formats in one EPDCCH candidate; if the uplink MIMO is supported, blind detection also needs to be performed on another DCI format (such as, DCI format 4) for uplink scheduling, the maximum number of times that blind detection is performed is (6+2+2)×1=10, and in this case, the total the times that blind detection is performed is 20+10=30. The remaining 6 EPDCCH candidates are allocated to the set of the distributed mapping manner, that is, if the uplink MIMO is not supported, the maximum number of times that blind detection is performed allocated to the set of the distributed mapping manner is 6×2=-12, and if the uplink MIMO is supported, the maximum number of times that blind detection is performed on another DCI format for uplink scheduling is 6×1, and the total the times that blind detection is performed is 12±6=18. Specifically, one aggregation level or several aggregation levels of the distributed mapping manner to which the remaining 6 EPDCCH candidates are allocated are selected according to the transmitted DCI, and generally, the remaining 6 EPDCCH candidates are allocated to a higher aggregation level of the distributed mapping manner, such as the aggregation level 8 or the aggregation level 16.

Table 18 is the fourth solution in which EPDCCH candidates are configured for the set of the localized mapping manner. As shown in Table 18, for the localized mapping manner, the network side device selects the number of EPDCCH candidates corresponding to the aggregation level 1 as 6, selects the number of EPDCCH candidates corresponding to the aggregation level 2 as 6, and selects the number of EPDCCH candidates corresponding to the aggregation level 4 as 2; and for the distributed mapping manner, the network side device chooses to allocate 2 EPDCCH candidates to at least one aggregation level; correspondingly, for the localized mapping manner, the user equipment determines the number of EPDCCH candidates corresponding to the aggregation level 1 as 6, determines the number of EPDCCH candidates corresponding to the aggregation level 2 as 6, and determines the number of EPDCCH candidates corresponding to the aggregation level 4 as 2; and for the distributed mapping manner, the user equipment determines to allocate 2 EPDCCH candidates to at least one aggregation level.

TABLE 18

| Type of a set | Aggregation level | The number of EPDCCH candidates in a set of a localized mapping manner |
|---|---|---|
| Localized mapping manner | 1 | 6 |
| | 2 | 6 |
| | 4 | 2 |

In Table 18, the number of EPDCCH candidates allocated to the localized mapping manner is 6+6+2=14; if uplink multiple-input multiple-output (Multiple Input Multiple Output, hereinafter briefly referred to as MIMO) is not supported, the total the times that blind detection is performed is 14×2=28, where 2 indicates that blind detection needs to be performed on two types of DCI formats in one EPDCCH candidate; if the uplink MIMO is supported, blind detection also needs to be performed on another DCI format (such as, DCI format 4) for uplink scheduling, the maximum number of times that blind detection is performed is (6+6+2)×1=14, and in this case, the total the times that blind detection is performed is 28+14=42. The remaining 2 EPDCCH candidates are allocated to the set of the distributed mapping manner, that is, if the uplink MIMO is not supported, the maximum number of times that blind detection is performed allocated to the set of the distributed mapping manner is 2×2=4, and if the uplink MIMO is supported, the maximum number of times that blind detection is performed on another DCI format for uplink scheduling is 2×1, and the total the times that blind detection is performed is 4+2=6. Specifically, one aggregation level or several aggregation levels of the distributed mapping manner to which the remaining 2 EPDCCH candidates are allocated are selected according to the transmitted DCI, and generally, the remaining 2 EPDCCH candidates are allocated to a higher aggregation level of the distributed mapping manner, such as the aggregation level 8 or the aggregation level 16.

The foregoing embodiment shows merely a part of possible implementation manners, but the present invention is not limited thereto. In another implementation manner, the maximum number of times that blind detection is performed of one or several aggregation levels of the set of the localized mapping manner is X, and then, the maximum number of times that blind detection is performed of one or several aggregation levels of the set of distributed mapping manner is [(32 or 48)−X], where a value of X may be a predefined value, or may be notified to the user equipment through signaling, or may be a bandwidth-related parameter.

Manner 2

In a process of selecting the number of physical control channel candidates corresponding to the aggregation level according to the aggregation level, the network side device does not need to divide the physical control channel set into two sets, and instead, selects the number of physical control channel candidates corresponding to the to-be-detected aggregation level of the physical control channel set; correspondingly, the user equipment determines the number of physical control channel candidates corresponding to the to-be-detected aggregation level of the physical control channel set.

Specifically, when the physical control channel set is in the localized mapping manner, for a same aggregation level, the network side device selects the number of physical control channel candidates corresponding to the aggregation level according to the number of PRBs of the physical control channel set; correspondingly, when the physical control channel set is in the localized mapping manner, for a same aggregation level, the user equipment determines the number of physical control channel candidates corresponding to the aggregation level according to the number of PRBs of the physical control channel set; and when the physical control channel set is in the distributed mapping manner, for a same aggregation level, the network side device selects the number of physical control channel candidates corresponding to the aggregation level according to the number of PRBs of the physical control channel set; correspondingly, when the physical control channel set is in the distributed mapping manner, for a same aggregation level, the user equipment determines the number of physical control channel candidates corresponding to the aggregation level according to the number of PRBs of the physical control channel set.

Preferably, when the physical control channel set is in the localized mapping manner, for the same aggregation level, the network side device selects the number of physical control channel candidates corresponding to the aggregation level according to the number of PRBs of the physical control channel set, where the number of physical control channel candidates is in direct proportion to the number of PRBs; correspondingly, when the physical control channel set is in the localized mapping manner, for the same aggregation level, the user equipment determines the number of physical control channel candidates corresponding to the aggregation level according to the number of PRBs of the physical control channel set, where the number of physical control channel candidates is in direct proportion to the number of PRBs.

Correspondingly, when the physical control channel set is in the distributed mapping manner, for a same aggregation level, the network side device selects the number of physical control channel candidates corresponding to the aggregation level according to the number of PRBs of the physical control channel set, where the number of physical control channel candidates is in direct proportion to the number; correspondingly, when the physical control channel set is in the distributed mapping manner, for a same aggregation level, the user equipment determines the number of physical control channel candidates corresponding to the aggregation level according to the number of PRBs of the physical control channel set, where the number of physical control channel candidates is in direct proportion to the number.

In the foregoing embodiment, no matter whether it is the localized mapping manner or the distributed mapping manner, for a same aggregation level, the configured EPDCCH candidate is related to the number N of PRBs in each EPDCCH set, for example, when N=8, it indicates that the aggregation level an EPDCCH of the distributed mapping manner is at least 2. Generally, when N is greater, it indicates that the number of physical control channel candidates is larger.

Specifically, when the physical control channel set is in a distributed mapping manner, if the number N of PRBs included in the physical control channel set is 8, the network side device selects the number of physical control channel candidates corresponding to the aggregation level 1 of the physical control channel set as 0; when the physical control channel set is in the distributed mapping manner, if the number N of PRBs included in the physical control channel set is 16, the network side device selects the number of physical control channel candidates corresponding to the aggregation level 1 of the physical control channel set and the number of physical control channel candidates corresponding to the aggregation level 2 of the physical control channel set as 0.

Correspondingly, when the physical control channel set is in the distributed mapping manner, if the number N of PRBs included in the physical control channel set is 8, the user equipment determines the number of physical control channel candidates corresponding to the aggregation level 1 of the physical control channel set as 0; when the physical control channel set is in the distributed mapping manner, if the number N of PRBs included in the physical control channel set is 16, the user equipment determines the number of physical control channel candidates corresponding to the aggregation level 1 of the physical control channel set and the number of physical control channel candidates corresponding to the aggregation level 2 of the physical control channel set as 0.

The network side device 10 sends, on an EPDCCH candidate corresponding to the distributed mapping manner, downlink control information scrambled by using an SI-RNTI or an RA-RNTI, sends, on an EPDCCH candidate corresponding to the localized mapping manner, downlink control information scrambled by using another RNTI except the SI-RNTI and the RA-RNTI; correspondingly, the user equipment receives, on an EPDCCH candidate corresponding to the distributed mapping manner, downlink control information scrambled by using the SI-RNTI or the RA-RNTI, and receives, on an EPDCCH candidate corresponding to the localized mapping manner, downlink control information scrambled by using another RNTI except the SI-RNTI and the RA-RNTI.

In this embodiment, downlink control information scrambled by using a system information-radio network temporary identifier (System Information-Radio Network Temporary Identifier, hereinafter briefly referred to as SI-RNTI), a random access-RNTI (Random Access-RNTI, hereinafter briefly referred to as RA-RNTI), and a paging RNTI (Paging-RNTI, hereinafter briefly referred to as P-RNTI) is borne on the EPDCCH candidate of the distributed mapping manner. In addition, if the downlink control information is of format 0 or format 1A, it is also borne on the EPDCCH candidate of the distributed mapping manner. Control signaling scrambled by using another RNTI is borne on the EPDCCH candidate of the localized mapping manner.

The network side device sends, on an EPDCCH candidate corresponding to any one of the localized mapping manner and the distributed mapping manner, downlink control information including a cross-carrier scheduling instruction, and sends, on an EPDCCH candidate corresponding to the other manner, downlink control information not including the cross-carrier scheduling instruction; correspondingly, the user equipment receives, on an EPDCCH candidate corresponding to any one of the localized mapping manner and the distributed mapping manner, downlink control information including a cross-carrier scheduling instruction, and receives, on an EPDCCH candidate corresponding to the other manner, downlink control information not including the cross-carrier scheduling instruction.

The network side device sends downlink control information of format 0 and/or format 1A on an EPDCCH of the EPDCCH candidates corresponding to the distributed mapping manner, and sends downlink control information of format 2C on an EPDCCH of the EPDCCH candidates corresponding to the localized mapping manner; the network side device selects the maximum number of times that blind detection is performed corresponding to the distributed mapping manner as 16, and the maximum number of times that blind detection is performed corresponding to the localized mapping manner as 16.

Correspondingly, the user equipment receives downlink control information of format 0 and/or format 1A on an EPDCCH of the EPDCCH candidates corresponding to the distributed mapping manner, and receives downlink control information of format 2C on an EPDCCH of the EPDCCH candidates corresponding to the localized mapping manner; the user equipment determines the maximum number of times that blind detection is performed corresponding to the distributed mapping manner as 16, and the maximum number of times that blind detection is performed corresponding to the localized mapping manner as 16.

In the foregoing embodiment, EPDCCH candidates are allocated for the localized manner and the distributed manner according to the format DCI format.

Preferably, the network side device sends an EPDCCH with an aggregation level greater than or equal to a set value on an EPDCCH candidate corresponding to the distributed mapping manner, and sends an EPDCCH with an aggregation level smaller than the set value on an EPDCCH candidate corresponding to the localized mapping manner. Correspondingly, the user equipment receives an EPDCCH with an aggregation level greater than or equal to a set value on an EPDCCH candidate corresponding to the distributed mapping manner, and receives an EPDCCH with an aggregation level smaller than the set value on an EPDCCH candidate corresponding to the localized mapping manner.

In this embodiment, according to the magnitude of the aggregation level, EPDCCH candidates corresponding to the aggregation level greater than or equal to the set value are allocated to the localized mapping manner, and EPDCCH candidates corresponding to the aggregation level smaller than the set value are allocated to the distributed mapping manner. A value of K may be 1, 2, 4, 8, or 32, or the like, and the value of K may be predefined, or notified to the UE through signaling, or a bandwidth-related parameter.

Figure 2:
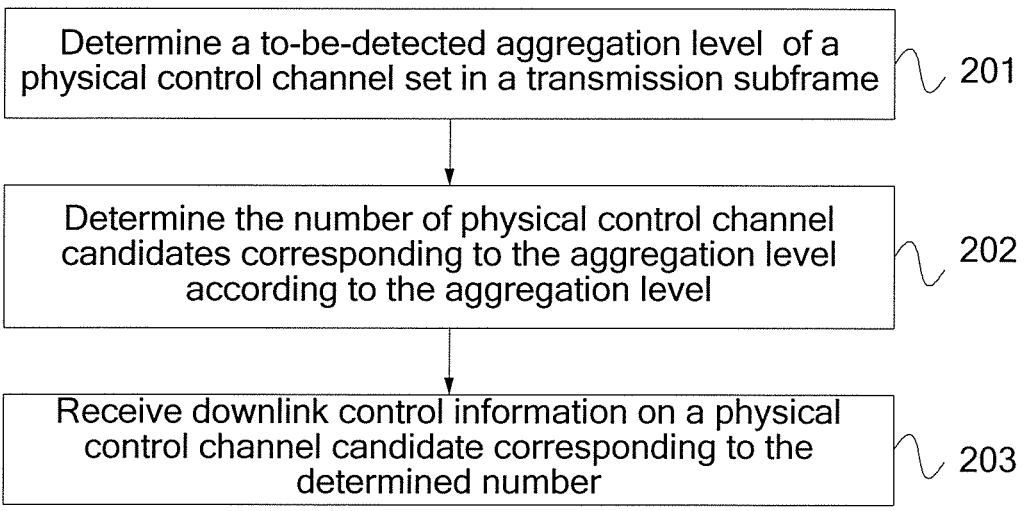
FIG. 2 is a flow chart of an embodiment of a method for transmitting downlink control information by a user equipment according to the present invention.

FIG. 2 is a flow chart of an embodiment of a method for transmitting downlink control information by a user equipment according to the present invention. As shown in FIG. 2, the method for transmitting downlink control information by a user equipment according to the present invention includes the following steps:

Step 201: Determine a to-be-detected aggregation level of a physical control channel set in a transmission subframe.

Step 202: Determine the number of physical control channel candidates corresponding to the aggregation level according to the aggregation level.

Step 203: Receive downlink control information on a physical control channel candidate corresponding to the determined number.

Based on a same inventive idea, because the principle of solving problems in the method for transmitting a physical control channel by a user equipment provided in the foregoing embodiment of the present invention is similar to that of the network side device in a method for transmitting downlink control information, for the implementation of the method, reference may be made to the embodiment of the network side, which will not be described herein again.

Figure 3:
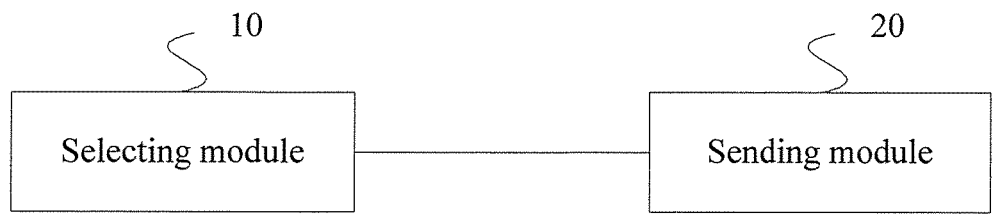
FIG. 3 is a schematic structural diagram of Embodiment 1 of a network side device according to the present invention.

FIG. 3 is a schematic structural diagram of Embodiment 1 of a network side device according to the present invention. As shown in FIG. 3, the network side device provided by the embodiment of the present invention includes a selecting module 10 and a sending module 20.

The selecting module 10 is configured to select a to-be-detected aggregation level of a physical control channel set in a transmission subframe, and select the number of physical control channel candidates corresponding to the aggregation level according to the aggregation level.

The sending module 20 is configured to send downlink control information on a physical control channel candidate corresponding to the selected number.

Preferably, the selecting module 10 is specifically configured to: when the number of REs in a PRB pair of the physical control channel set that are available for a physical control channel is smaller than a threshold X, select a minimum to-be-detected aggregation level of the physical control channel set as 2; and when the number of REs included in the PRB pair of the physical control channel set is greater than or equal to the threshold X, select the minimum to-be-detected aggregation level of the physical control channel set as 1; or when a transmission subframe type is a normal subframe with a normal CP length or a special subframe configured as 3, 4, or 8, and the number of REs in one PRB pair that are available for a physical control channel is smaller than X, select a minimum to-be-detected aggregation level of the physical control channel set as 2; or otherwise, when the subframe is not the normal subframe with the normal CP length, and is another subframe type except the special subframe configured as 3, 4, or 8, or the number of REs in one PRB pair that are available for a physical control channel is greater than X, select the minimum to-be-detected aggregation level of the physical control channel set as 1.

Preferably, the selecting module 10 is specifically configured to divide the physical control channel set into two sets, where one set corresponds to a localized mapping manner of the physical control channel, and the other set corresponds to a distributed mapping manner of the physical control channel; and respectively select the number of EPDCCH candidates corresponding to each aggregation level in the localized mapping manner and the distributed mapping manner.

Preferably, when the transmission subframe is a normal subframe or a special subframe configured as 3, 4, or 8, and the number of REs in one PRB pair and used for bearing the EPDCCH is smaller than a threshold, 10, for the aggregation level being 2, the selecting module 10 selects a sum of the number of EPDCCH candidates corresponding to the localized mapping manner and the number of EPDCCH candidates corresponding to the distributed mapping manner as 6;

for the aggregation level being 4, the selecting module 10 selects a sum of the number of EPDCCH candidates corresponding to the localized mapping manner and the number of EPDCCH candidates corresponding to the distributed mapping manner as 6;

for the aggregation level being 8, the selecting module 10 selects a sum of the number of EPDCCH candidates corresponding to the localized mapping manner and the number of EPDCCH candidates corresponding to the distributed mapping manner as 2; and for the aggregation level being 16, the selecting module 10 selects a sum of the number of EPDCCH candidates corresponding to the localized mapping manner and the number of EPDCCH candidates corresponding to the distributed mapping manner as 2.

In the foregoing embodiment, for the distributed mapping manner, the selecting module 10 selects the number of EPDCCH candidates corresponding to the aggregation level 32 as 0.

When the aggregation level 32 is considered in the distributed mapping, for the aggregation level being 32 and the aggregation level being 2, the selecting module 10 selects a sum of the number of EPDCCH candidates corresponding to the aggregation level 2 in the localized mapping manner, the number of EPDCCH candidates corresponding to the aggregation level 32 in the distributed mapping manner, and the number of EPDCCH candidates corresponding to the aggregation level 2 in the distributed mapping manner as 6; or for the aggregation level being 32 and the aggregation level being 4, the selecting module 10 selects a sum of the number of EPDCCH candidates corresponding to the aggregation level 4 in the localized mapping manner, the number of EPDCCH candidates corresponding to the aggregation level 32 in the distributed mapping manner, and the number of EPDCCH candidates corresponding to the aggregation level 2 in the distributed mapping manner as 6; or for the aggregation level being 32 and the aggregation level being 8, the selecting module 10 selects a sum of the number of EPDCCH candidates corresponding to the aggregation level 8 in the localized mapping manner, the number of EPDCCH candidates corresponding to the aggregation level 32 in the distributed mapping manner, and the number of EPDCCH candidates corresponding to the aggregation level 8 in the distributed mapping manner as 2; or for the aggregation level being 32 and the aggregation level being 16, the selecting module 10 selects a sum of the number of EPDCCH candidates corresponding to the aggregation level 16 in the localized mapping manner, the number of EPDCCH candidates corresponding to the aggregation level 32 in the distributed mapping manner, and the number of EPDCCH candidates corresponding to the aggregation level 16 in the distributed mapping manner as 2.

Preferably, when the transmission subframe is another subframe except a normal subframe or a special subframe configured as 3, 4, or 8, and the number of REs in one PRS pair and used for bearing the EPDCCH is greater than or equal to a threshold, 10, for the aggregation level being 1, the selecting module 10 selects a sum of the number of EPDCCH candidates corresponding to the localized mapping manner and the number of EPDCCH candidates corresponding to the distributed mapping manner as 6;

for the aggregation level being 2, the selecting module 10 selects a sum of the number of EPDCCH candidates corresponding to the localized mapping manner and the number of EPDCCH candidates corresponding to the distributed mapping manner as 6;

for the aggregation level being 4, the selecting module 10 selects a sum of the number of EPDCCH candidates corresponding to the localized mapping manner and the number of EPDCCH candidates corresponding to the distributed mapping manner as 2; and for the aggregation level being 8, the selecting module 10 selects a sum of the number of EPDCCH candidates corresponding to the localized mapping manner and the number of EPDCCH candidates corresponding to the distributed mapping manner as 2.

Preferably, for the localized mapping manner, the selecting module 10 selects both the number of EPDCCH candidates corresponding to the aggregation level 1 and the number of EPDCCH candidates corresponding to the aggregation level 2 as 6, and selects both the number of EPDCCH candidates corresponding to the aggregation level 4 and the number of EPDCCH candidates corresponding to the aggregation level 8 as 0; and for the distributed mapping manner, the selecting module 10 selects both the number of EPDCCH candidates corresponding to the aggregation level 1 and the number of EPDCCH candidates corresponding to the aggregation level 2 as 0, and selects both the number of EPDCCH candidates corresponding to the aggregation level 4 and the number of EPDCCH candidates corresponding to the aggregation level 8 as 2; or for the localized mapping manner, the selecting module 10 selects both the number of EPDCCH candidates corresponding to the aggregation level 1 and the number of EPDCCH candidates corresponding to the aggregation level 2 as 3, and selects both the number of EPDCCH candidates corresponding to the aggregation level 4 and the number of EPDCCH candidates corresponding to the aggregation level 8 as 1; and for the distributed mapping manner, the selecting module 10 selects both the number of EPDCCH candidates corresponding to the aggregation level 1 and the number of EPDCCH candidates corresponding to the aggregation level 2 as 3, and selects both the number of EPDCCH candidates corresponding to the aggregation level 4 and the number of EPDCCH candidates corresponding to the aggregation level 8 as 1; or for the localized mapping manner, the selecting module 10 selects the number of EPDCCH candidates corresponding to the aggregation level 1 as 6, and the number of EPDCCH candidates corresponding to the aggregation level 2, the number of EPDCCH candidates corresponding to the aggregation level 4, and the number of EPDCCH candidates corresponding to the aggregation level 8 as 0; and for the distributed mapping manner, the selecting module 10 selects the number of EPDCCH candidates corresponding to the aggregation level 1 as 0, selects the number of EPDCCH candidates corresponding to the aggregation level 2 as 6, and selects both the number of EPDCCH candidates corresponding to the aggregation level 4 and the number of EPDCCH candidates corresponding to the aggregation level 8 as 2.

In the foregoing embodiment, for the distributed mapping manner, the selecting module 10 selects the number of EPDCCH candidates corresponding to the aggregation level 16 as 0.

When the aggregation level 16 is considered in the distributed mapping, for the aggregation level being 16 and the aggregation level being 1, the selecting module 10 selects a sum of the number of EPDCCH candidates corresponding to the aggregation level 16 in the localized mapping manner, the number of EPDCCH candidates corresponding to the aggregation level 1 in the localized mapping manner, the number of EPDCCH candidates corresponding to the aggregation level 16 in the distributed mapping manner, and the number of EPDCCH candidates corresponding to the aggregation level 1 in the distributed mapping manner as 6; or for the aggregation level being 16 and the aggregation level being 2, the selecting module 10 selects a sum of the number of EPDCCH candidates corresponding to the aggregation level 16 in the localized mapping manner, the number of EPDCCH candidates corresponding to the aggregation level 2 in the localized mapping manner, the number of EPDCCH candidates corresponding to the aggregation level 16 in the distributed mapping manner, and the number of EPDCCH candidates corresponding to the aggregation level 2 in the distributed mapping manner as 6; or for the aggregation level being 16 and the aggregation level being 4, the selecting module 10 selects a sum of the number of EPDCCH candidates corresponding to the aggregation level 16 in the localized mapping manner, the number of EPDCCH candidates corresponding to the aggregation level 4 in the localized mapping manner, the number of EPDCCH candidates corresponding to the aggregation level 16 in the distributed mapping manner, and the number of EPDCCH candidates corresponding to the aggregation level 4 in the distributed mapping manner as 2; or for the aggregation level being 16 and the aggregation level being 8, the selecting module 10 selects a sum of the number of EPDCCH candidates corresponding to the aggregation level 16 in the localized mapping manner, the number of EPDCCH candidates corresponding to the aggregation level 8 in the localized mapping manner, the number of EPDCCH candidates corresponding to the aggregation level 16 in the distributed mapping manner, and the number of EPDCCH candidates corresponding to the aggregation level 8 in the distributed mapping manner as 2.

In the case where EPDCCH candidates are firstly allocated for the localized mapping manner, for the localized mapping manner, the selecting module 10 selects the number of EPDCCH candidates corresponding to the aggregation level 2 as 6, selects the number of EPDCCH candidates corresponding to the aggregation level 4 as 2, and selects the number of EPDCCH candidates corresponding to the aggregation level 8 as 2; and for the distributed mapping manner, the selecting module 10 chooses to allocate 6 EPDCCH candidates to at least one aggregation level; or for the localized mapping manner, the selecting module 10 selects the number of EPDCCH candidates corresponding to the aggregation level 2 as 6, selects the number of EPDCCH candidates corresponding to the aggregation level 4 as 6, and selects the number of EPDCCH candidates corresponding to the aggregation level 8 as 2; and for the distributed mapping manner, the selecting module 10 chooses to allocate 2 EPDCCH candidates to at least one aggregation level; or for the localized mapping manner, the selecting module 10 selects the number of EPDCCH candidates corresponding to the aggregation level 1 as 6, selects the number of EPDCCH candidates corresponding to the aggregation level 2 as 2, and selects the number of EPDCCH candidates corresponding to the aggregation level 4 as 2; and for the distributed mapping manner, the selecting module 10 chooses to allocate 6 EPDCCH candidates to at least one aggregation level; or for the localized mapping manner, the selecting module 10 selects the number of EPDCCH candidates corresponding to the aggregation level 1 as 6, selects the number of EPDCCH candidates corresponding to the aggregation level 2 as 6, and selects the number of EPDCCH candidates corresponding to the aggregation level 4 as 2; and for the distributed mapping manner, the selecting module 10 chooses to allocate 2 EPDCCH candidates to at least one aggregation level.

In another implementation manner, the EPDCCH set does not need to be divided into two sets, and instead, the number of physical control channel candidates of each EPDCCH set is selected. In this embodiment, the selecting module 10 is configured to select the number of physical control channel candidates corresponding to the to-be-detected aggregation level of the physical control channel set.

Preferably, when the physical control channel set is in the localized mapping manner, for a same aggregation level, the selecting module 10 selects the number of physical control channel candidates corresponding to the aggregation level according to the number of PRBs of the physical control channel set; and when the physical control channel set is in the distributed mapping manner, for a same aggregation level, the selecting module 10 selects the number of physical control channel candidates corresponding to the aggregation level according to the number of PRBs of the physical control channel set.

Generally, when the physical control channel set is in the localized mapping manner, for the same aggregation level, the selecting module 10 selects the number of physical control channel candidates corresponding to the aggregation level according to the number of PRBs of the physical control channel set, where the number of physical control channel candidates is in direct proportion to the number of PRBs; and when the physical control channel set is in the distributed mapping manner, for the same aggregation level, the selecting module 10 selects the number of physical control channel candidates corresponding to the aggregation level according to the number of PRBs of the physical control channel set, where the number of physical control channel candidates is in direct proportion to the number of PRBs.

In the foregoing embodiment, the sending module 20 is configured to send, on an EPDCCH candidate corresponding to the distributed mapping manner, downlink control information scrambled by using an SI-RNTI or an RA-RNTI, and send, on an EPDCCH candidate corresponding to the localized mapping manner, downlink control information scrambled by using another RNTI except the SI-RNTI and the RA-RNTI.

The sending module 20 is further configured to send, on an EPDCCH candidate corresponding to one of the localized mapping manner and the distributed mapping manner, downlink control information including a cross-carrier scheduling instruction, and send, on an EPDCCH candidate corresponding to the other manner, downlink control information not including the cross-carrier scheduling instruction.

The sending module 20 is further configured to send downlink control information with format 0 and/or format 1A through an EPDCCH of the EPDCCH candidates corresponding to the distributed mapping manner, and send downlink control information with format 2C through an EPDCCH of the EPDCCH candidates corresponding to the localized manner; and the selecting module 10 is further configured to select the maximum number of times that blind detection is performed corresponding to the distributed mapping manner as 16, and the maximum number of times that blind detection is performed corresponding to the localized mapping manner as 16.

In another embodiment, the sending module 20 is configured to send an EPDCCH with an aggregation level greater than or equal to a set value on an EPDCCH candidate corresponding to the distributed mapping manner, and send an EPDCCH with an aggregation level smaller than the set value on an EPDCCH candidate corresponding to the localized mapping manner.

Figure 4:
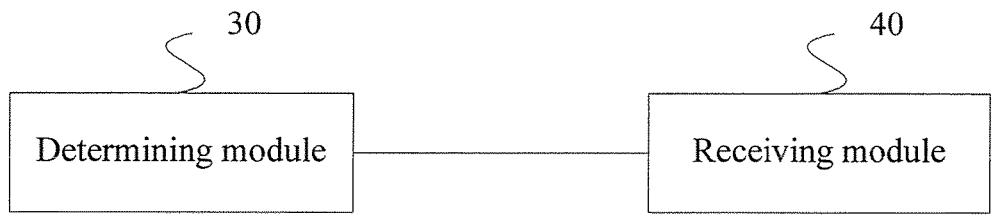
FIG. 4 is a schematic structural diagram of Embodiment 1 of a user equipment according to the present invention.

FIG. 4 is a schematic structural diagram of Embodiment 1 of a user equipment according to the present invention. As shown in FIG. 4, the user equipment provided by the embodiment of the present invention includes: a determining module 30 and a receiving module 40.

The determining module 30 is configured to determine a to-be-detected aggregation level of a physical control channel set in a transmission subframe, and determine the number of physical control channel candidates corresponding to the aggregation level according to the aggregation level.

The receiving module 40 is configured to receive downlink control information on a physical control channel candidate corresponding to the determined number.

Preferably, the determining module 30 is configured to: when the number of REs in a PRB pair of the physical control channel set that are available for a physical control channel is smaller than a threshold X, determine a minimum to-be-detected aggregation level of the physical control channel set as 2; and when the number of REs included in the PRB pair of the physical control channel set is greater than or equal to the threshold X, determine the minimum to-be-detected aggregation level of the physical control channel set as 1; or when a transmission subframe type is a normal subframe with a normal CP length or a special subframe configured as 3, 4, or 8, and the number of REs in one PRB pair that are available for a physical control channel is smaller than X, determine a minimum to-be-detected aggregation level of the physical control channel set as 2; or otherwise, when the subframe is not the normal subframe with the normal CP length, and is another subframe except the special subframe configured as 3, 4, or 8, or the number of REs in one PRB pair that are available for a physical control channel is greater than X, determine the minimum to-be-detected aggregation level of the physical control channel set as 1.

Preferably, the determining module 30 is configured to divide the physical control channel set into two sets, where one set corresponds to a localized mapping manner of the physical control channel, and the other set corresponds to a distributed mapping manner of the physical control channel; and respectively determine the number of EPDCCH candidates corresponding to each aggregation level in the localized mapping manner and the distributed mapping manner.

Preferably, when the transmission subframe is a normal subframe or a special subframe configured as 3, 4, or 8, and the number of REs in one PRB pair and used for bearing the EPDCCH is smaller than a threshold, 10, for the aggregation level being 2, the determining module 30 determines a sum of the number of EPDCCH candidates corresponding to the localized mapping manner and the number of EPDCCH candidates corresponding to the distributed mapping manner as 6;

for the aggregation level being 4, the determining module 30 determines a sum of the number of EPDCCH candidates corresponding to the localized mapping manner and the number of EPDCCH candidates corresponding to the distributed mapping manner as 6;

for the aggregation level being 8, the determining module 30 determines a sum of the number of EPDCCH candidates corresponding to the localized mapping manner and the number of EPDCCH candidates corresponding to the distributed mapping manner as 2; and for the aggregation level being 16, the determining module 30 determines a sum of the number of EPDCCH candidates corresponding to the localized mapping manner and the number of EPDCCH candidates corresponding to the distributed mapping manner as 2.

In the foregoing embodiment, for the distributed mapping manner, the determining module 30 determines the number of EPDCCH candidates corresponding to the aggregation level 32 as 0.

When the aggregation level 32 is considered in the distributed mapping, for the aggregation level being 32 and the aggregation level being 2, the determining module 30 determines a sum of the number of EPDCCH candidates corresponding to the aggregation level 2 in the localized mapping manner, the number of EPDCCH candidates corresponding to the aggregation level 32 in the distributed mapping manner, and the number of EPDCCH candidates corresponding to the aggregation level 2 in the distributed mapping manner as 6; or for the aggregation level being 32 and the aggregation level being 4, the determining module 30 determines a sum of the number of EPDCCH candidates corresponding to the aggregation level 4 in the localized mapping manner, the number of EPDCCH candidates corresponding to the aggregation level 32 in the distributed mapping manner, and the number of EPDCCH candidates corresponding to the aggregation level 2 in the distributed mapping manner as 6; or for the aggregation level being 32 and the aggregation level being 8, the determining module 30 determines a sum of the number of EPDCCH candidates corresponding to the aggregation level 8 in the localized mapping manner, the number of EPDCCH candidates corresponding to the aggregation level 32 in the distributed mapping manner, and the number of EPDCCH candidates corresponding to the aggregation level 8 in the distributed mapping manner as 2; or for the aggregation level being 32 and the aggregation level being 16, the determining module 30 determines a sum of the number of EPDCCH candidates corresponding to the aggregation level 16 in the localized mapping manner, the number of EPDCCH candidates corresponding to the aggregation level 32 in the distributed mapping manner, and the number of EPDCCH candidates corresponding to the aggregation level 16 in the distributed mapping manner as 2.

Preferably, when the transmission subframe is another subframe except a normal subframe or a special subframe configured as 3, 4, or 8, and the number of REs in one PRB pair and used for bearing the EPDCCH is greater than or equal to a threshold, 10, for the aggregation level being 1, the determining module 30 determines a sum of the number of EPDCCH candidates corresponding to the localized mapping manner and the number of EPDCCH candidates corresponding to the distributed mapping manner as 6;

for the aggregation level being 2, the determining module 30 determines a sum of the number of EPDCCH candidates corresponding to the localized mapping manner and the number of EPDCCH candidates corresponding to the distributed mapping manner as 6;

for the aggregation level being 4, the determining module 30 determines a sum of the number of EPDCCH candidates corresponding to the localized mapping manner and the number of EPDCCH candidates corresponding to the distributed mapping manner as 2; and for the aggregation level being 8, the determining module 30 determines a sum of the number of EPDCCH candidates corresponding to the localized mapping manner and the number of EPDCCH candidates corresponding to the distributed mapping manner as 2.

Preferably, for the localized mapping manner, the determining module 30 determines both the number of EPDCCH candidates corresponding to the aggregation level 1 and the number of EPDCCH candidates corresponding to the aggregation level 2 as 6, and determines both the number of EPDCCH candidates corresponding to the aggregation level 4 and the number of EPDCCH candidates corresponding to the aggregation level 8 as 0; and for the distributed mapping manner, the determining module 30 determines both the number of EPDCCH candidates corresponding to the aggregation level 1 and the number of EPDCCH candidates corresponding to the aggregation level 2 as 0, and determines both the number of EPDCCH candidates corresponding to the aggregation level 4 and the number of EPDCCH candidates corresponding to the aggregation level 8 as 2; or for the localized mapping manner, the determining module 30 determines both the number of EPDCCH candidates corresponding to the aggregation level 1 and the number of EPDCCH candidates corresponding to the aggregation level 2 as 3, and determines both the number of EPDCCH candidates corresponding to the aggregation level 4 and the number of EPDCCH candidates corresponding to the aggregation level 8 as 1; and for the distributed mapping manner, the determining module 30 determines both the number of EPDCCH candidates corresponding to the aggregation level 1 and the number of EPDCCH candidates corresponding to the aggregation level 2 as 3, and determines both the number of EPDCCH candidates corresponding to the aggregation level 4 and the number of EPDCCH candidates corresponding to the aggregation level 8 as 1; or for the localized mapping manner, the determining module 30 determines the number of EPDCCH candidates corresponding to the aggregation level 1 as 6, and the number of EPDCCH candidates corresponding to the aggregation level 2, the number of EPDCCH candidates corresponding to the aggregation level 4, and the number of EPDCCH candidates corresponding to the aggregation level 8 as 0; and for the distributed mapping manner, the determining module 30 determines the number of EPDCCH candidates corresponding to the aggregation level 1 as 0, determines the number of EPDCCH candidates corresponding to the aggregation level 2 as 6, and determines both the number of EPDCCH candidates corresponding to the aggregation level 4 and the number of EPDCCH candidates corresponding to the aggregation level 8 as 2.

In the foregoing embodiment, for the distributed mapping manner, the determining module 30 determines the number of EPDCCH candidates corresponding to the aggregation level of 16 as 0.

When the aggregation level 16 is considered in the distributed mapping, for the aggregation level being 16 and the aggregation level being 1, the determining module 30 determines a sum of the number of EPDCCH candidates corresponding to the aggregation level 16 in the localized mapping manner, the number of EPDCCH candidates corresponding to the aggregation level 1 in the localized mapping manner, the number of EPDCCH candidates corresponding to the aggregation level 16 in the distributed mapping manner, and the number of EPDCCH candidates corresponding to the aggregation level 1 in the distributed mapping manner as 6; or for the aggregation level being 16 and the aggregation level being 2, the determining module 30 determines a sum of the number of EPDCCH candidates corresponding to the aggregation level 16 in the localized mapping manner, the number of EPDCCH candidates corresponding to the aggregation level 2 in the localized mapping manner, the number of EPDCCH candidates corresponding to the aggregation level 16 in the distributed mapping manner, and the number of EPDCCH candidates corresponding to the aggregation level 2 in the distributed mapping manner as 6; or for the aggregation level being 16 and the aggregation level being 4, the determining module 30 determines a sum of the number of EPDCCH candidates corresponding to the aggregation level 16 in the localized mapping manner, the number of EPDCCH candidates corresponding to the aggregation level 4 in the localized mapping manner, the number of EPDCCH candidates corresponding to the aggregation level 16 in the distributed mapping manner, and the number of EPDCCH candidates corresponding to the aggregation level 4 in the distributed mapping manner as 2; or for the aggregation level being 16 and the aggregation level being 8, the determining module 30 determines a sum of the number of EPDCCH candidates corresponding to the aggregation level 16 in the localized mapping manner, the number of EPDCCH candidates corresponding to the aggregation level 8 in the localized mapping manner, the number of EPDCCH candidates corresponding to the aggregation level 16 in the distributed mapping manner, and the number of EPDCCH candidates corresponding to the aggregation level 8 in the distributed mapping manner as 2.

In the case where EPDCCH candidates are firstly allocated for the localized mapping manner, for the localized mapping manner, the determining module 30 determines the number of EPDCCH candidates corresponding to the aggregation level 2 as 6, determines the number of EPDCCH candidates corresponding to the aggregation level 4 as 2, and determines the number of EPDCCH candidates corresponding to the aggregation level 8 as 2; and for the distributed mapping manner, the determining module 30 determines to allocate 6 EPDCCH candidates to at least one aggregation level; or for the localized mapping manner, the determining module 30 determines the number of EPDCCH candidates corresponding to the aggregation level 2 as 6, determines the number of EPDCCH candidates corresponding to the aggregation level 4 as 6, and determines the number of EPDCCH candidates corresponding to the aggregation level 8 as 2; and for the distributed mapping manner, the determining module 30 determines to allocate 2 EPDCCH candidates to at least one aggregation level; or for the localized mapping manner, the determining module 30 determines the number of EPDCCH candidates corresponding to the aggregation level 1 as 6, determines the number of EPDCCH candidates corresponding to the aggregation level 2 as 2, and determines the number of EPDCCH candidates corresponding to the aggregation level 4 as 2; and for the distributed mapping manner, the determining module 30 determines to allocate 6 EPDCCH candidates to at least one aggregation level; or for the localized mapping manner, the determining module 30 determines the number of EPDCCH candidates corresponding to the aggregation level 1 as 6, determines the number of EPDCCH candidates corresponding to the aggregation level 2 as 6, and determines the number of EPDCCH candidates corresponding to the aggregation level 4 as 2; and for the distributed mapping manner, the determining module 30 determines to allocate 2 EPDCCH candidates to at least one aggregation level.

In another implementation manner, the EPDCCH set does not need to be divided into two sets, and instead, the number of physical control channel candidates of each EPDCCH set is selected. In this embodiment, the determining module 30 is configured to determine the number of physical control channel candidates corresponding to the to-be-detected aggregation level of the physical control channel set.

Preferably, when the physical control channel set is in the localized mapping manner, for a same aggregation level, the determining module 30 determines the number of physical control channel candidates corresponding to the aggregation level according to the number of PRBs of the physical control channel set; and when the physical control channel set is in the distributed mapping manner, for a same aggregation level, the determining module 30 determines the number of physical control channel candidates corresponding to the aggregation level according to the number of PRBs of the physical control channel set.

Generally, when the physical control channel set is in the localized mapping manner, for the same aggregation level, the determining module 30 determines the number of physical control channel candidates corresponding to the aggregation level according to the number of PRBs of the physical control channel set, where the number of physical control channel candidates is in direct proportion to the number of PRBs; and when the physical control channel set is in the distributed mapping manner, for the same aggregation level, the determining module 30 determines the number of physical control channel candidates corresponding to the aggregation level according to the number of PRBs of the physical control channel set, where the number of physical control channel candidates is in direct proportion to the number of PRBs.

In the foregoing embodiment, the receiving module 40 is configured to receive, on an EPDCCH candidate corresponding to the distributed mapping manner, downlink control information scrambled by using an SI-RNTI or an RA-RNTI, and receive, on an EPDCCH candidate corresponding to the localized mapping manner, downlink control information scrambled by using another RNTI except the SI-RNTI and the RA-RNTI.

The receiving module 40 is further configured to receive, on an EPDCCH candidate corresponding to one of the localized mapping manner and the distributed mapping manner, downlink control info' nation including a cross-carrier scheduling instruction, and receive, on an EPDCCH candidate corresponding to the other manner, downlink control information not including the cross-carrier scheduling instruction.

The receiving module 40 is further configured to receive downlink control information with format 0 and/or format 1A through an EPDCCH of the EPDCCH candidates corresponding to the distributed mapping manner, and receive downlink control information with format 2C through an EPDCCH of the EPDCCH candidates corresponding to the localized manner; and the determining module 30 is configured to determine the maximum number of times that blind detection is performed corresponding to the distributed mapping manner as 16, and the maximum number of times that blind detection is performed corresponding to the localized mapping manner as 16.

In another embodiment, the receiving module 40 is configured to receive an EPDCCH with an aggregation level greater than or equal to a set value on an EPDCCH candidate corresponding to the distributed mapping manner, and receive an EPDCCH with an aggregation level smaller than the set value on an EPDCCH candidate corresponding to the localized mapping manner.

Figure 5:
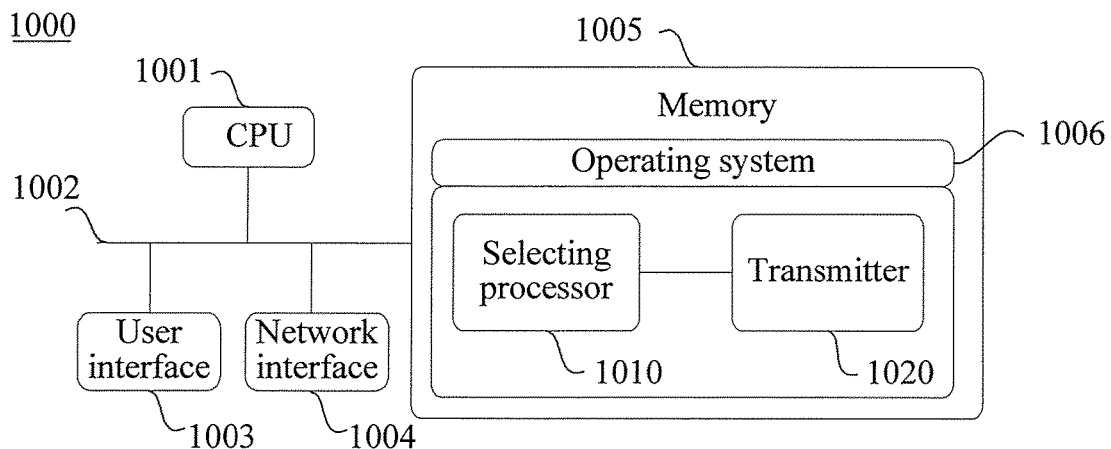
FIG. 5 is a schematic structural diagram of Embodiment 2 of a network side device according to the present invention.

FIG. 5 is a schematic structural diagram of Embodiment 2 of a network side device according to the present invention. As shown in FIG. 5, the network side device 1000 provided in the embodiment of the present invention includes: at least one CPU 1001, at least one network interface 1004 or another user interface 1003, a memory 1005, and at least one communication bus 1002. The communication bus 1002 is configured to implement connection communication between apparatuses. The network side device 1000 optionally includes a user interface 1003, and includes a display, a keyboard or a clicking device. The memory 1005 may include a high-speed RAM memory, and may also further include a non-volatile memory (non-volatile memory), such as, at least one disk memory. The memory 1005 optionally may include at least one storage apparatus located away from the foregoing CPU 1001. In some implementation manners, the memory 1005 stores the following elements, codes, modules, or data structures, or their subsets, or their extended sets: an operating system 1006, including various programs, which are used for implementing various basic services and processing hardware-based tasks;

a selecting processor 1010, configured to select a to-be-detected aggregation level of a physical control channel set in a transmission subframe, and select the number of physical control channel candidates corresponding to the aggregation level according to the aggregation level; and a transmitter 1020 is configured to send downlink control information on a physical control channel candidate corresponding to the selected number.

Preferably, the selecting processor 1010 is specifically configured to: when the number of REs in a PRB pair of the physical control channel set that are available for a physical control channel is smaller than a threshold X, select a minimum to-be-detected aggregation level of the physical control channel set as 2; and when the number of REs included in the PRB pair of the physical control channel set is greater than or equal to the threshold X, select the minimum to-be-detected aggregation level of the physical control channel set as 1; or when the transmission subframe type is a normal subframe with a normal CP length or a special subframe configured as 3, 4, or 8, and the number of REs in one PRB pair that are available for a physical control channel is smaller than X, select a minimum to-be-detected aggregation level of the physical control channel set as 2; or otherwise, for a subframe of another type except the foregoing conditions, select the minimum to-be-detected aggregation level of the physical control channel set as 1.

Preferably, the selecting processor 1010 is specifically configured to divide the physical control channel set into two sets, where one set corresponds to a localized mapping manner of the physical control channel, and the other set corresponds to a distributed mapping manner of the physical control channel; and respectively select the number of EPDCCH candidates corresponding to each aggregation level in the localized mapping manner and the distributed mapping manner.

Preferably, when the transmission subframe is a normal subframe or a special subframe configured as 3, 4, or 8, and the number of REs in one PRB pair and used for bearing the EPDCCH is smaller than a threshold, 10, for the aggregation level being 2, the selecting processor 1010 selects a sum of the number of EPDCCH candidates corresponding to the localized mapping manner and the number of EPDCCH candidates corresponding to the distributed mapping manner as 6;

for the aggregation level being 4, the selecting processor 1010 selects a sum of the number of EPDCCH candidates corresponding to the localized mapping manner and the number of EPDCCH candidates corresponding to the distributed mapping manner as 6;

for the aggregation level being 8, the selecting processor 1010 selects a sum of the number of EPDCCH candidates corresponding to the localized mapping manner and the number of EPDCCH candidates corresponding to the distributed mapping manner as 2; and for the aggregation level being 16, the selecting processor 1010 selects a sum of the number of EPDCCH candidates corresponding to the localized mapping manner and the number of EPDCCH candidates corresponding to the distributed mapping manner as 2.

In the foregoing embodiment, for the distributed mapping manner, the selecting processor 1010 selects the number of EPDCCH candidates corresponding to the aggregation level 32 as 0.

When the aggregation level 32 is considered in the distributed mapping, for the aggregation level being 32 and the aggregation level being 2, the selecting processor 1010 selects a sum of the number of EPDCCH candidates corresponding to the aggregation level 2 in the localized mapping manner, the number of EPDCCH candidates corresponding to the aggregation level 32 in the distributed mapping manner, and the number of EPDCCH candidates corresponding to the aggregation level 2 in the distributed mapping manner as 6; or for the aggregation level being 32 and the aggregation level being 4, the selecting processor 1010 selects a sum of the number of EPDCCH candidates corresponding to the aggregation level 4 in the localized mapping manner, the number of EPDCCH candidates corresponding to the aggregation level 32 in the distributed mapping manner, and the number of EPDCCH candidates corresponding to the aggregation level 2 in the distributed mapping manner as 6; or for the aggregation level being 32 and the aggregation level being 8, the selecting processor 1010 selects a sum of the number of EPDCCH candidates corresponding to the aggregation level 8 in the localized mapping manner, the number of EPDCCH candidates corresponding to the aggregation level 32 in the distributed mapping manner, and the number of EPDCCH candidates corresponding to the aggregation level 8 in the distributed mapping manner as 2; or for the aggregation level being 32 and the aggregation level being 16, the selecting processor 1010 selects a sum of the number of EPDCCH candidates corresponding to the aggregation level 16 in the localized mapping manner, the number of EPDCCH candidates corresponding to the aggregation level 32 in the distributed mapping manner, and the number of EPDCCH candidates corresponding to the aggregation level 16 in the distributed mapping manner as 2.

Preferably, when the transmission subframe is another subframe except a normal subframe or a special subframe configured as 3, 4, or 8, and the number of REs in one PRB pair and used for bearing the EPDCCH is greater than or equal to a threshold, 10, for the aggregation level being 1, the selecting processor 1010 selects a sum of the number of EPDCCH candidates corresponding to the localized mapping manner and the number of EPDCCH candidates corresponding to the distributed mapping manner as 6;

for the aggregation level being 2, the selecting processor 1010 selects a sum of the number of EPDCCH candidates corresponding to the localized mapping manner and the number of EPDCCH candidates corresponding to the distributed mapping manner as 6;

for the aggregation level being 4, the selecting processor 1010 selects a sum of the number of EPDCCH candidates corresponding to the localized mapping manner and the number of EPDCCH candidates corresponding to the distributed mapping manner as 2; and for the aggregation level being 8, the selecting processor 1010 selects a sum of the number of EPDCCH candidates corresponding to the localized mapping manner and the number of EPDCCH candidates corresponding to the distributed mapping manner as 2.

Preferably, for the localized mapping manner, the selecting processor 1010 selects both the number of EPDCCH candidates corresponding to the aggregation level 1 and the number of EPDCCH candidates corresponding to the aggregation level 2 as 6, and selects both the number of EPDCCH candidates corresponding to the aggregation level 4 and the number of EPDCCH candidates corresponding to the aggregation level 8 as 0; and for the distributed mapping manner, the selecting processor 1010 selects both the number of EPDCCH candidates corresponding to the aggregation level 1 and the number of EPDCCH candidates corresponding to the aggregation level 2 as 0, and selects both the number of EPDCCH candidates corresponding to the aggregation level 4 and the number of EPDCCH candidates corresponding to the aggregation level 8 as 2; or for the localized mapping manner, the selecting processor 1010 selects both the number of EPDCCH candidates corresponding to the aggregation level 1 and the number of EPDCCH candidates corresponding to the aggregation level 2 as 3, and selects both the number of EPDCCH candidates corresponding to the aggregation level 4 and the number of EPDCCH candidates corresponding to the aggregation level 8 as 1; and for the distributed mapping manner, the selecting processor 1010 selects both the number of EPDCCH candidates corresponding to the aggregation level 1 and the number of EPDCCH candidates corresponding to the aggregation level 2 as 3, and selects both the number of EPDCCH candidates corresponding to the aggregation level 4 and the number of EPDCCH candidates corresponding to the aggregation level 8 as 1; or for the localized mapping manner, the selecting processor 1010 selects the number of EPDCCH candidates corresponding to the aggregation level 1 as 6, and the number of EPDCCH candidates corresponding to the aggregation level 2, the number of EPDCCH candidates corresponding to the aggregation level 4, and the number of EPDCCH candidates corresponding to the aggregation level 8 as 0; and for the distributed mapping manner, the selecting processor 1010 selects the number of EPDCCH candidates corresponding to the aggregation level 1 as 0, selects the number of EPDCCH candidates corresponding to the aggregation level 2 as 6, and selects both the number of EPDCCH candidates corresponding to the aggregation level 4 and the number of EPDCCH candidates corresponding to the aggregation level 8 as 2.

In the foregoing embodiment, for the distributed mapping manner, the selecting processor 1010 selects the number of EPDCCH candidates corresponding to the aggregation level 16 as 0.

When the aggregation level 16 is considered in the distributed mapping, for the aggregation level being 16 and the aggregation level being 1, the selecting processor 1010 selects a sum of the number of EPDCCH candidates corresponding to the aggregation level 16 in the localized mapping manner, the number of EPDCCH candidates corresponding to the aggregation level 1 in the localized mapping manner, the number of EPDCCH candidates corresponding to the aggregation level 16 in the distributed mapping manner, and the number of EPDCCH candidates corresponding to the aggregation level 1 in the distributed mapping manner as 6; or for the aggregation level being 16 and the aggregation level being 2, the selecting processor 1010 selects a sum of the number of EPDCCH candidates corresponding to the aggregation level 16 in the localized mapping manner, the number of EPDCCH candidates corresponding to the aggregation level 2 in the localized mapping manner, the number of EPDCCH candidates corresponding to the aggregation level 16 in the distributed mapping manner, and the number of EPDCCH candidates corresponding to the aggregation level 2 in the distributed mapping manner as 6; or for the aggregation level being 16 and the aggregation level being 4, the selecting processor 1010 selects a sum of the number of EPDCCH candidates corresponding to the aggregation level 16 in the localized mapping manner, the number of EPDCCH candidates corresponding to the aggregation level 4 in the localized mapping manner, the number of EPDCCH candidates corresponding to the aggregation level 16 in the distributed mapping manner, and the number of EPDCCH candidates corresponding to the aggregation level 4 in the distributed mapping manner as 2; or for the aggregation level being 16 and the aggregation level being 8, the selecting processor 1010 selects a sum of the number of EPDCCH candidates corresponding to the aggregation level 16 in the localized mapping manner, the number of EPDCCH candidates corresponding to the aggregation level 8 in the localized mapping manner, the number of EPDCCH candidates corresponding to the aggregation level 16 in the distributed mapping manner, and the number of EPDCCH candidates corresponding to the aggregation level 8 in the distributed mapping manner as 2.

In the case where EPDCCH candidates are firstly allocated for the localized mapping manner, for the localized mapping manner, the selecting processor 1010 selects the number of EPDCCH candidates corresponding to the aggregation level 2 as 6, selects the number of EPDCCH candidates corresponding to the aggregation level 4 as 2, and selects the number of EPDCCH candidates corresponding to the aggregation level 8 as 2; and for the distributed mapping manner, the selecting processor 1010 chooses to allocate 6 EPDCCH candidates to at least one aggregation level; or for the localized mapping manner, the selecting processor 1010 selects the number of EPDCCH candidates corresponding to the aggregation level 2 as 6, selects the number of EPDCCH candidates corresponding to the aggregation level 4 as 6, and selects the number of EPDCCH candidates corresponding to the aggregation level 8 as 2; and for the distributed mapping manner, the selecting processor 1010 chooses to allocate 2 EPDCCH candidates to at least one aggregation level; or for the localized mapping manner, the selecting processor 1010 selects the number of EPDCCH candidates corresponding to the aggregation level 1 as 6, selects the number of EPDCCH candidates corresponding to the aggregation level 2 as 2, and selects the number of EPDCCH candidates corresponding to the aggregation level 4 as 2; and for the distributed mapping manner, the selecting processor 1010 chooses to allocate 6 EPDCCH candidates to at least one aggregation level; or for the localized mapping manner, the selecting processor 1010 selects the number of EPDCCH candidates corresponding to the aggregation level 1 as 6, selects the number of EPDCCH candidates corresponding to the aggregation level 2 as 6, and selects the number of EPDCCH candidates corresponding to the aggregation level 4 as 2; and for the distributed mapping manner, the selecting processor 1010 chooses to allocate 2 EPDCCH candidates to at least one aggregation level.

In another implementation manner, the EPDCCH set does not need to be divided into two sets, and instead, the number of physical control channel candidates of each EPDCCH set is selected. In this embodiment, the selecting processor 1010 is configured to select the number of physical control channel candidates corresponding to the to-be-detected aggregation level of the physical control channel set.

Preferably, when the physical control channel set is in the localized mapping manner, for a same aggregation level, the selecting processor 1010 selects the number of physical control channel candidates corresponding to the aggregation level according to the number of PRBs of the physical control channel set; and when the physical control channel set is in the distributed mapping manner, for a same aggregation level, the selecting processor 1010 selects the number of physical control channel candidates corresponding to the aggregation level according to the number of PRBs of the physical control channel set.

Generally, when the physical control channel set is in the localized mapping manner, for the same aggregation level, the selecting processor 1010 selects the number of physical control channel candidates corresponding to the aggregation level according to the number of PRBs of the physical control channel set, where the number of physical control channel candidates is in direct proportion to the number of PRBs; and when the physical control channel set is in the distributed mapping manner, for the same aggregation level, the selecting processor 1010 selects the number of physical control channel candidates corresponding to the aggregation level according to the number of PRBs of the physical control channel set, where the number of physical control channel candidates is in direct proportion to the number of PRBs.

In the foregoing embodiment, the transmitter 1020 is configured to send, on an EPDCCH candidate corresponding to the distributed mapping manner, downlink control information scrambled by using an SI-RNTI or an RA-RNTI, and send, on an EPDCCH candidate corresponding to the localized mapping manner, downlink control information scrambled by using another RNTI except the SI-RNTI and the RA-RNTI.

The transmitter 1020 is further configured to send, on an EPDCCH candidate corresponding to one of the localized mapping manner and the distributed mapping manner, downlink control information including a cross-carrier scheduling instruction, and send, on an EPDCCH candidate corresponding to the other manner, downlink control information not including the cross-carrier scheduling instruction.

The transmitter 1020 is further configured to send downlink control information with format 0 and/or format 1A through an EPDCCH of the EPDCCH candidates corresponding to the distributed mapping manner, and send downlink control information with format 2C through an EPDCCH of the EPDCCH candidates corresponding to the localized manner; and the selecting processor 1010 is further configured to select the maximum number of times that blind detection is performed corresponding to the distributed mapping manner as 16, and the maximum number of times that blind detection is performed corresponding to the localized mapping manner as 16.

In another embodiment, the transmitter 1020 is configured to send an EPDCCH with an aggregation level greater than or equal to a set value on an EPDCCH candidate corresponding to the distributed mapping manner, and send an EPDCCH with an aggregation level smaller than the set value on an EPDCCH candidate corresponding to the localized mapping manner.

Figure 6:
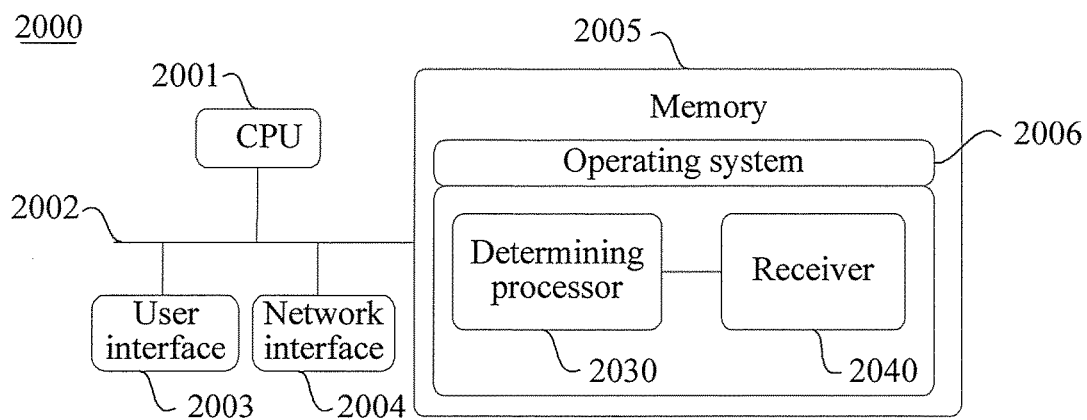
FIG. 6 is a schematic structural diagram of Embodiment 2 of a user equipment according to the present invention.

FIG. 6 is a schematic structural diagram of Embodiment 2 of a user equipment according to the present invention. As shown in FIG. 6, the user equipment 2000 provided in the embodiment of the present invention includes: at least one CPU 2001, at least one network interface 2004 or another user interface 2003, a memory 2005, and at least one communication bus 2002. The communication bus 2002 is configured to implement connection communication between apparatuses. The user equipment 2000 optionally includes a user interface 2003, and includes a display, a keyboard or a clicking device. The memory 2005 may include a high-speed RAM memory, and may also further include a non-volatile memory (non-volatile memory), such as, at least one disk memory. The memory 2005 optionally may include at least one storage apparatus located away from the foregoing CPU 2001. In some implementation manners, the memory 2005 stores the following elements, codes, modules, or data structures, or their subsets, or their extended sets: an operating system 2006, including various programs, which are used for implementing various basic services and processing hardware-based tasks;

a determining processor 2030 is configured to determine a to-be-detected aggregation level of a physical control channel set in a transmission subframe, and determine the number of physical control channel candidates corresponding to the aggregation level according to the aggregation level; and a receiver 2040 is configured to receive downlink control information on a physical control channel candidate corresponding to the determined number.

Preferably, the determining processor 2030 is configured to: when the number of REs in a PRB pair of the physical control channel set that are available for a physical control channel is smaller than a threshold X, determine a minimum to-be-detected aggregation level of the physical control channel set as 2; and when the number of REs included in the PRB pair of the physical control channel set is greater than or equal to the threshold X, determine the minimum to-be-detected aggregation level of the physical control channel set as 1; or when the transmission subframe type is a normal subframe with a normal CP length or a special subframe configured as 3, 4, or 8, and the number of REs in one PRB pair that are available for a physical control channel is smaller than X, determine a minimum to-be-detected aggregation level of the physical control channel set as 2; or otherwise, for a subframe of another type except the foregoing conditions, determine the minimum to-be-detected aggregation level of the physical control channel set as 1.

Preferably, the determining processor 2030 is configured to divide the physical control channel set into two sets, where one set corresponds to a localized mapping manner of the physical control channel, and the other set corresponds to a distributed mapping manner of the physical control channel; and respectively determine the number of EPDCCH candidates corresponding to each aggregation level in the localized mapping manner and the distributed mapping manner.

Preferably, when the transmission subframe is a normal subframe or a special subframe configured as 3, 4, or 8, and the number of REs in one PRB pair and used for bearing the EPDCCH is smaller than a threshold, 10, for the aggregation level being 2, the determining processor 2030 determines a sum of the number of EPDCCH candidates corresponding to the localized mapping manner and the number of EPDCCH candidates corresponding to the distributed mapping manner as 6;

for the aggregation level being 4, the determining processor 2030 determines a sum of the number of EPDCCH candidates corresponding to the localized mapping manner and the number of EPDCCH candidates corresponding to the distributed mapping manner as 6;

for the aggregation level being 8, the determining processor 2030 determines a sum of the number of EPDCCH candidates corresponding to the localized mapping manner and the number of EPDCCH candidates corresponding to the distributed mapping manner as 2; and for the aggregation level being 16, the determining processor 2030 determines a sum of the number of EPDCCH candidates corresponding to the localized mapping manner and the number of EPDCCH candidates corresponding to the distributed mapping manner as 2.

In the foregoing embodiment, for the distributed mapping manner, the determining processor 2030 determines the number of EPDCCH candidates corresponding to the aggregation level 32 as 0.

When the aggregation level 32 is considered in the distributed mapping, for the aggregation level being 32 and the aggregation level being 2, the determining processor 2030 determines a sum of the number of EPDCCH candidates corresponding to the aggregation level 2 in the localized mapping manner, the number of EPDCCH candidates corresponding to the aggregation level 32 in the distributed mapping manner, and the number of EPDCCH candidates corresponding to the aggregation level 2 in the distributed mapping manner as 6; or for the aggregation level being 32 and the aggregation level being 4, the determining processor 2030 determines a sum of the number of EPDCCH candidates corresponding to the aggregation level 4 in the localized mapping manner, the number of EPDCCH candidates corresponding to the aggregation level 32 in the distributed mapping manner, and the number of EPDCCH candidates corresponding to the aggregation level 2 in the distributed mapping manner as 6; or for the aggregation level being 32 and the aggregation level being 8, the determining processor 2030 determines a sum of the number of EPDCCH candidates corresponding to the aggregation level 8 in the localized mapping manner, the number of EPDCCH candidates corresponding to the aggregation level 32 in the distributed mapping manner, and the number of EPDCCH candidates corresponding to the aggregation level 8 in the distributed mapping manner as 2; or for the aggregation level being 32 and the aggregation level being 16, the determining processor 2030 determines a sum of the number of EPDCCH candidates corresponding to the aggregation level 16 in the localized mapping manner, the number of EPDCCH candidates corresponding to the aggregation level 32 in the distributed mapping manner, and the number of EPDCCH candidates corresponding to the aggregation level 16 in the distributed mapping manner as 2.

Preferably, when the transmission subframe is another subframe except a normal subframe or a special subframe configured as 3, 4, or 8, and the number of REs in one PRB pair and used for bearing the EPDCCH is greater than or equal to a threshold, 10, for the aggregation level being 1, the determining processor 2030 determines a sum of the number of EPDCCH candidates corresponding to the localized mapping manner and the number of EPDCCH candidates corresponding to the distributed mapping manner as 6;

for the aggregation level being 2, the determining processor 2030 determines a sum of the number of EPDCCH candidates corresponding to the localized mapping manner and the number of EPDCCH candidates corresponding to the distributed mapping manner as 6;

for the aggregation level being 4, the determining processor 2030 determines a sum of the number of EPDCCH candidates corresponding to the localized mapping manner and the number of EPDCCH candidates corresponding to the distributed mapping manner as 2; and for the aggregation level being 8, the determining processor 2030 determines a sum of the number of EPDCCH candidates corresponding to the localized mapping manner and the number of EPDCCH candidates corresponding to the distributed mapping manner as 2.

Preferably, for the localized mapping manner, the determining processor 2030 determines both the number of EPDCCH candidates corresponding to the aggregation level 1 and the number of EPDCCH candidates corresponding to the aggregation level 2 as 6, and determines both the number of EPDCCH candidates corresponding to the aggregation level 4 and the number of EPDCCH candidates corresponding to the aggregation level 8 as 0; and for the distributed mapping manner, the determining processor 2030 determines both the number of EPDCCH candidates corresponding to the aggregation level 1 and the number of EPDCCH candidates corresponding to the aggregation level 2 as 0, and determines both the number of EPDCCH candidates corresponding to the aggregation level 4 and the number of EPDCCH candidates corresponding to the aggregation level 8 as 2; or for the localized mapping manner, the determining processor 2030 determines both the number of EPDCCH candidates corresponding to the aggregation level 1 and the number of EPDCCH candidates corresponding to the aggregation level 2 as 3, and determines both the number of EPDCCH candidates corresponding to the aggregation level 4 and the number of EPDCCH candidates corresponding to the aggregation level 8 as 1; and for the distributed mapping manner, the determining processor 2030 determines both the number of EPDCCH candidates corresponding to the aggregation level 1 and the number of EPDCCH candidates corresponding to the aggregation level 2 as 3, and determines both the number of EPDCCH candidates corresponding to the aggregation level 4 and the number of EPDCCH candidates corresponding to the aggregation level 8 as 1; or for the localized mapping manner, the determining processor 2030 determines the number of EPDCCH candidates corresponding to the aggregation level 1 as 6, and the number of EPDCCH candidates corresponding to the aggregation level 2, the number of EPDCCH candidates corresponding to the aggregation level 4, and the number of EPDCCH candidates corresponding to the aggregation level 8 as 0; and for the distributed mapping manner, the determining processor 2030 determines the number of EPDCCH candidates corresponding to the aggregation level 1 as 0, determines the number of EPDCCH candidates corresponding to the aggregation level 2 as 6, and determines both the number of EPDCCH candidates corresponding to the aggregation level 4 and the number of EPDCCH candidates corresponding to the aggregation level 8 as 2.

In the foregoing embodiment, for the distributed mapping manner, the determining processor 2030 determines the number of EPDCCH candidates corresponding to the aggregation level 16 as 0.

When the aggregation level 16 is considered in the distributed mapping, for the aggregation level being 16 and the aggregation level being 1, the determining processor 2030 determines a sum of the number of EPDCCH candidates corresponding to the aggregation level 16 in the localized mapping manner, the number of EPDCCH candidates corresponding to the aggregation level 1 in the localized mapping manner, the number of EPDCCH candidates corresponding to the aggregation level 16 in the distributed mapping manner, and the number of EPDCCH candidates corresponding to the aggregation level 1 in the distributed mapping manner as 6; or for the aggregation level being 16 and the aggregation level being 2, the determining processor 2030 determines a sum of the number of EPDCCH candidates corresponding to the aggregation level 16 in the localized mapping manner, the number of EPDCCH candidates corresponding to the aggregation level 2 in the localized mapping manner, the number of EPDCCH candidates corresponding to the aggregation level 16 in the distributed mapping manner, and the number of EPDCCH candidates corresponding to the aggregation level 2 in the distributed mapping manner as 6; or for the aggregation level being 16 and the aggregation level being 4, the determining processor 2030 determines a sum of the number of EPDCCH candidates corresponding to the aggregation level 16 in the localized mapping manner, the number of EPDCCH candidates corresponding to the aggregation level 4 in the localized mapping manner, the number of EPDCCH candidates corresponding to the aggregation level 16 in the distributed mapping manner, and the number of EPDCCH candidates corresponding to the aggregation level 4 in the distributed mapping manner as 2; or for the aggregation level being 16 and the aggregation level being 8, the determining processor 2030 determines a sum of the number of EPDCCH candidates corresponding to the aggregation level 16 in the localized mapping manner, the number of EPDCCH candidates corresponding to the aggregation level 8 in the localized mapping manner, the number of EPDCCH candidates corresponding to the aggregation level 16 in the distributed mapping manner, and the number of EPDCCH candidates corresponding to the aggregation level 8 in the distributed mapping manner as 2.

In the case where EPDCCH candidates are firstly allocated for the localized mapping manner, for the localized mapping manner, the determining processor 2030 determines the number of EPDCCH candidates corresponding to the aggregation level 2 as 6, determines the number of EPDCCH candidates corresponding to the aggregation level 4 as 2, and determines the number of EPDCCH candidates corresponding to the aggregation level 8 as 2; and for the distributed mapping manner, the determining processor 2030 determines to allocate 6 EPDCCH candidates to at least one aggregation level; or for the localized mapping manner, the determining processor 2030 determines the number of EPDCCH candidates corresponding to the aggregation level 2 as 6, determines the number of EPDCCH candidates corresponding to the aggregation level 4 as 6, and determines the number of EPDCCH candidates corresponding to the aggregation level 8 as 2; and for the distributed mapping manner, the determining processor 2030 determines to allocate 2 EPDCCH candidates to at least one aggregation level; or for the localized mapping manner, the determining processor 2030 determines the number of EPDCCH candidates corresponding to the aggregation level 1 as 6, determines the number of EPDCCH candidates corresponding to the aggregation level 2 as 2, and determines the number of EPDCCH candidates corresponding to the aggregation level 4 as 2; and for the distributed mapping manner, the determining processor 2030 determines to allocate 6 EPDCCH candidates to at least one aggregation level; or for the localized mapping manner, the determining processor 2030 determines the number of EPDCCH candidates corresponding to the aggregation level 1 as 6, determines the number of EPDCCH candidates corresponding to the aggregation level 2 as 6, and determines the number of EPDCCH candidates corresponding to the aggregation level 4 as 2; and for the distributed mapping manner, the determining processor 2030 determines to allocate 2 EPDCCH candidates to at least one aggregation level.

In another implementation manner, the EPDCCH set does not need to be divided into two sets, and instead, the number of physical control channel candidates of each EPDCCH set is selected. In this embodiment, the determining processor 2030 is configured to determine the number of physical control channel candidates corresponding to the to-be-detected aggregation level of the physical control channel set.

Preferably, when the physical control channel set is in the localized mapping manner, for a same aggregation level, the determining processor 2030 determines the number of physical control channel candidates corresponding to the aggregation level according to the number of PRBs of the physical control channel set; and when the physical control channel set is in the distributed mapping manner, for a same aggregation level, the determining processor 2030 determines the number of physical control channel candidates corresponding to the aggregation level according to the number of PRBs of the physical control channel set.

Generally, when the physical control channel set is in the localized mapping manner, for the same aggregation level, the determining processor 2030 determines the number of physical control channel candidates corresponding to the aggregation level according to the number of PRBs of the physical control channel set, where the number of physical control channel candidates is in direct proportion to the number of PRBs; and when the physical control channel set is in the distributed mapping manner, for the same aggregation level, the determining processor 2030 determines the number of physical control channel candidates corresponding to the aggregation level according to the number of PRBs of the physical control channel set, where the number of physical control channel candidates is in direct proportion to the number of PRBs.

In the foregoing embodiment, the receiver 2040 is configured to receive, on an EPDCCH candidate corresponding to the distributed mapping manner, downlink control information scrambled by using an SI-RNTI or an RA-RNTI, and receive, on an EPDCCH candidate corresponding to the localized mapping manner, downlink control information scrambled by using another RNTI except the SI-RNTI and the RA-RNTI.

The receiver 2040 is further configured to receive, on an EPDCCH candidate corresponding to one of the localized mapping manner and the distributed mapping manner, downlink control information including a cross-carrier scheduling instruction, and receive, on an EPDCCH candidate corresponding to the other manner, downlink control information not including the cross-carrier scheduling instruction.

The receiver 2040 is further configured to receive downlink control information with format 0 and/or format 1A through an EPDCCH of the EPDCCH candidates corresponding to the distributed mapping manner, and receive downlink control information with format 2C through an EPDCCH of the EPDCCH candidates corresponding to the localized manner; and the determining processor 2030 is configured to determine the maximum number of times that blind detection is performed corresponding to the distributed mapping manner as 16, and the maximum number of times that blind detection is performed corresponding to the localized mapping manner as 16.

In another embodiment, the receiver 2040 is configured to receive an EPDCCH with an aggregation level greater than or equal to a set value on an EPDCCH candidate corresponding to the distributed mapping manner, and receive an EPDCCH with an aggregation level smaller than the set value on an EPDCCH candidate corresponding to the localized mapping manner.

A person of ordinary skill in the art may understand that, all or a part of the steps of the foregoing method embodiments may be implemented by a program instructing relevant hardware. The foregoing programs may be stored in a computer readable storage medium. When the program runs, the foregoing steps of the foregoing method embodiments are performed. The foregoing storage medium includes various mediums capable of storing program codes, such as a ROM, a RAM, a magnetic disk, or an optical disk.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that he may still make modifications to the technical solutions described in the foregoing embodiments, or make equivalent replacements to some or all the technical features thereof, without departing from the spirit and scope of the technical solutions of the embodiments of the present invention.

What is claimed is:

1. A method for transmitting downlink control information, the method comprising:
    determining, by a network side device, an aggregation level of a first physical control channel set and an aggregation level of a second physical control channel set in a transmission subframe;
    determining, by the network side device, a number of physical control channel candidates corresponding to the aggregation level of the first physical control channel set;
    determining, by the network side device, a number of physical control channel candidates corresponding to the aggregation level of the second physical control channel set; and
    sending, by the network side device, downlink control information on at least one of: at least one physical control channel candidate corresponding to the number of the physical control channel candidates of the first physical control channel set and at least one physical control channel candidate corresponding to the number of the physical control channel candidates of the second physical control channel set;
    wherein when the aggregation level of the first physical channel set and the aggregation level of the second physical channel set are 4, a sum of the number of the physical control channel candidates of the first physical control channel set and the number of the physical control candidates of the second physical control channel set is 6.

2. The method according to claim 1, wherein determining, by the network side device, the number of physical control channel candidates corresponding to the aggregation level of the first physical control channel set comprises:
    determining, by the network side device, the number of the physical control channel candidates corresponding to the aggregation level of the first physical control channel set according to the number of physical resource blocks (PRBs) of the first physical control channel set, wherein the first physical control channel set is in a localized mapping manner.

3. The method according to claim 1, wherein determining, by the network side device, the number of physical control channel candidates corresponding to the aggregation level of the second physical control channel set comprises:
    determining, by the network side device, the number of the physical control channel candidates corresponding to the aggregation level of the second physical control channel set according to the number of physical resource blocks (PRBs) of the second physical control channel set, wherein the second physical control channel set is in a distributed mapping manner.

4. A method for transmitting downlink control information, the method comprising:
    determining, by a user equipment, an aggregation level of a first physical control channel set and an aggregation level of a second physical control channel set in a transmission subframe;
    determining, by the user equipment, a number of physical control channel candidates corresponding to the aggregation level of the first physical control channel set and a number of physical control channel candidates corresponding to the aggregation level of the second physical control channel set; and
    receiving, by the user equipment, downlink control information via blind detection on at least one physical control channel candidate corresponding to the number of the physical control channel candidates of the first physical control channel set and at least one physical control channel candidate corresponding to the number of the physical control channel candidates of the second physical control channel set;
    wherein when the aggregation level of the first physical channel set and the aggregation level of the second physical channel set are 4, a sum of the number of the physical control channel candidates of the first physical control channel set and the number of the physical control candidates of the second physical control channel set is 6.

5. The method according to claim 4, wherein determining, by the user equipment, the number of physical control channel candidates corresponding to the aggregation level of the first physical control channel set comprises:
    determining, by the user equipment, the number of physical control channel candidates corresponding to the aggregation level of the first physical control channel set according to the number of physical resource blocks (PRBs) of the first physical control channel set, wherein the first physical control channel set is in a localized mapping manner.

6. The method according to claim 4, wherein determining, by the user equipment, the number of physical control channel candidates corresponding to the aggregation level of the second physical control channel set comprises:
    determining, by the user equipment, the number of physical control channel candidates corresponding to the aggregation level of the second physical control channel set according to the number of physical resource blocks (PRBs of the second physical control channel set, wherein the second physical control channel set is in a distributed mapping manner.

7. A network side device, comprising:
a processor configured to determine an aggregation level of a first physical control channel set and an aggregation level of a second physical control channel set in a transmission subframe, and determine a number of physical control channel candidates corresponding to the aggregation level of the first physical control channel set; and
a transmitter coupled to the processor, wherein the transmitter is configured to send downlink control information on at least one of:
at least one physical control channel candidate corresponding to the number of the physical control channel candidates of the first physical control channel set and at least one physical control channel candidate corresponding to the number of the physical control channel candidates of the second physical control channel set;
wherein when the aggregation level of the first physical channel set and the aggregation level of the second physical channel set are 4, a sum of the number of the physical control channel candidates of the first physical control channel set and the number of the physical control candidates of the second physical control channel set is 6.

8. The network side device according to claim 7, wherein the processor is configured to, determine the number of the physical control channel candidates corresponding to the aggregation level of the first physical control channel set according to the number of physical resource blocks (PRBs) of the first physical control channel set, wherein the first physical control channel set is in a localized mapping manner.

9. The network device according to claim 7, wherein the processor is configured to, determine the number of physical control channel candidates corresponding to the aggregation level of the second physical control channel set according to the number of physical resource blocks (PRBs) of the second physical control channel set, wherein the second physical control channel set is in a distributed mapping manner.

10. A user equipment, comprising:
a processor configured to determine an aggregation level of a first physical control channel set and an aggregation level of a second physical control channel set in a transmission subframe, and determine a number of physical control channel candidates corresponding to the aggregation level of the first physical control channel set and a number of physical control channel candidates corresponding to the aggregation level of the second physical control channel set; and
a receiver coupled to the processor, wherein the receiver is configured to receive downlink control information via blind detection on at least one physical control channel candidate corresponding to the number of the physical control channel candidates of the first physical control channel set and at least one physical control channel candidates corresponding to the number of the physical control channel candidates of the second physical control channel set;
wherein when the aggregation level of the first physical channel set and the aggregation level of the second physical channel set are 4, a sum of the number of the physical control channel candidates of the first physical control channel set and the number of the physical control candidates of the second physical control channel set is 6.

11. The method according to claim 10, wherein the processor is configured to determine the number of physical control channel candidates corresponding to the aggregation level of the first physical control channel set according to the number of physical resource blocks (PRBs) of the first physical control channel set, wherein the first physical control channel set is in a localized mapping manner.

12. The method according to claim 10, wherein the processor is configured to, determine the number of physical control channel candidates corresponding to the aggregation level of the second physical control channel set according to the number of physical resource blocks (PRBs) of the physical control channel set, wherein the second physical control channel set is in a distributed mapping manner.

* * * * *